United States Patent
Li et al.

(10) Patent No.: US 12,459,958 B2
(45) Date of Patent: Nov. 4, 2025

(54) TRICYCLIC COMPOUNDS AS HPK1 INHIBITOR AND THE USE THEREOF

(71) Applicant: BEIGENE, LTD., Grand Cayman (KY)

(72) Inventors: Jing Li, Beijing (CN); Zhiwei Wang, Beijing (CN); Sanjia Xu, Beijing (CN)

(73) Assignee: BeOne Medicines I GmbH, Basel (CH)

( * ) Notice: Subject to any disclaimer, the term of this patent is extended or adjusted under 35 U.S.C. 154(b) by 893 days.

(21) Appl. No.: 17/627,885

(22) PCT Filed: Jul. 17, 2020

(86) PCT No.: PCT/CN2020/102647
§ 371 (c)(1),
(2) Date: Jan. 18, 2022

(87) PCT Pub. No.: WO2021/013083
PCT Pub. Date: Jan. 28, 2021

(65) Prior Publication Data
US 2022/0267354 A1   Aug. 25, 2022

(30) Foreign Application Priority Data

Jul. 19, 2019  (WO) ................ PCT/CN2019/096850

(51) Int. Cl.
*C07D 519/00* (2006.01)
*A61P 35/00* (2006.01)

(52) U.S. Cl.
CPC ............ *C07D 519/00* (2013.01); *A61P 35/00* (2018.01)

(58) Field of Classification Search
CPC .................................................. C07D 519/00
USPC ...................................................... 514/210
See application file for complete search history.

(56) References Cited

U.S. PATENT DOCUMENTS

| | | | |
|---|---|---|---|
| 5,942,532 | A | 8/1999 | Ohemeng |
| 10,239,873 | B2 | 3/2019 | Choi et al. |
| 11,566,003 | B2 | 1/2023 | Chan |
| 2006/0122185 | A1 | 6/2006 | Green et al. |
| 2006/0258662 | A1 | 11/2006 | Binch et al. |
| 2007/0087988 | A1 | 4/2007 | Sawasdikosol et al. |
| 2011/0081364 | A1 | 4/2011 | Binch et al. |
| 2016/0214996 | A1 | 7/2016 | Song |
| 2016/0297815 | A1 | 10/2016 | Choi et al. |
| 2018/0072720 | A1 | 3/2018 | Vechorkin et al. |
| 2018/0298009 | A1 | 10/2018 | Ford |
| 2019/0106419 | A1 | 4/2019 | Vechorkin et al. |
| 2021/0380581 | A1 | 12/2021 | Vechorkin et al. |
| 2022/0331435 | A1 | 10/2022 | Liao |

FOREIGN PATENT DOCUMENTS

| | | |
|---|---|---|
| CN | 101098872 A | 1/2008 |
| CN | 101851237 A | 10/2010 |
| CN | 104513253 | 4/2015 |
| CN | 106336413 A | 1/2017 |
| CN | 106432246 A | 2/2017 |
| CN | 108440532 | 8/2018 |
| CN | 109923114 A | 6/2019 |
| JP | 2012012332 A | 1/2012 |
| WO | WO-2005028475 A2 | 3/2005 |
| WO | 2006015123 A1 | 2/2006 |
| WO | WO-2006015124 A2 | 2/2006 |
| WO | WO-2006058074 A1 | 6/2006 |
| WO | WO-2008124849 A2 | 10/2008 |
| WO | WO-2010049173 A1 | 5/2010 |
| WO | 2011149950 A2 | 12/2011 |
| WO | WO-2014006554 A1 | 1/2014 |
| WO | WO-2014085795 A1 | 6/2014 |
| WO | WO-2014093383 A1 * | 6/2014 ........... A61K 31/437 |
| WO | 2016000615 | 1/2016 |
| WO | WO-2016164641 A1 | 10/2016 |

(Continued)

OTHER PUBLICATIONS

Kelly et al., Azaindoles I. preparation of 7-azaindoles by thermal indolization of 2-pyridylhydrazones, Canadian Journal of Chemistry, 1966, vol. 44, pp. 2455-2459. (Year: 1966).*

Alzabin, S. et al., "Hematopoietic progenitor kinase 1 is a critical component of prostaglandin E2-mediated suppression of the anti-tumor immune response," Cancer Immunol Immunother, Mar. 2010, 59(3):419-429.

Alzabin, S. et al., "Hematopoietic progenitor kinase 1 is a negative regulator of dendritic cell activation," J Immunol, May 2009, 182(10):6187-6194.

Batliwalla, F. M. et al., "Microarray Analyses of Peripheral Blood Cells Identifies Unique Gene Expression Signature in Psoriatic Arthritis," Molecular Medicine, vol. 11, No. 1-12, Jan.-Dec. 2005, pp. 21-29.

(Continued)

*Primary Examiner* — Jeffrey H Murray
*Assistant Examiner* — Rilla Marie Samsell
(74) *Attorney, Agent, or Firm* — McNeill PLLC

(57) ABSTRACT

Disclosed herein is a tricyclic compound of Formula (I), or a stereoisomer thereof, or a pharmaceutically acceptable salt thereof, and pharmaceutical compositions comprising thereof. Also disclosed is a method of treating HPK1 related disorders or diseases by using the compound disclosed herein.

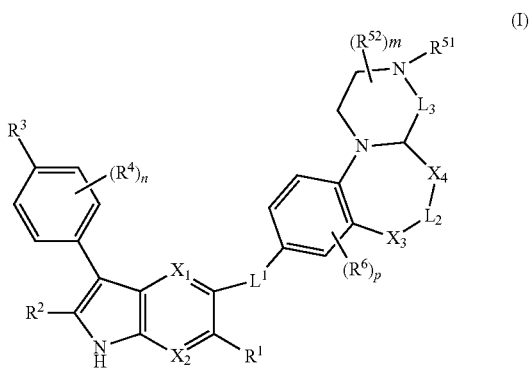

14 Claims, No Drawings

(56) References Cited

FOREIGN PATENT DOCUMENTS

| WO | WO-2016205942 A1 | 12/2016 |
|---|---|---|
| WO | WO-2018049152 A1 | 3/2018 |
| WO | WO-2018049191 A1 | 3/2018 |
| WO | WO-2018049200 A1 | 3/2018 |
| WO | WO-2018049214 A1 | 3/2018 |
| WO | WO-2018167147 A1 | 9/2018 |
| WO | 2018183965 | 10/2018 |
| WO | WO-2018183956 A1 | 10/2018 |
| WO | WO-2019167000 A1 | 9/2019 |
| WO | WO-2019227059 A1 | 11/2019 |
| WO | WO-2019238067 A1 | 12/2019 |
| WO | WO-2020103896 A1 | 5/2020 |
| WO | 2020227325 A1 | 11/2020 |
| WO | WO-2021000925 A1 | 1/2021 |
| WO | WO-2021013083 A1 | 1/2021 |
| WO | WO-2021032148 A1 | 2/2021 |
| WO | 2021057872 A1 | 4/2021 |

OTHER PUBLICATIONS

Ikegami, R. et al., "The Expression of Prostaglandin E Receptors EP2 and EP4 and Their Different Regulation by Lipopolysaccharide in C3H/HeN Peritoneal Macrophages," J Immunol, Apr. 2001, vol. 166, No. 7, pp. 4689-4696.
International Search Report and Written Opinion for International Application No. PCT/CN2019/090922, mailed Sep. 19, 2019, 12 pages.
International Search Report and Written Opinion for International Application No. PCT/CN2019/119896, mailed Feb. 26, 2020, 8 pages.
International Search Report and Written Opinion for International Application No. PCT/CN2020/100037, mailed Oct. 10, 2020, 15 pages.
International Search Report and Written Opinion for International Application No. PCT/CN2020/102647, mailed Sep. 22, 2020, 9 pages.
International Search Report and Written Opinion for International Application No. PCT/CN2020/110171, mailed Nov. 23, 2020, 12 pages.
Liou, J. et al., "HPK1 is activated by lymphocyte antigen receptors and negatively regulates AP-1," Immunity, Apr. 2000, 12(4):399-408.
Sawasdikosol, S. et al., "HPK1 as a novel target for cancer immunotherapy," Immunol Res., Dec. 2012, vol. 54, No. 1-3, pp. 262-265.
Wang, W. et al., "Activation of the Hematopoietic Progenitor Kinase-1 (HPK1)-dependent, Stress-activated c-Jun N-terminal Kinase (JNK) Pathway by Transforming Growth Factor β (TGF-β)-activated Kinase (TAK1), a Kinase Mediator of TGF β Signal Transduction," J. Biol. Chem., Sep. 1997, vol. 272, No. 36, pp. 22771-22775.
Zhou, G. et al., "Hematopoietic Progenitor Kinase 1 Is a Component of Transforming Growth Factor β-induced c-Jun N-terminal Kinase Signaling Cascade," J. Biol. Chem., May 1999, vol. 274, No. 19, pp. 13133-13138.
Cao Gao et al., "Suzuki coupling reaction catalyzed by aniline-β-imine/PdCl2" p. 342, 344.
"Find ETDs Home >> Thesis Resources Find ETDs" Online: "https://ndltd.org/thesis-resources/find-etds/", 7 pages, Accessed Jan. 31, 2023.
Cannon, J. G. et al., "Analog Design," Chapter Nineteen in Burger's Medicinal Chemistry and Drug Discovery, 5th Edition, vol. I: Principles and Practice, Wiley-Interscience, 783-802, 1995.
Dorwald F. A., "Side Reactions in Organic Synthesis," Wiley: VCH, Weinheim p. IX of Preface, 37 pages, 2005.
Irwin, J. J. et al., "ZINC—A Free Database of Commercially Available Compounds for Virtual Screening," J. Chem. Inf. Model., 45:177-182, 2005.
Kim, S. et al., "PubChem in 2021: new data content and improved web interfaces," Nucleic Acids Research, 49: D1388-D1395, 2021.
Lochmuller, C. H. et al., "Chromatographic Resolution of Enantiomers," Journal of Chromatography, 113:283-302, 1975.
Paul A Bartlett and Michael Entzeroth, "Exploiting Chemical Diversity for Drug Discovery", The Royal Society of Chemistry, pp. 113-118, 2006.
STN Registry/Zregistry (CAS REGISTRYSM), 2 pages, Sep. 2016.
U.S. Final Office Action for U.S. Appl. No. 17/623,732, dated Apr. 17, 2025, (15 pages).
U.S. Non-Final Office Action for U.S. Appl. No. 17/623,732, dated Jan. 10, 2025, (31 pages).
Venkatesh, S. et al., "Role of the development scientist in compound lead selection and optimization," Journal of Pharmaceutical Sciences, 89(2):145-154, 2000.
Wang, Y. et al., "Pharmacological inhibition of hematopoietic progenitor kinase 1 positively regulates T-cell function," PLOS One, 15(12):1-19, 2020.

\* cited by examiner

TRICYCLIC COMPOUNDS AS HPK1 INHIBITOR AND THE USE THEREOF

CROSS-REFERENCE TO RELATED APPLICATIONS

This application is a U.S. National Stage Application under 35 U.S.C. § 371 of International Application No. PCT/CN2020/102647, filed Jul. 17, 2020, which claims priority to Patent Application No. PCT/CN2019/096850 (CN), filed on Jul. 19, 2019.

FIELD OF THE INVENTION

The disclosure herein provides tricyclic compounds as well as their compositions and methods of use. The compounds disclosed herein modulate, e.g., inhibit, hematopoietic progenitor kinase 1 (HPK1) activity and are useful in the treatment of various diseases including cancer.

BACKGROUND OF THE INVENTION

HPK1 regulates diverse functions of various immune cells and its kinase activity has been shown to be induced upon activation of T cell receptors (TCR) [Liou J., et al., *Immunity*, 2000. 12 (4): pp. 399-408], B cell receptors (BCR) [Liou J., et al., *Immunity*, 2000. 12 (4): pp. 399-408], transforming growth factor receptor (TGF-βR) [Wang, W., et al., *J Biol Chem*, 1997. 272 (36): pp. 22771-5; Zhou, G., et al., *J Biol Chem*, 1999. 274 (19): pp. 13133-8], and Gs-coupled PGE2 receptors (EP2 and EP4) [Ikegami, R., et al., *J Immunol*, 2001. 166 (7): pp. 4689-96]. Overexpression of HPK1 suppresses TCR-induced activation of AP-1-dependent gene transcription in a kinase-dependent manner, suggesting that HPK1 is required to inhibit the Erk MAPK pathway [Liou J., et al., *Immunity*, 2000. 12 (4): pp. 399-408] and this blockage is thought to be the inhibitory mechanism that negatively regulates TCR-induced IL-2 gene transcription [S. Sawasdikosol., et al., *Immunol Res*, 2012. 54: pp. 262-265].

In vitro HPK1−/− T cells have a lower TCR activation threshold, proliferate robustly, produce enhanced amounts of Th1 cytokines, the HPK1−/− mice experience more severe autoimmune symptoms [S. Sawasdikosol., et al., *Immunol Res*, 2012. 54: pp. 262-265]. In human, HPK1 was downregulated in peripheral blood mononuclear cells of psoriatic arthritis patients or T cells of systemic lupus erythematosus (SLE) patients [Batliwalla F. M., et al., *Mol Med*, 2005. 11 (1-12): pp. 21-9], which indicated that attenuation of HPK1 activity may contribute to autoimmunity in patients. Furthermore, HPK1 may also control antitumor immunity via T cell-dependent mechanisms. In the PGE2-producing Lewis lung carcinoma tumor model, the tumors developed more slowly in HPK1 knockout mice as compared to wild-type mice [US patent application No. 2007/0087988]. HPK1 deficient T cells was more effective in controlling tumor growth and metastasis than wild-type T cells [Alzabin, S., et al., *Cancer Immunol Immunother*, 2010. 59 (3): pp. 419-29]. Similarly, BMDCs from HPK1 knockout mice were more efficient to mount a T cell response to eradicate Lewis lung carcinoma as compared to wild-type BMDCs [Alzabin, S., et al., *J Immunol*, 2009. 182 (10): pp. 6187-94]. In all, HPK1 may be a good target for enhancing antitumor immunity.

As HPK1 modulators, WO2016205942 discloses benzoimidazoles, WO2018049152A1 discloses pyrazolopyrmidines, WO2018049191A1 discloses pyrazolopyridones, and WO2008124849, WO2018049200A1 and WO2018049214A1 disclose pyrazolopyridines.

However, there is a need to provide new HPK1 kinase inhibitors useful in treating cancer.

SUMMARY OF THE INVENTION

In the first aspect, disclosed herein are tricyclic compounds of Formula (I), and the methods of use. The first embodiment comprises the following aspects:

Aspect 1: A compound of Formula (I)

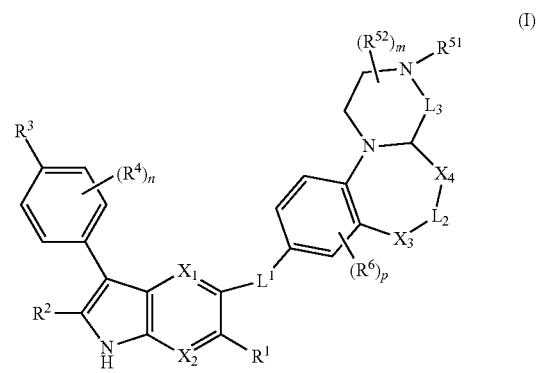

or a pharmaceutically acceptable salt thereof, or a stereoisomer thereof, wherein $X_1$ and $X_2$ are each independently CH or N;

$R^1$ and $R^2$ are each independently hydrogen, halogen, —$C_{1-8}$alkyl, —$C_{2-8}$alkenyl, —$C_{2-8}$alkynyl, cycloalkyl, heterocyclyl, aryl, heteroaryl, oxo, —CN, —$NO_2$, —$OR^a$, —$SO_2R^a$, —$COR^a$, —$CO_2R^a$, —$CONR^aR^b$, —C(=$NR^a$)$NR^bR^c$, —$NR^aR^b$, —$NR^aCOR^b$, —$NR^a$-$CONR^bR^c$, —$NR^aCO_2R^b$, —$NR^aSONR^bR^c$, —$NR^aSO_2NR^bR^c$, or —$NR^aSO_2R^b$, each of said —$C_{1-8}$alkyl, —$C_{2-8}$alkenyl, —$C_{2-8}$alkynyl, cycloalkyl, heterocyclyl, aryl, or heteroaryl is optionally substituted with halogen, hydroxy, —$C_{1-8}$alkyoxy, cycloalkyl, heterocyclyl, aryl, or heteroaryl;

$R^a$, $R^b$, and $R^c$ are each independently hydrogen, —$C_{1-8}$alkyl, —$C_{2-8}$alkenyl, —$C_{2-8}$alkynyl, cycloalkyl, heterocyclyl, aryl, or heteroaryl;

n is 0, 1, 2, 3 or 4;

$R^3$ and $R^4$, at each of their occurrences, are independently halogen, —$C_{1-8}$alkyl, —$C_{2-8}$alkenyl, —$C_{2-8}$alkynyl, cycloalkyl, heterocyclyl, aryl, heteroaryl, oxo, —CN, —$NO_2$, —$SO_2R^{3a}$, —$SO_2NR^{3a}R^{3b}$, —$COR^{3a}$, —$CO_2R^{3a}$, —$CONR^{3a}R^{3b}$, —C(=$NR^{3a}$)$NR^{3b}R^{3c}$, —$NR^{3a}R^{3b}$, —$NR^{3a}COR^{3b}$, —$NR^{3a}CONR^{3b}R^{3c}$, —$NR^{3a}CO_2R^{3b}$, —$NR^{3a}SONR^{3b}R^{3c}$, —$NR^{3a}SO_2NR^{3b}R^{3c}$, or —$NR^{3a}SO_2R^{3b}$, each of said —$C_{1-8}$alkyl, —$C_{2-8}$alkenyl, —$C_{2-8}$alkynyl, cycloalkyl, heterocyclyl, —$C_{1-8}$alkyl-heterocyclyl, aryl, or heteroaryl is optionally substituted with at least one substituent Ria; or $R^3$ and $R^4$, when attached to adjacent carbon atoms of the phenyl ring, together with the two carbon atoms to which they are attached, form a 5- to 8-membered ring comprising 0, 1 or 2 heteroatom(s) independently selected from nitrogen, oxygen or optionally oxidized sulfur as ring member(s), said ring is optionally substituted with at least one substituent $R^{3e}$;

or two $R^4$, when attached to adjacent carbon atoms of the phenyl ring, together with the two carbon atoms to which they are attached, form a 5- to 8-membered ring comprising 0, 1 or 2 heteroatom(s) independently selected from nitrogen, oxygen or optionally oxidized sulfur as ring member(s);

$R^{3a}$, $R^{3b}$, and $R^{3c}$ are each independently hydrogen, —$C_{1-8}$alkyl, —$C_{2-8}$alkenyl, —$C_{2-8}$alkynyl, cycloalkyl, heterocyclyl, aryl, or heteroaryl, each of said —$C_{1-8}$alkyl, —$C_{2-8}$alkenyl, —$C_{2-8}$alkynyl, cycloalkyl, heterocyclyl, aryl, or heteroaryl is optionally substituted with at least one substituent $R^{3e}$; or ($R^{3a}$ and $R^{3b}$), ($R^{3b}$ and $R^{3c}$), or ($R^{3c}$ and $R^{3a}$), together with the atom(s) to which they are attached, form a 3- to 12-membered ring, said ring comprising 0, 1 or 2 additional heteroatom(s) independently selected from nitrogen, oxygen or optionally oxidized sulfur as ring member(s), said ring is optionally substituted with at least one substituent $R^{3e}$;

$R^{3d}$ and $R^{3e}$ are each independently halogen, —$C_{1-8}$alkyl, —$C_{2-8}$alkenyl, —$C_{2-8}$alkynyl, cycloalkyl, heterocyclyl, aryl, heteroaryl, oxo, —CN, —$NO_2$, —$OR^{3f}$, —$SO_2R^{3f}$, —$SO_2NR^{3f}R^{3g}$, —$COR^{3f}$, —$CO_2R^{3f}$, —$CONR^{3f}R^{3g}$, —$C(=NR^{3f})NR^{3g}R^{3h}$, —$NR^{3f}R^{3g}$, —$NR^{3f}C_0R^{3g}$, —$NR^{3f}CONR^{3g}R^{3h}$, —$NR^{3f}CO_2R^{3f}$, —$NR^{3f}SONR^{3f}R^{3g}$, —$NR^{3f}SO_2NR^{3g}R^{3h}$, or —$NR^{3f}SO_2R^{3g}$, each of said —$C_{1-8}$alkyl, —$C_{2-8}$alkenyl, —$C_{2-8}$alkynyl, cycloalkyl, heterocyclyl, aryl, or heteroaryl is optionally substituted with at least one substituent selected from halogen, —$C_{1-8}$alkyl, —$NR^{31}R^{33}$, cycloalkyl, heterocyclyl, aryl, or heteroaryl;

$R^{3f}$, $R^{3g}$, $R^{3h}$, $R^{3i}$, and $R^{3j}$ are each independently hydrogen, —$C_{1-8}$alkyl, $C_{1-8}$alkoxy-$C_{1-8}$alkyl-, —$C_{2-8}$alkenyl, —$C_{2-8}$alkynyl, cycloalkyl, heterocyclyl, aryl, or heteroaryl;

$L^1$ is selected from a single bond, alkylene, —O—, -cycloalkylene, $*^1$—O-alkylene-$**^1$, $*^1$-alkylene-O—$**^1$, $*^1$—NH-alkylene-$**^1$, $*^1$-alkylene-NH—$**^1$, $*^1$—NHC(O)—$**^1$, $*^1$—C(O)NH—$**^1$, alkenylene, or alkynylene; wherein $*^1$ refers to the position attached to the

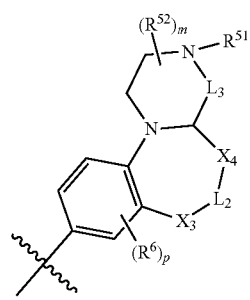

moiety, and $**^1$ refers to the position attached to the

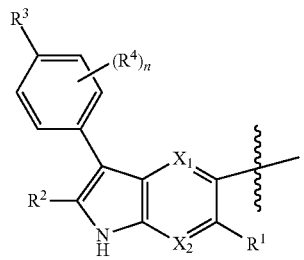

moiety;

$R^6$, at each of its occurrence, is independently halogen, —$C_{1-8}$alkyl, —$C_{2-8}$alkenyl, —$C_{2-8}$alkynyl, cycloalkyl, heterocyclyl, aryl, heteroaryl, oxo, —CN, —$NO_2$, —$OR^{6a}$, —$SO_2R^{6a}$, —$SO_2NR^{6a}R^{6b}$, —$COR^{6a}$, —$CO_2R^{6a}$, —$CONR^{6a}R^{6b}$, —$C(=NR^{6a})NR^{6b}R^{6c}$, —$CH_2CONR^{6a}R^{6b}$, —$CH_2CH_2CONR^{6a}R^{6b}$, —$CH_2CH_2CH_2CONR^{6a}R^{6b}$, —$NR^{6a}R^{6b}$, —$CH_2NR^{6a}R^{6b}$, —$CH_2CH_2NR^{6a}R^{6b}$, —$CH_2CH_2CH_2NR^{6a}R^{6b}$, —$NR^{6a}COR^{6b}$, —$NR^{6a}CONR^{6b}R^{6c}$, —$NR^{6a}CO_2R^{6b}$, —$NR^{6a}SONR^{6b}R^{6c}$, —$NR^{6a}SO_2NR^{6b}R^{6c}$, or —$NR^{6a}SO_2R^{6b}$, each of said —$C_{1-8}$alkyl, —$C^{2-8}$alkenyl, —$C_{2-8}$alkynyl, cycloalkyl, heterocyclyl, aryl, or heteroaryl is optionally substituted with at least one substituent $R^{6d}$; or two $R^6$, when attached to adjacent carbon atoms of the phenyl ring, together with the atoms to which they are attached, form a 4-, 5-, 6-, 7- or 8-membered ring, said ring comprising 0, 1 or 2 heteroatom(s) independently selected from nitrogen, oxygen or optionally oxidized sulfur as ring member(s), said ring is optionally substituted with at least one substituent $R^{6e}$;

$R^{6a}$, $R^{6b}$, and $R^{6c}$ are each independently hydrogen, —$C_{1-8}$alkyl, —$C_{2-8}$alkenyl, —$C_{2-8}$alkynyl, $C_{1-8}$alkoxy-$C_{1-8}$alkyl-, cycloalkyl, heterocyclyl, aryl, or heteroaryl, each of said —$C_{1-8}$alkyl, —$C_{2-8}$alkenyl, —$C_{2-8}$alkynyl, cycloalkyl, heterocyclyl, aryl, or heteroaryl is optionally substituted with at least one substituent $R^{6e}$; or ($R^{6a}$ and $R^{6b}$), ($R^{6b}$ and $R^{6c}$), or ($R^{6c}$ and $R^{6a}$), together with the atom(s) to which they are attached, form a 3- to 12-membered ring, said ring comprising 0, 1 or 2 additional heteroatom(s) independently selected from nitrogen, oxygen or optionally oxidized sulfur as ring member(s), said ring is optionally substituted with at least one substituent $R^{6e}$;

$R^{6d}$ and $R^{6e}$ are each independently hydrogen, halogen, —$C_{1-8}$alkyl, —$C_{2-8}$alkenyl, —$C_{2-8}$alkynyl, cycloalkyl, heterocyclyl, aryl, heteroaryl, oxo, —CN, —$NO_2$, —$OR^{6f}$, —$SO_2R^{6f}$, —$SO_2NR^{6f}R^{6g}$, —$COR^{6f}$, —$CO_2R^{6f}$, —$CONR^{6f}R^{6g}$, —$C(=NR^{6h})NR^{6f}R^{6g}$, —$NR^{6f}R^{6g}$, —$NR^{6f}COR^{6g}$, —$NR^{6h}CONR^{6f}R^{6g}$, —$NR^{6f}CO_2R^{6h}$, —$NR^{6h}SONR^{6f}R^{6g}$, —$NR^{6h}SO_2NR^{6f}R^{6g}$, or —$NR^{6f}SO_2R^{6g}$, each of said —$C_{1-8}$alkyl, —$C_{2-8}$alkenyl, —$C_{2-8}$alkynyl, cycloalkyl, heterocyclyl, aryl, or heteroaryl is optionally substituted with at least one substituent selected from halogen, —$C_{1-8}$alkyl, —$OR^{6i}$, —$NR^{6i}R^{6j}$, cycloalkyl, heterocyclyl, aryl, or heteroaryl;

$R^{6f}$, $R^{6g}$, $R^{6h}$, $R^{6i}$, $R^{6j}$ are each independently hydrogen, —$C_{1-8}$alkyl, $C_{1-8}$alkoxy-$C_{1-8}$alkyl-, —$C_{2-8}$alkenyl, —$C_{2-8}$alkynyl, cycloalkyl, heterocyclyl, aryl, or heteroaryl;

p is 0, 1, 2, 3 or 4;

$X_3$, $X_4$, and $L_2$ are each independently a single bond, —O—, —CO—, —SO$_2$—, —NR$^7$—, —S—, —CR$^7$R$^8$— or —CR$^7$R$^8$—CR$^9$R$^{10}$—, provided that no two heteroatoms may be adjacent within the backbone;

$L_3$ is a single bond, —CO—, —CR$^7$R$^8$— or —CR$^7$R$^8$—CR$^9$R$^{10}$—;

$R^{51}$ is hydrogen, —C$_{1-8}$alkyl, —C$_{2-8}$alkenyl, —C$_{2-8}$alkynyl, cycloalkyl, heterocyclyl, aryl, or heteroaryl;

$R^{52}$, $R^7$, $R^8$, $R^9$ and $R^{10}$, at each of their occurrences, are independently hydrogen, halogen, —C$_{1-8}$alkyl, —C$_{2-8}$alkenyl, —C$_{2-8}$alkynyl, cycloalkyl, heterocyclyl, aryl, heteroaryl, oxo, —CN, —NO$_2$, —OR$^{5a}$, —SO$_2$R$^{5a}$, —SO$_2$NR$^{5a}$R$^{5b}$, —POR$^{5a}$R$^{5b}$, —COR$^{5a}$, —CO$_2$R$^{5a}$, —CONR$^{5a}$R$^{5b}$, —C(=NR$^{5a}$)NR$^{5b}$R$^{5c}$, —CH$_2$CONR$^{5a}$R$^{5b}$, —CH$_2$CH$_2$CONR$^{5a}$R$^{5b}$, —CH$_2$CH$_2$CH$_2$CONR$^{5a}$R$^{5b}$, NR$^{5a}$R$^{5b}$, —NR$^{5a}$COR$^{5b}$, —NR$^{5a}$CONR$^{5b}$R$^{5c}$, —NR$^{5a}$CO$_2$R$^{5b}$, —NR$^{5a}$SONR$^{5b}$R$^{5c}$, —NR$^{5a}$SO$_2$NR$^{5b}$R$^{5c}$, or —NR$^{5a}$SO$_2$R$^{5b}$, each of said —C$_{1-8}$alkyl, —C$_{2-8}$alkenyl, —C$_{2-8}$alkynyl, cycloalkyl, —C$_{1-8}$alkyl-cycloalkyl, heterocyclyl, aryl, or heteroaryl is optionally substituted with at least one substituent $R^{5d}$; or $R^{51}$ and one $R^{52}$ or two $R^{52}$, when attached to adjacent carbon atoms of the ring, together with the atoms to which they are attached, form a 4-, 5-, 6-, 7- or 8-membered ring, said ring comprising 0, 1 or 2 heteroatom(s) independently selected from nitrogen, oxygen or optionally oxidized sulfur as ring member(s), said ring is optionally substituted with at least one substituent $R^{5c}$;

$R^{5a}$, $R^{5b}$ and $R^{5c}$ are each independently hydrogen, —C$_{1-8}$alkyl, —C$_{2-8}$alkenyl, —C$_{2-8}$alkynyl, —C$_{1-8}$alkyl-C$_{1-8}$alkoxy, cycloalkyl, —C$_{1-8}$alkyl-heterocyclyl, —C$_{1-8}$alkyl-aryl, heterocyclyl, aryl, or heteroaryl, each of said —C$_{1-8}$alkyl, —C$_{2-8}$alkenyl, —C$_{2-8}$alkynyl, —C$_{1-8}$alkyl-C$_{1-8}$alkoxy, cycloalkyl, —C$_{1-8}$alkyl-heterocyclyl, —C$_{1-8}$alkyl-aryl, heterocyclyl, aryl, or heteroaryl is optionally substituted with at least one substituent $R^{5e}$; or ($R^{5a}$ and $R^{5b}$), ($R^{5b}$ and $R^{5c}$), or ($R^{5c}$ and $R^{5a}$), together with the atom(s) to which they are attached, form a 3- to 12-membered ring, said ring comprising 0, 1 or 2 additional heteroatom(s) independently selected from nitrogen, oxygen or optionally oxidized sulfur as ring member(s), said ring is optionally substituted with at least one substituent $R^{5e}$;

$R^{5d}$ and $R^{5e}$ are each independently hydrogen, halogen, —C$_{1-8}$alkyl, —C$_{2-8}$alkenyl, —C$_{2-8}$alkynyl, cycloalkyl, heterocyclyl, aryl, heteroaryl, oxo, —CN, —NO$_2$, —CF$_3$, —OR$^{5f}$, —SO$_2$R$^{5f}$, —SO$_2$NR$^{5f}$R$^{5g}$, —POR$^{5f}$R$^{5g}$, —COR$^{5f}$, —CO$_2$R$^{5f}$, CONR$^{5f}$R$^{5g}$, —C(=NR$^{5h}$)NR$^{5f}$R$^{5g}$, —NR$^{5f}$R$^{5g}$, —NR$^{5f}$COR$^{5g}$, —NR$^{5h}$CONR$^{5f}$R$^{5g}$, —NR$^{5f}$CO$_2$R$^{5h}$, —NR$^{5h}$SONR$^{5f}$R$^{5g}$, —NR$^{5h}$SO$_2$NR$^{5f}$R$^{5g}$, or —NR$^{5f}$SO$_2$R$^{5g}$, each of said —C$_{1-8}$alkyl, —C$_{2-8}$alkenyl, —C$_{2-8}$alkynyl, cycloalkyl, heterocyclyl, aryl, or heteroaryl is optionally substituted with at least one substituent selected from halogen, —C$_{1-8}$alkyl, —OR$^{5i}$, —NR$^{5i}$R$^{5j}$, cycloalkyl, aryl, or heteroaryl;

$R^{5f}$, $R^{5g}$, $R^{5h}$, $R^{5i}$, and $R^{5j}$ are each independently hydrogen, —C$_{1-8}$alkyl, —C$_{1-8}$alkoxy, hydroxy, C$_{1-8}$alkoxy-C$_{1-8}$alkyl-, —C$_{2-8}$alkenyl, —C$_{2-8}$alkynyl, cycloalkyl, heterocyclyl, aryl, or heteroaryl;

m is 0, 1, 2, 3 or 4.

Aspect 2: The compound according to Aspect 1, wherein $X_1$ is CH and $X_2$ is N; or $X_1$ is N and $X_2$ is N.

Aspect 3: The compound according to Aspect 1 or 2, wherein $R^1$ and $R^2$ are each hydrogen or —C$_{1-8}$alkyl (preferably hydrogen or methyl).

Aspect 4: The compound according to any one of Aspects 1-3, wherein $R^3$ is —CONR$^{3a}$R$^{3b}$; $R^{3a}$ and $R^{3b}$ are each independently hydrogen or —C$_{1-8}$alkyl (preferably methyl, ethyl, propyl, 2-methylpropyl, butyl, pentyl or hexyl); said —C$_{1-8}$alkyl is optionally substituted with at least one substituent $R^{3e}$, wherein $R^{3e}$ is defined as Formula (I). Preferably, $R^{3e}$ is selected from halogen, —OR$^{3f}$, CN, or heterocyclyl; $R^{3f}$ is selected from hydrogen or —C$_{1-8}$alkyl (e.g., methyl, ethyl, propyl, butyl, pentyl or hexyl). Preferably, $R^{3e}$ is 3- to 7-membered heterocyclyl comprising 1 or 2 heteroatom(s) selected from nitrogen, oxygen or optionally oxidized sulfur, for example, piperazinyl, piperidinyl, tetrahydrofuranyl, tetrahydropyranyl, or pyrrolidinyl.

Aspect 5: The compound according to Aspect 4, wherein $R^3$ is —CONR$^{3a}$R$^{3b}$; $R^{3a}$ and $R^{3b}$ are each independently hydrogen or —C$_{1-8}$alkyl (preferably methyl, ethyl, propyl, 2-methylpropyl, butyl, pentyl or hexyl); said —C$_{1-8}$alkyl is optionally substituted with at least one substituent $R^{3e}$, wherein $R^{3e}$ is selected from —OR$^{3f}$, or heterocyclyl; $R^{3f}$ is selected from hydrogen or —C$_{1-8}$alkyl (e.g., methyl, ethyl, propyl, butyl, pentyl or hexyl) and heterocyclyl is 5-, 6- or 7-membered heterocyclyl comprising 1 heteroatom(s) selected from nitrogen or oxygen, for example, piperidinyl, tetrahydrofuranyl, tetrahydropyranyl, or pyrrolidinyl.

Aspect 6: The compound according to any one of Aspects 1-5, wherein $R^3$ is —CONR$^{3a}$R$^{3b}$; $R^{3a}$ is —C$_{1-8}$alkyl (preferably methyl, ethyl, propyl, 2-methylpropyl, butyl, pentyl or hexyl), and $R^{3b}$ is —C$_{1-8}$alkyl (preferably methyl, ethyl, propyl, 2-methylpropyl, butyl, pentyl or hexyl) optionally substituted with at least one substituent $R^{3e}$, wherein $R^{3e}$ is selected from —OR$^3$, or heterocyclyl; $R^{3f}$ is selected from hydrogen or —C$_{1-8}$alkyl (e.g., methyl, ethyl, propyl, butyl, pentyl or hexyl) and heterocyclyl is 5-, 6- or 7-membered heterocyclyl comprising 1 heteroatom(s) selected from nitrogen or oxygen, for example, piperidinyl, tetrahydrofuranyl, tetrahydropyranyl, or pyrrolidinyl.

Aspect 7: The compound according to any one of Aspects 1-3, wherein $R^3$ is —CONR$^{3a}$R$^{3b}$ or —NR$^{3a}$R$^{3b}$, wherein $R^{3a}$ and $R^{3b}$, together with the nitrogen atom to which they are attached, form a 4- to 12-membered ring comprising 1 or 2 additional nitrogen or oxygen heteroatoms as ring member(s) (e.g., monocyclic 3- to 8-membered ring or bicyclic spiro 7- to 12-membered ring), said ring is optionally substituted with at least one substituent $R^{3e}$; $R^{3e}$ is each independently selected from oxo, —C$_{1-8}$alkyl, —OR$^{3f}$, —NR$^{3f}$R$^{3g}$ or heterocyclyl, said —C$_{1-8}$alkyl or heterocyclyl is optionally substituted by at least one halogen, wherein $R^{3f}$ and $R^{3g}$ are each independently hydrogen, or —C$_{1-8}$alkyl.

Aspect 8: The compound according to Aspect 7, wherein $R^3$ is —CONR$^{3a}$R$^{3b}$ or —NR$^{3a}$R$^{3b}$, wherein $R^{3a}$ and $R^{3b}$, together with the nitrogen atom to which they are attached, form a monocyclic 3- to 8-membered ring comprising 1 or 2 additional nitrogen or oxygen heteroatoms as ring member(s), said ring is optionally substituted with at least one substituent $R^{3e}$; $R^{3e}$ is each independently selected from oxo, —C$_{1-8}$alkyl, —OR$^3$, —NR$^{3f}$R$^{3g}$ or heterocyclyl, said —C$_{1-8}$alkyl or heterocyclyl is optionally substituted by at least one halogen, wherein $R^{3f}$ and $R^{3g}$ are each independently hydrogen, or —C$_{1-8}$alkyl. Preferably, said monocyclic 3- to 8-membered ring comprising 1 or 2 additional nitrogen or oxygen heteroatoms as ring member(s) is azetidinyl, pyrrolidinyl, piperidinyl or piperazinyl, each of which is further substituted with a heterocyclyl group (e.g., a monocyclic 4 to 9-membered heterocyclyl group as defined herein).

Aspect 9: The compound according to Aspect 7, wherein $R^3$ is —CONR$^{3a}$R$^{3b}$ or —NR$^{3a}$R$^{3b}$, wherein R$^{3a}$ and R$^{3b}$, together with the nitrogen atom to which they are attached, form a bicyclic spiro 7- to 12-membered ring comprising 1 or 2 additional nitrogen or oxygen heteroatoms as ring member(s), said ring is optionally substituted with at least one substituent R$^{3e}$; R$^{3e}$ is each independently selected from oxo, —C$_{1-8}$alkyl, —OR$^{3f}$, —NR$^{3f}$R$^{3g}$ or heterocyclyl, said —C$_{1-8}$alkyl or heterocyclyl is optionally substituted by at least one halogen, wherein R$^{3f}$ and R$^{3g}$ are each independently hydrogen, or —C$_{1-8}$alkyl. Preferably, said bicyclic spiro 7- to 12-membered ring comprising 1 or 2 additional nitrogen or oxygen heteroatoms as ring member(s) is 4-membered/3-membered, 4-membered/4-membered, 3-membered/5-membered, 4-membered/5-membered, 4-membered/6-membered, 5-membered/5-membered, or 5-membered/6-membered mono-spiro heterocyclyl. More preferably, said bicyclic spiro 7- to 12-membered ring comprising 1 or 2 additional nitrogen or oxygen heteroatoms as ring member(s) is 2,3-dihydrospiro[indene-1,2'-pyrrolidine] (e.g., 2,3-dihydrospiro[indene-1,2'-pyrrolidine]-1'-yl), 1,3-dihydrospiro[indene-2,2'-pyrrolidine] (e.g., 1,3-dihydrospiro[indene-2,2'-pyrrolidine]-1'-yl), azaspiro[2.4]heptane (e.g., 5-azaspiro[2.4]heptane-5-yl), 2-oxa-6-azaspiro[3.3]heptane (e.g., 2-oxa-6-azaspiro[3.3]heptan-6-yl), azaspiro[3.4]octane (e.g., 6-azaspiro[3.4]octane-6-yl), 2-oxa-6-azaspiro[3.4]octane (e.g., 2-oxa-6-azaspiro[3.4]octane-6-yl), azaspiro[3.4]octane (e.g., 6-azaspiro[3.4]octan-6-yl), azaspiro[3.4]octane (e.g., 6-azaspiro[3.4]octan-6-yl), 1,7-dioxaspiro[4.5]decane, 2-oxa-7-aza-spiro[4.4]nonane (e.g., 2-oxa-7-aza-spiro[4.4]non-7-yl), 7-oxa-spiro[3.5]nonyl or 5-oxa-spiro[2.4]heptyl.

Aspect 10: The compound according to any one of Aspects 1-9, wherein $R^3$ is selected from

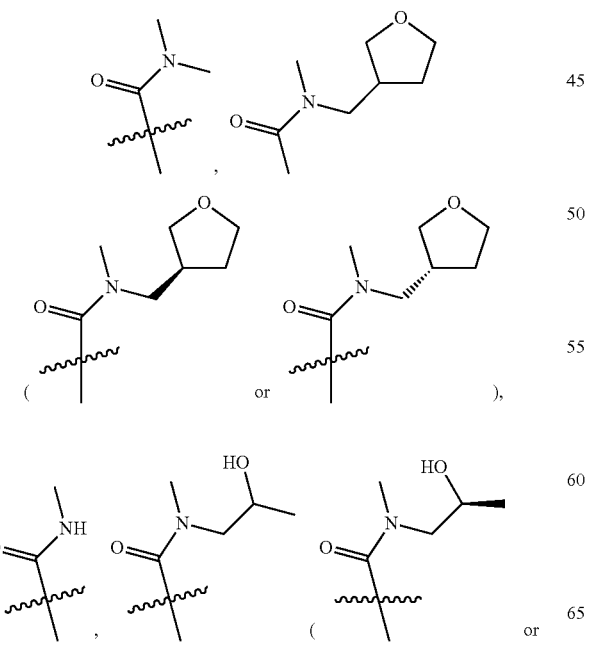

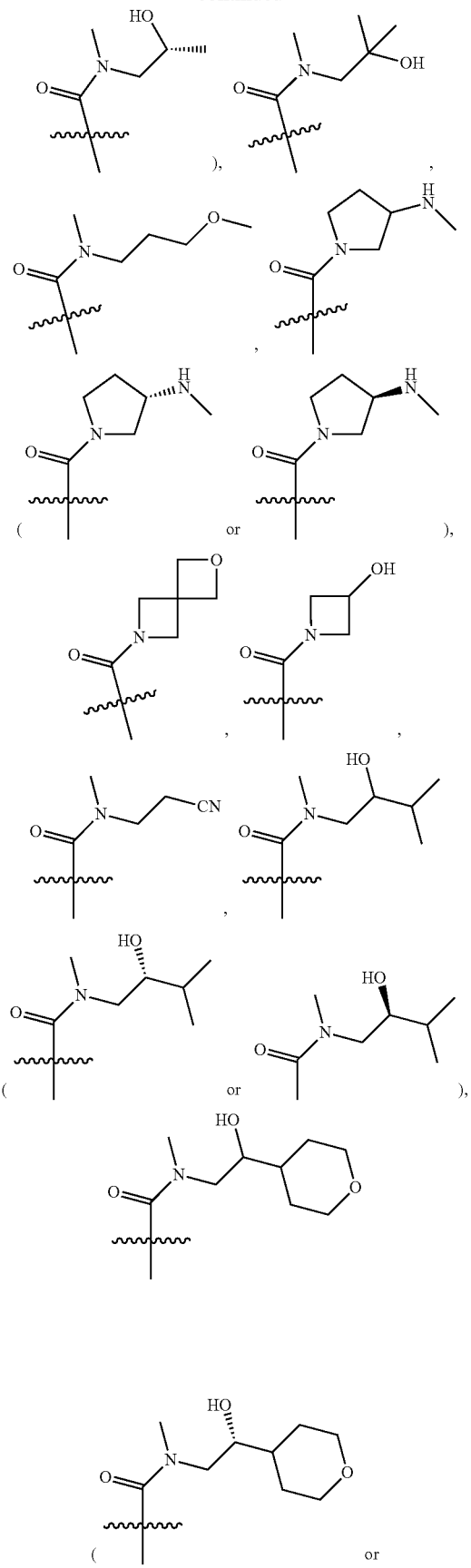

-continued

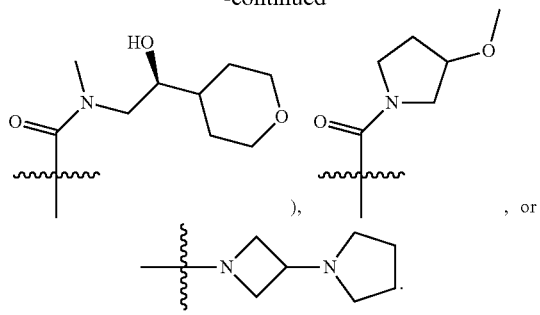

Preferably, $R^3$ is selected from

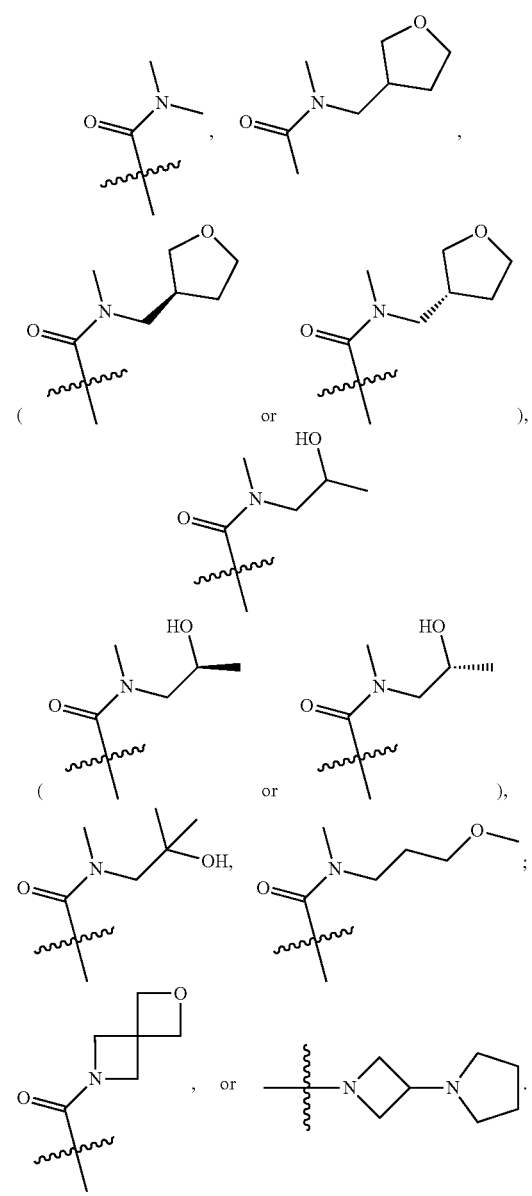

Aspect 11: The compound according to any one of Aspects 1-10, wherein n is 0 or 1; $R^4$ is selected from halogen, —$C_{1-8}$alkyl (preferably methyl), halogen, CN, —$OR^{3a}$ or —$NR^{3a}CONR^{3b}R^{3c}$; said —$C_{1-8}$alkyl is option-ally substituted with at least one substituent $R^{3d}$; $R^{3a}$, $R^{3b}$ and $R^{3c}$ are each independently hydrogen, —$C_{1-8}$alkyl (preferably methyl); $R^{3d}$ is each independently halogen or —$C_{1-8}$alkyl.

Aspect 12: The compound according to Aspect 11, wherein n is 0.

Aspect 13: The compound according to Aspect 11, wherein n is 1, $R^4$ is —$C_{1-8}$alkyl (e.g., methyl).

Aspect 14: The compound according to any one of Aspects 1-13, wherein $L^1$ is a single bond.

Aspect 15: The compound according to any one of Aspects 1-14, wherein m is 0.

Aspect 16: The compound according to any one of Aspects 1-15, wherein $R^{51}$ is hydrogen or —$C_{1-8}$alkyl (e.g., methyl, ethyl, propyl, butyl, pentyl or hexyl).

Aspect 17: The compound according to any one of Aspects 1-16, wherein the

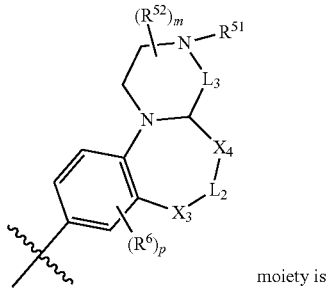

moiety is

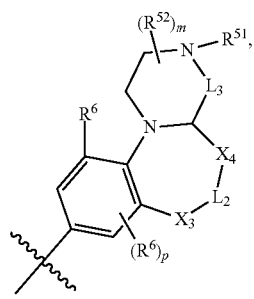

wherein $R^{51}$, $R^{52}$, m and $R^6$ are as defined above.

Aspect 18: The compound according to Aspect 17, wherein $L_3$ is —$CR^7R^8$—, wherein $R^7$ and $R^8$ are defined in Formula (I). Preferably, $R^7$ and $R^8$ are hydrogen, halogen, or —$C_{1-8}$alkyl.

Aspect 19: The compound according to any one of Aspects 1-18, wherein one of $X_3$, $X_4$, and $L_2$ is —O—, —$SO_2$—, —NR'—, or —S—, and the remaining two is each independently a single bond —CO—, —$CR^7R^8$— or —$CR^7R^8$—$CR^9R^{10}$—, wherein $R^7$, $R^8$, $R^9$, and $R^{10}$ are defined in Formula (I), preferably are each hydrogen or —$C_{1-8}$alkyl. Preferably, one of $X_3$, $X_4$, and $L_2$ is —O— or —$NR^7$—, and the remaining two is each independently —$CR^7R^8$—, wherein $R^7$ and $R^8$ are each hydrogen or —$C_{1-8}$alkyl, preferably are both hydrogen.

Aspect 20: The compound according to Aspect 17, wherein the
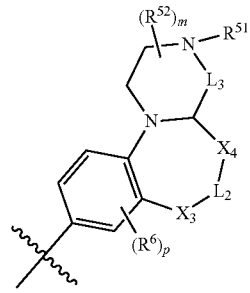
is selected from the following:
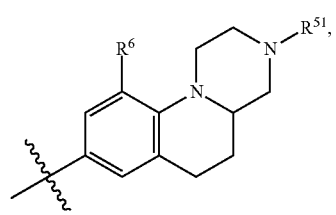
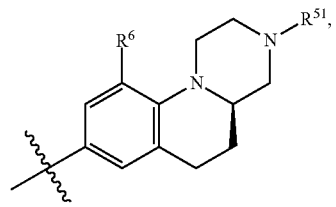
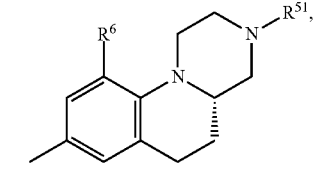
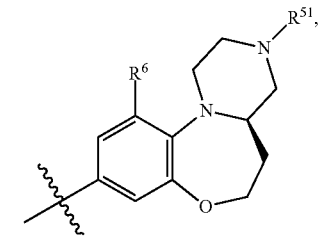
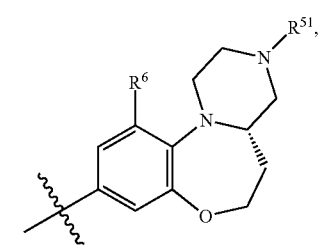
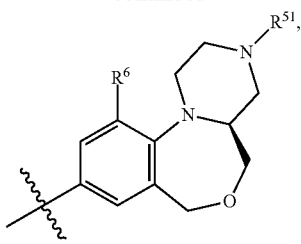
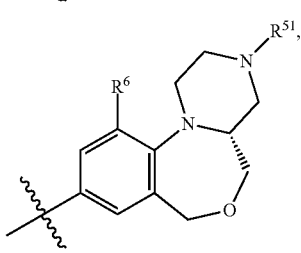
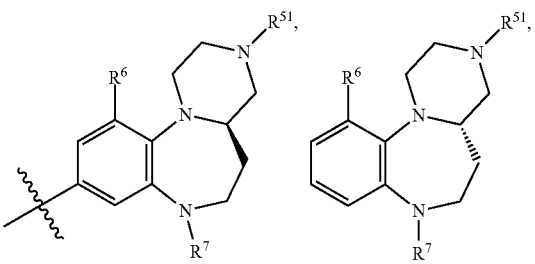
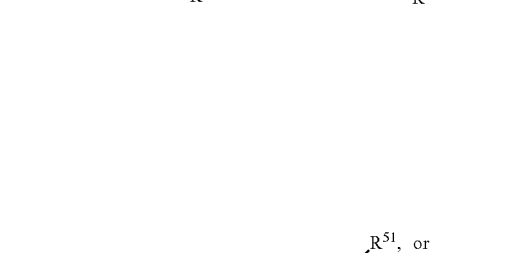
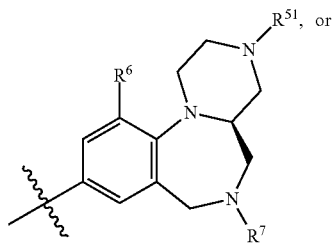
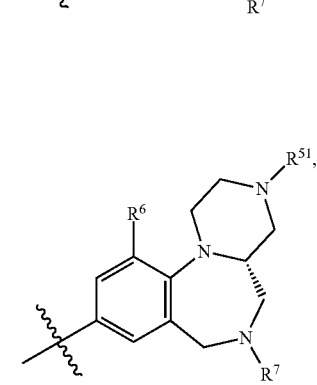
wherein $R^6$, $R^{51}$ and $R^7$ are defined above in Formula (I); preferably, $R^6$, $R^{51}$ and $R^7$ are each hydrogen or —$C_{1-8}$alkyl; more preferably, $R^6$ and $R^{51}$ are —$C_{1-8}$alkyl (e.g., methyl, ethyl, propyl, butyl, pentyl or hexyl) and $R^7$ is hydrogen.

Aspect 21: The compounds selected from:
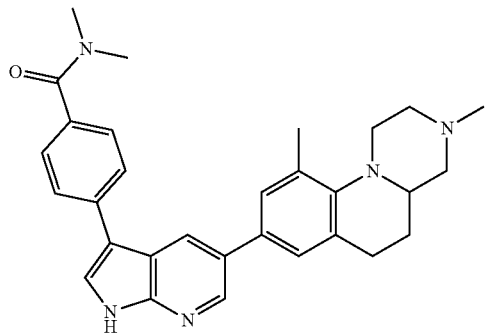
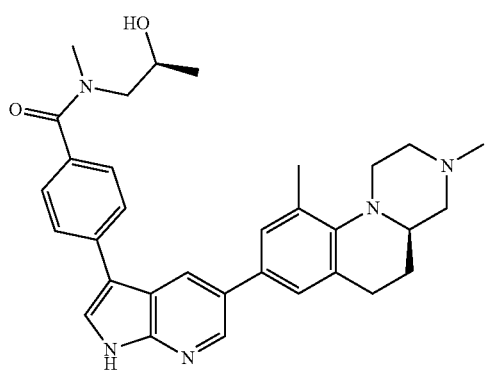
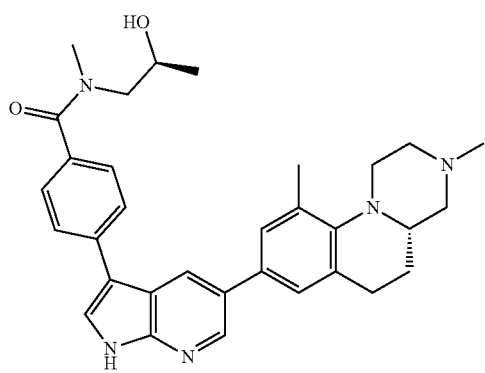
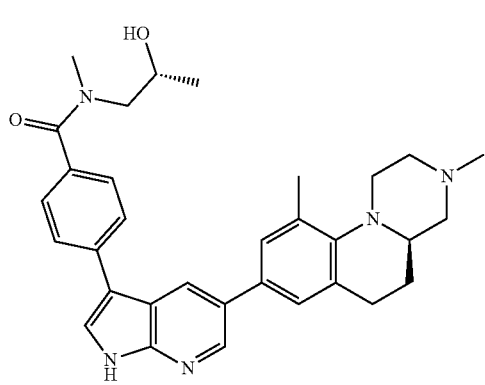
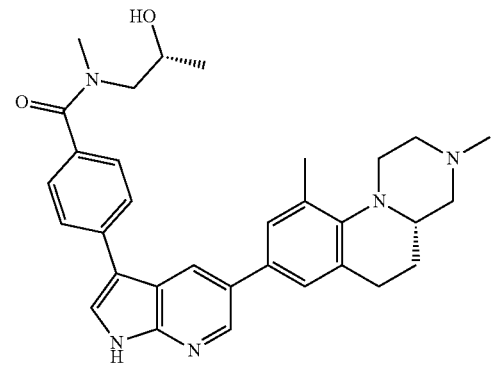
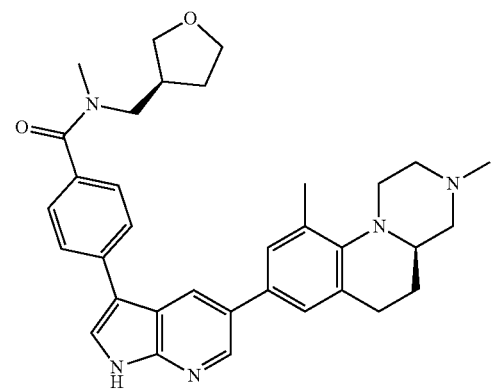
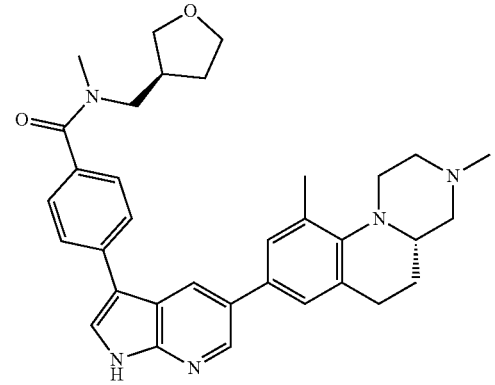
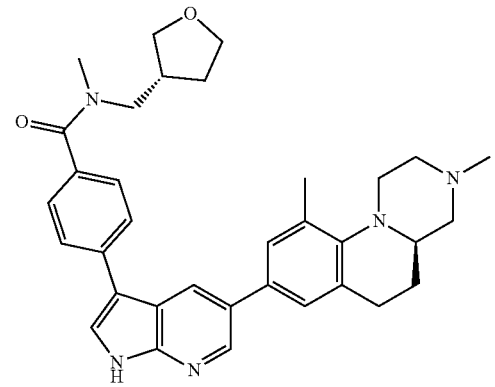

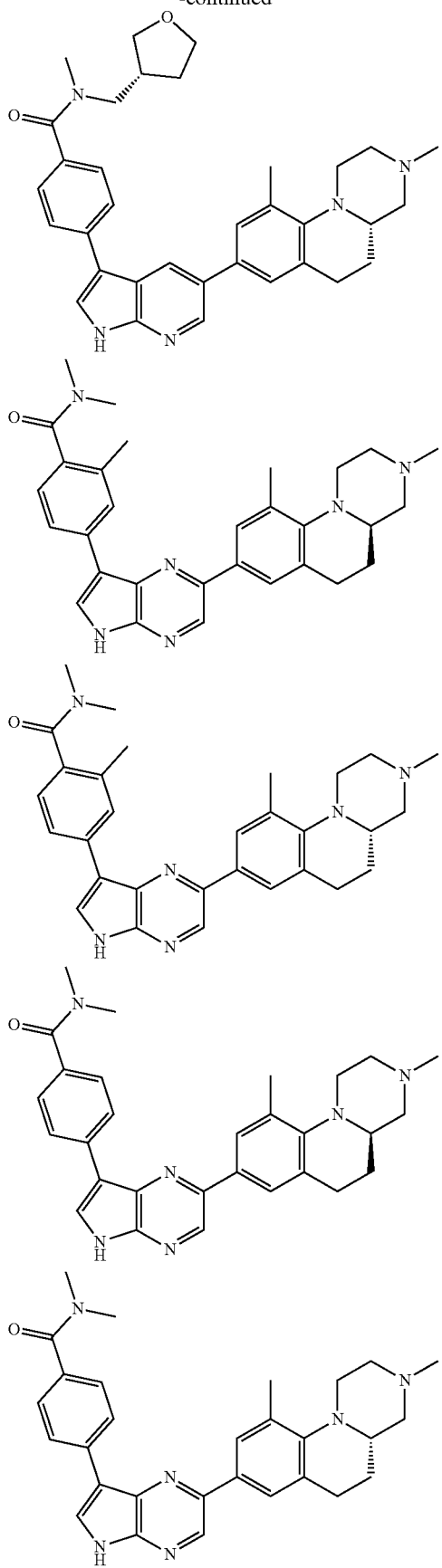
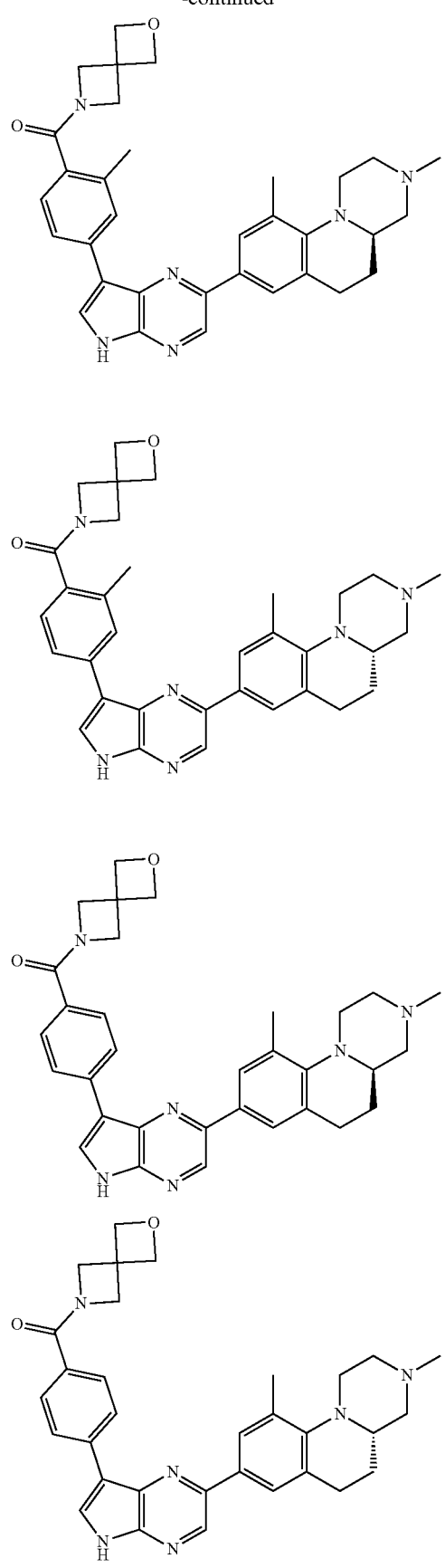

-continued
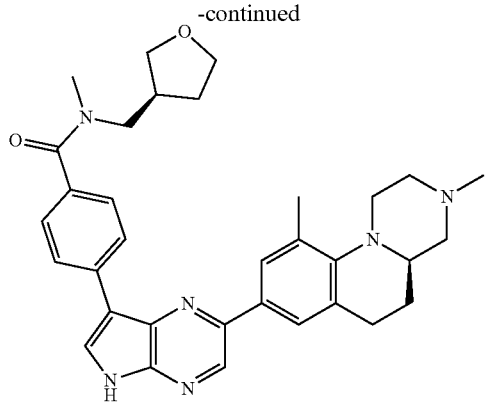
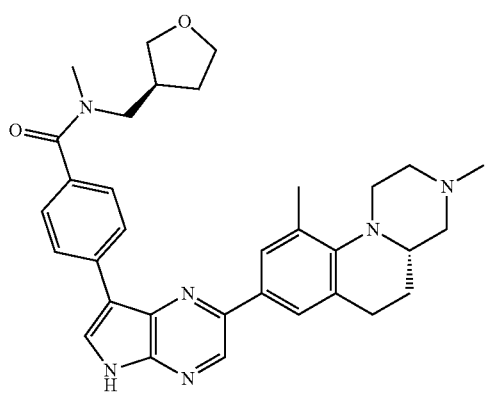
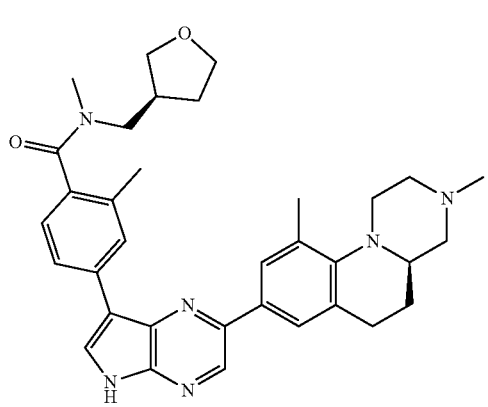
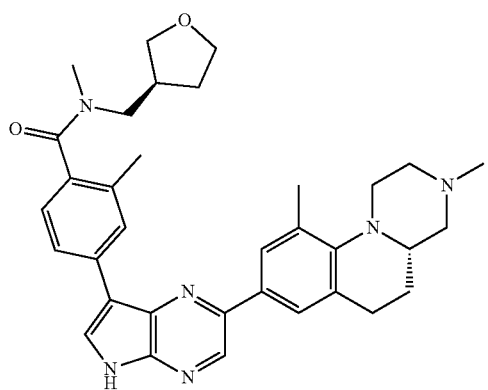
-continued
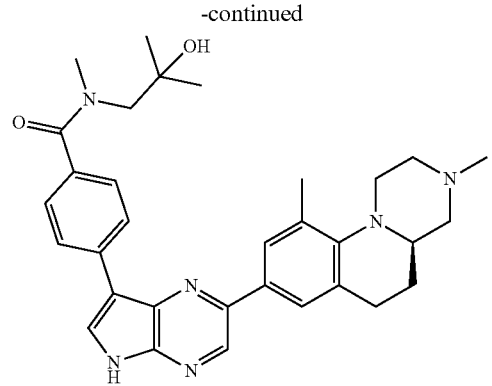
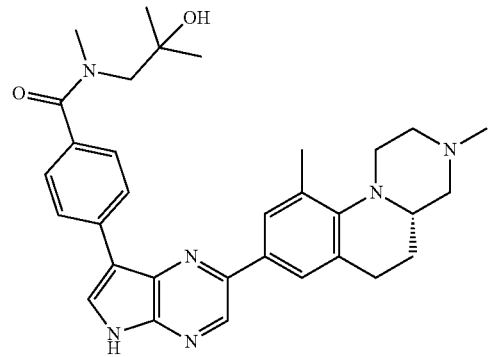
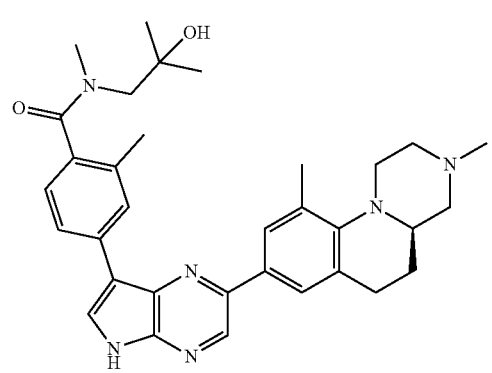
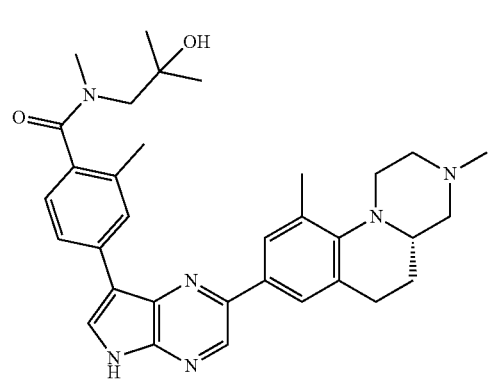

-continued
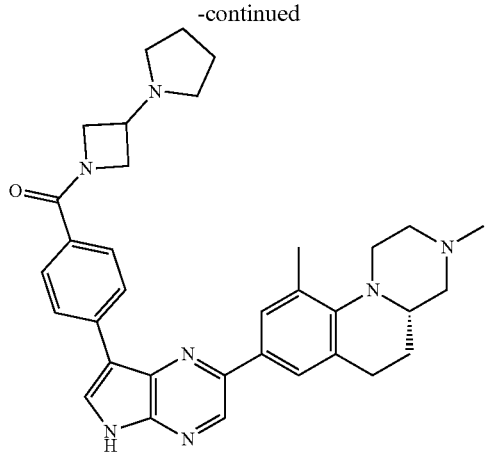
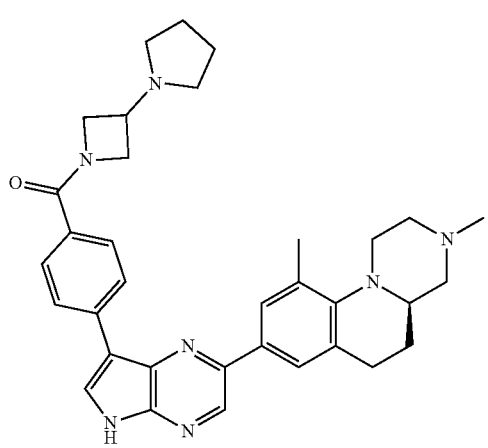
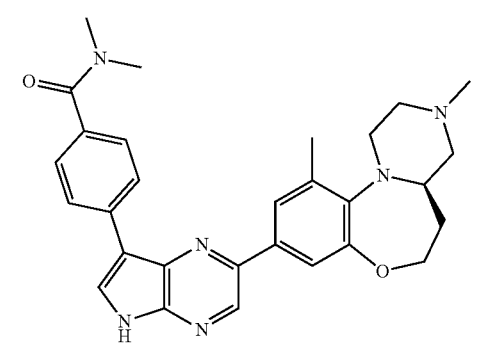
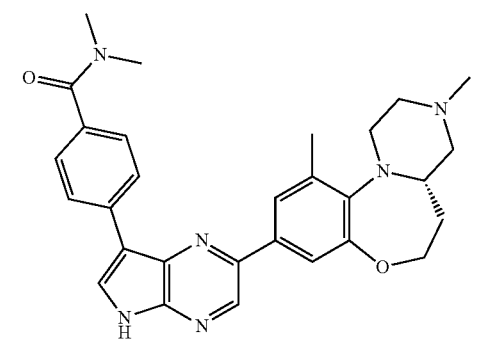 [SMILES: Cc1cc(-c2cnc3[nH]cc(-c4ccc(C(=O)N(C)C)cc4)c3n2)cc2c1N1CCN(C)C[C@@H]1CNC2]
-continued
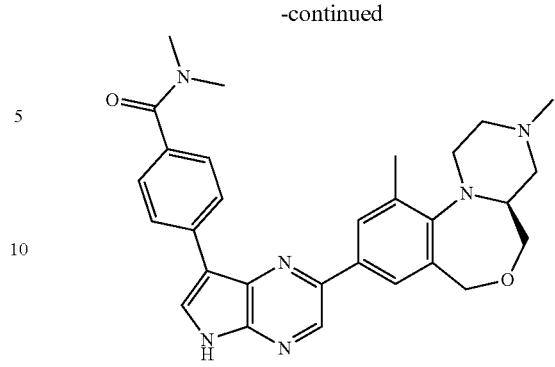
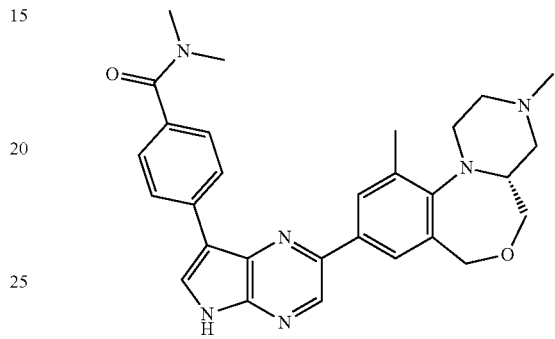
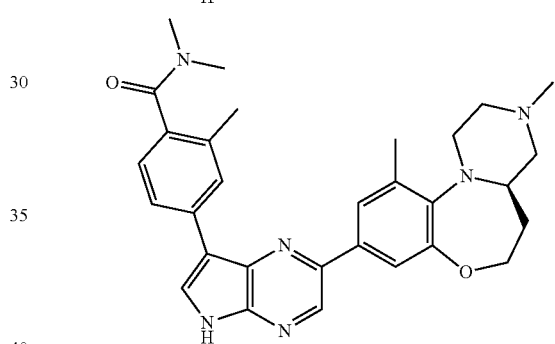
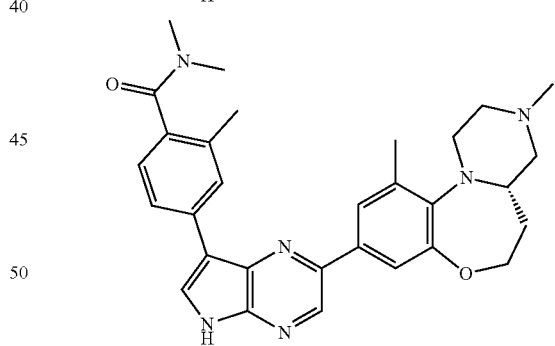
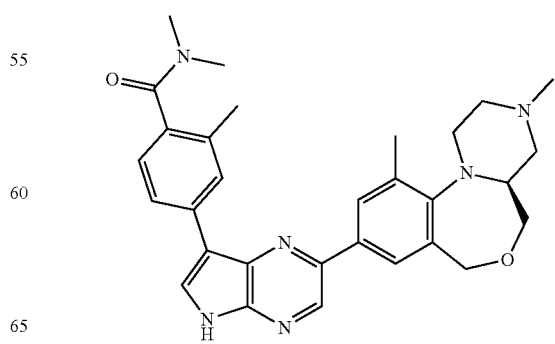

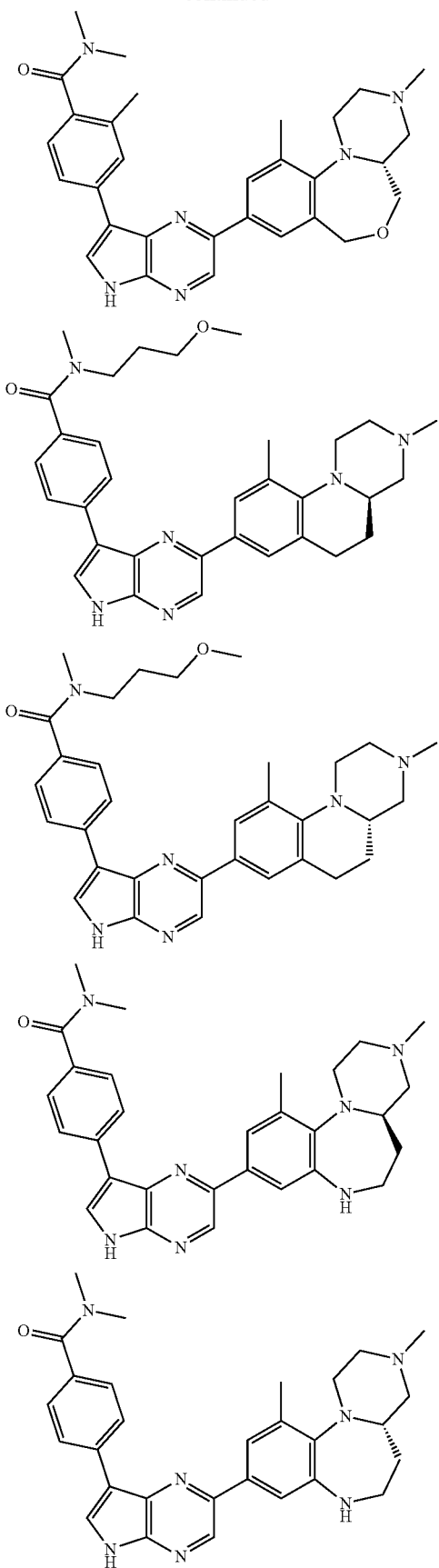

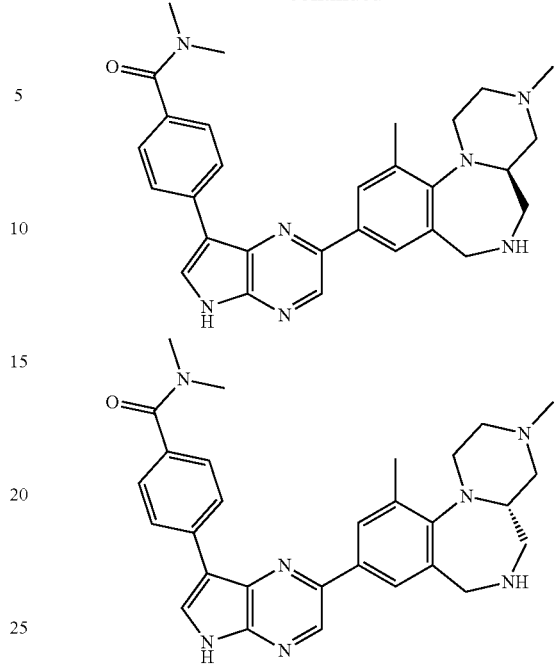

In the second aspect, disclosed herein is a pharmaceutical composition comprising the compound disclosed herein, or a pharmaceutically acceptable salt thereof, and at least one pharmaceutically acceptable carrier or excipient.

In the third aspect, disclosed herein is a method of inhibiting HPK1 activity, which comprises administering to an individual the compound disclosed herein, or a pharmaceutically acceptable salt thereof, including the compound of formula (I) or the specific compounds exemplified herein.

In the fourth aspect, disclosed herein is a method of treating a disease or disorder in a patient comprising administering to the patient a therapeutically effective amount of the compound disclosed herein, or a pharmaceutically acceptable salt thereof as an HPK1 kinase inhibitor, wherein the compound disclosed herein includes the compound of formula (I) or the specific compounds exemplified herein. In some embodiments, the disease or disorder is associated with inhibition of HPK1 interaction. Preferably, the disease or disorder is cancer.

DETAILED DESCRIPTION OF THE INVENTION

The following terms have the indicated meaning throughout the specification:

Unless specifically defined elsewhere in this document, all other technical and scientific terms used herein have the meaning commonly understood by one of ordinary skill in the art to which this invention belongs.

As used herein, including the appended claims, the singular forms of words such as "a", "an", and "the", include their corresponding plural references unless the context clearly indicates otherwise.

The term "or" is used to mean, and is used interchangeably with, the term "and/or" unless the context clearly dictates otherwise.

The term "alkyl" refers to a hydrocarbon group selected from linear and branched, saturated hydrocarbon groups comprising from 1 to 18, such as from 1 to 12, further such as from 1 to 10, more further such as from 1 to 8, or from 1 to 6, or from 1 to 4, carbon atoms. Examples of alkyl groups comprising from 1 to 6 carbon atoms (i.e., $C_{1-6}$ alkyl) include, but not limited to, methyl, ethyl, 1-propyl or n-propyl ("n-Pr"), 2-propyl or isopropyl ("i-Pr"), 1-butyl or n-butyl ("n-Bu"), 2-methyl-1-propyl or isobutyl ("i-Bu"), 1-methylpropyl or s-butyl ("s-Bu"), 1,1-dimethylethyl or t-butyl ("t-Bu"), 1-pentyl, 2-pentyl, 3-pentyl, 2-methyl-2-butyl, 3-methyl-2-butyl, 3-methyl-1-butyl, 2-methyl-1-butyl, 1-hexyl, 2-hexyl, 3-hexyl, 2-methyl-2-pentyl, 3-methyl-2-pentyl, 4-methyl-2-pentyl, 3-methyl-3-pentyl, 2-methyl-3-pentyl, 2,3-dimethyl-2-butyl and 3,3-dimethyl-2-butyl groups.

The term "propyl" refers to 1-propyl or n-propyl ("n-Pr"), 2-propyl or isopropyl ("i-Pr").

The term "butyl" refers to 1-butyl or n-butyl ("n-Bu"), 2-methyl-1-propyl or isobutyl ("i-Bu"), 1-methylpropyl or s-butyl ("s-Bu"), 1,1-dimethylethyl or t-butyl ("t-Bu").

The term "pentyl" refers to 1-pentyl, 2-pentyl, 3-pentyl, 2-methyl-2-butyl, 3-methyl-2-butyl, 3-methyl-1-butyl, 2-methyl-1-butyl.

The term "hexyl" refers to 1-hexyl, 2-hexyl, 3-hexyl, 2-methyl-2-pentyl, 3-methyl-2-pentyl, 4-methyl-2-pentyl, 3-methyl-3-pentyl, 2-methyl-3-pentyl, 2,3-dimethyl-2-butyl and 3,3-dimethyl-2-butyl.

The term "halogen" refers to fluoro (F), chloro (Cl), bromo (Br) and iodo (I).

The term "haloalkyl" refers to an alkyl group in which one or more hydrogen is/are replaced by one or more halogen atoms such as fluoro, chloro, bromo, and iodo. Examples of the haloalkyl include halo$C_{1-8}$alkyl, halo$C_{1-6}$alkyl or halo $C_{1-4}$alkyl, but not limited to —$CF_3$, —$CH_2Cl$, —$CH_2CF_3$, —$CHCl_2$, —$CF_3$, and the like.

The term "alkenyl" refers to a hydrocarbon group selected from linear and branched hydrocarbon groups comprising at least one C=C double bond and from 2 to 18, such as from 2 to 8, further such as from 2 to 6, carbon atoms. Examples of the alkenyl group, e.g., $C_{2-6}$ alkenyl, include, but not limited to ethenyl or vinyl, prop-1-enyl, prop-2-enyl, 2-methylprop-1-enyl, but-1-enyl, but-2-enyl, but-3-enyl, buta-1,3-dienyl, 2-methylbuta-1,3-dienyl, hex-1-enyl, hex-2-enyl, hex-3-enyl, hex-4-enyl, and hexa-1,3-dienyl groups.

The term "alkynyl" refers to a hydrocarbon group selected from linear and branched hydrocarbon group, comprising at least one CC triple bond and from 2 to 18, such as 2 to 8, further such as from 2 to 6, carbon atoms. Examples of the alkynyl group, e.g., $C_{2-6}$ alkynyl, include, but not limited to ethynyl, 1-propynyl, 2-propynyl (propargyl), 1-butynyl, 2-butynyl, and 3-butynyl groups.

The term "cycloalkyl" refers to a hydrocarbon group selected from saturated cyclic hydrocarbon groups, comprising monocyclic and polycyclic (e.g., bicyclic and tricyclic) groups including fused, bridged or spiro cycloalkyl.

For example, the cycloalkyl group may comprise from 3 to 12, such as from 3 to 10, further such as 3 to 8, further such as 3 to 6, 3 to 5, or 3 to 4 carbon atoms. Even further for example, the cycloalkyl group may be selected from monocyclic group comprising from 3 to 12, such as from 3 to 10, further such as 3 to 8, 3 to 6 carbon atoms. Examples of the monocyclic cycloalkyl group include cyclopropyl, cyclobutyl, cyclopentyl, cyclohexyl, cycloheptyl, cyclooctyl, cyclononyl, cyclodecyl, cycloundecyl, and cyclododecyl groups. In particular, Examples of the saturated monocyclic cycloalkyl group, e.g., $C_{3-8}$cycloalkyl, include, but not limited to cyclopropyl, cyclobutyl, cyclopentyl, cyclohexyl, cycloheptyl, and cyclooctyl groups. In a preferred embodiment, the cycloalkyl is a monocyclic ring comprising 3 to 6 carbon atoms (abbreviated as $C_{3-6}$ cycloalkyl), including but not limited to, cyclopropyl, cyclobutyl, cyclopentyl, and cyclohexyl. Examples of the bicyclic cycloalkyl groups include those having from 7 to 12 ring atoms arranged as a fused bicyclic ring selected from [4,4], [4,5], [5,5], [5,6] and [6,6] ring systems, or as a bridged bicyclic ring selected from bicyclo[2.2.1]heptane, bicyclo[2.2.2]octane, and bicyclo[3.2.2]nonane. Further Examples of the bicyclic cycloalkyl groups include those arranged as a bicyclic ring selected from [5,6] and [6,6] ring systems.

The term "spiro cycloalkyl" refers to a cyclic structure which contains carbon atoms and is formed by at least two rings sharing one atom. The term "7 to 12 membered spiro cycloalkyl" refers to a cyclic structure which contains 7 to 12 carbon atoms and is formed by at least two rings sharing one atom.

The term "fused cycloalkyl" refers to a bicyclic cycloalkyl group as defined herein which is saturated and is formed by two or more rings sharing two adjacent atoms.

The term "bridged cycloalkyl" refers to a cyclic structure which contains carbon atoms and is formed by two rings sharing two atoms which are not adjacent to each other. The term "7 to 10 membered bridged cycloalkyl" refers to a cyclic structure which contains 7 to 12 carbon atoms and is formed by two rings sharing two atoms which are not adjacent to each other.

The term "cycloalkenyl" refers to a non-aromatic cyclic alkyl groups of from 3 to 10 carbon atoms having single or multiple rings and having at least one double bond and preferably from 1 to 2 double bonds. In one embodiment, the cycloalkenyl is cyclopentenyl or cyclohexenyl, 1-cyclopent-1-enyl, 1-cyclopent-2-enyl, 1-cyclopent-3-enyl, 1-cyclohex-1-enyl, 1-cyclohex-2-enyl, 1-cyclohex-3-enyl, cyclohexadienyl, preferably cyclohexenyl.

The term "fused cycloalkenyl" refers to a bicyclic cycloalkyl group as defined herein which contain at least one double bond and is formed by two or more rings sharing two adjacent atoms.

The term "cycloalkynyl" refers to non-aromatic cycloalkyl groups of from 5 to 10 carbon atoms having single or multiple rings and having at least one triple bond.

The term "fused cycloalkynyl" refers to a bicyclic cycloalkyl group as defined herein which contains at least one triple bond and is formed by two or more rings sharing two adjacent atoms.

The term a "benzo fused cycloalkyl" is a bicyclic fused cycloalkyl in which a 4- to 8-membered monocyclic cycloalkyl ring fused to a benzene ring. For example, a benzo fused cycloalkyl is

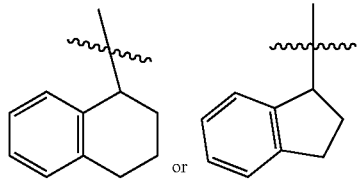

wherein the wavy lines indicate the points of attachment.

The term a "benzo fused cycloalkenyl" is a bicyclic fused cycloalkenyl in which a 4- to 8-membered monocyclic cycloalkenyl ring fused to a benzene ring.

The term a "benzo fused cycloalkynyl" is a bicyclic fused cycloalkynyl in which a 4- to 8-membered monocyclic cycloalkynyl ring fused to a benzene ring.

Examples of fused cycloalkyl, fused cycloalkenyl, or fused cycloalkynyl include but are not limited to bicyclo[1.1.0]butyl, bicyclo[2.1.0]pentyl, bicyclo[3.1.0]hexyl, bicyclo[4.1.0]heptyl, bicyclo[3.3.0]octyl, bicyclo[4.2.0]octyl, decalin, as well as benzo 3 to 8 membered cycloalkyl, benzo $C_{4-6}$ cycloalkenyl, 2,3-dihydro-1H-indenyl, 1H-indenyl, 1, 2, 3,4-tetralyl, 1,4-dihydronaphthyl, etc. Preferred embodiments are 8 to 9 membered fused ring, which refer to cyclic structures containing 8 to 9 ring atoms within the above examples.

The term "aryl" used alone or in combination with other terms refers to a group selected from:
 a) 5- and 6-membered carbocyclic aromatic rings, e.g., phenyl;
 b) bicyclic ring systems such as 7 to 12 membered bicyclic ring systems, wherein at least one ring is carbocyclic and aromatic, e.g., naphthyl and indanyl; and,
 c) tricyclic ring systems such as 10 to 15 membered tricyclic ring systems wherein at least one ring is carbocyclic and aromatic, e.g., fluorenyl.

The terms "aromatic hydrocarbon ring" and "aryl" are used interchangeably throughout the disclosure herein. In some embodiments, a monocyclic or bicyclic aromatic hydrocarbon ring has 5 to 10 ring-forming carbon atoms (i.e., $C_{5-10}$ aryl). Examples of a monocyclic or bicyclic aromatic hydrocarbon ring includes, but not limited to, phenyl, naphth-1-yl, naphth-2-yl, anthracenyl, phenanthrenyl, and the like. In some embodiments, the aromatic hydrocarbon ring is a naphthalene ring (naphth-1-yl or naphth-2-yl) or phenyl ring. In some embodiments, the aromatic hydrocarbon ring is a phenyl ring.

Specifically, the term "bicyclic fused aryl" refers to a bicyclic aryl ring as defined herein. The typical bicyclic fused aryl is naphthalene.

The term "heteroaryl" refers to a group selected from:
 a) 5-, 6- or 7-membered aromatic, monocyclic rings comprising at least one heteroatom, for example, from 1 to 4, or, in some embodiments, from 1 to 3, in some embodiments, from 1 to 2, heteroatoms, selected from nitrogen (N), sulfur (S) and oxygen (O), with the remaining ring atoms being carbon;
 b) 7- to 12-membered bicyclic rings comprising at least one heteroatom, for example, from 1 to 4, or, in some embodiments, from 1 to 3, or, in other embodiments, 1 or 2, heteroatoms, selected from N, O, and S, with the remaining ring atoms being carbon and wherein at least one ring is aromatic and at least one heteroatom is present in the aromatic ring; and
 c) 11- to 14-membered tricyclic rings comprising at least one heteroatom, for example, from 1 to 4, or in some embodiments, from 1 to 3, or, in other embodiments, 1 or 2, heteroatoms, selected from N, O, and S, with the remaining ring atoms being carbon and wherein at least one ring is aromatic and at least one heteroatom is present in an aromatic ring.

When the total number of S and O atoms in the heteroaryl group exceeds 1, those heteroatoms are not adjacent to one another. In some embodiments, the total number of S and O atoms in the heteroaryl group is not more than 2. In some embodiments, the total number of S and O atoms in the aromatic heterocycle is not more than 1. When the heteroaryl group contains more than one heteroatom ring member, the heteroatoms may be the same or different. The nitrogen atoms in the ring(s) of the heteroaryl group can be oxidized to form N-oxides.

Specifically, the term "bicyclic fused heteroaryl" refers to a 7- to 12-membered, preferably 7- to 10-membered, more preferably 9- or 10-membered fused bicyclic heteroaryl ring as defined herein. Typically, a bicyclic fused heteroaryl is 5-membered/5-membered, 5-membered/6-membered, 6-membered/6-membered, or 6-membered/7-membered bicyclic. The group can be attached to the remainder of the molecule through either ring.

Representative examples of bicyclic fused heteroaryl include, but not limited to, the following groups benzisoxazolyl, benzodiazolyl, benzofuranyl, benzofurazanyl, benzofuryl, benzoimidazolyl, benzoisothiazolyl, benzothiadiazolyl, benzothiazolyl, benzothienyl, benzothiophenyl, benzotriazolyl, benzoxadiazolyl, benzoxazolyl, furopyridinyl, furopyrrolyl, imidazopyridinyl, imidazopyridyl, imidazothiazolyl, indazolyl, indolizinyl, indolyl, isobenzofuryl, isoindolyl, isoquinolinyl (or isoquinolyl), naphthyridinyl, phthalazinyl, pteridinyl, purinyl, pyrazinopyridazinyl, pyrazolopyridinyl, pyrazolopyrimidinyl, pyrazolopyridyl, pyrazolotriazinyl, pyridazolopyridyl, pyrrolopyridinyl, quinazolinyl, quinolinyl (or quinolyl), quinoxalinyl, thiazolopyridyl, thienopyrazinyl, thienopyrazolyl, thienopyridyl, thienopyrrolyl, thienothienyl, or triazolopyridyl.

The term a "benzo fused heteroaryl" is a bicyclic fused heteroaryl in which a 5- to 7-membered (preferably, 5- or 6-membered) monocyclic heteroaryl ring as defined herein fused to a benzene ring.

The terms "aromatic heterocyclic ring" and "heteroaryl" are used interchangeably throughout the disclosure herein. In some embodiments, a monocyclic or bicyclic aromatic heterocyclic ring has 5-, 6-, 7-, 8-, 9- or 10-ring forming members with 1, 2, 3, or 4 heteroatom ring members independently selected from nitrogen (N), sulfur (S) and oxygen (O) and the remaining ring members being carbon. In some embodiments, the monocyclic or bicyclic aromatic heterocyclic ring is a monocyclic or bicyclic ring comprising 1 or 2 heteroatom ring members independently selected from nitrogen (N), sulfur (S) and oxygen (O). In some embodiments, the monocyclic or bicyclic aromatic heterocyclic ring is a 5- to 6-membered heteroaryl ring, which is monocyclic and which has 1 or 2 heteroatom ring members independently selected from nitrogen (N), sulfur (S) and oxygen (O). In some embodiments, the monocyclic or bicyclic aromatic heterocyclic ring is an 8- to 10-membered heteroaryl ring, which is bicyclic and which has 1 or 2 heteroatom ring members independently selected from nitrogen, sulfur and oxygen.

Examples of the heteroaryl group or the monocyclic or bicyclic aromatic heterocyclic ring include, but are not limited to, (as numbered from the linkage position assigned priority 1) pyridyl (such as 2-pyridyl, 3-pyridyl, or 4-pyridyl), cinnolinyl, pyrazinyl, 2,4-pyrimidinyl, 3,5-pyrimidinyl, 2,4-imidazolyl, imidazopyridinyl, isoxazolyl, oxazolyl, thiazolyl, isothiazolyl, thiadiazolyl (such as 1,2,3-thiadiazolyl, 1,2,4-thiadiazolyl, or 1,3,4-thiadiazolyl), tetrazolyl, thienyl (such as thien-2-yl, thien-3-yl), triazinyl, benzothienyl, furyl or furanyl, benzofuryl, benzoimidazolyl, indolyl, isoindolyl, oxadiazolyl (such as 1,2,3-oxadiazolyl, 1,2,4-oxadiazolyl, or 1,3,4-oxadiazolyl), phthalazinyl, pyrazinyl, pyridazinyl, pyrrolyl, triazolyl (such as 1,2,3-triazolyl, 1,2,4-triazolyl, or 1,3,4-triazolyl), quinolinyl, isoquinolinyl, pyrazolyl, pyrrolopyridinyl (such as 1H-pyrrolo[2,3-b]pyridin-5-yl), pyrazolopyridinyl (such as 1H-pyrazolo[3,4-b]pyridin-5-yl), benzoxazolyl (such as benzo[d]oxazol-6-yl), pteridinyl, purinyl, 1-oxa-2,3-diazolyl, 1-oxa-2,4-diazolyl, 1-oxa-2,5-diazolyl, 1-oxa-3,4-diazolyl, 1-thia-2,3-diazolyl, 1-thia-2,4-diazolyl, 1-thia-2,5-diazolyl, 1-thia-3,4-diazolyl, furazanyl (such as furazan-2-yl, furazan-3-yl), benzofurazanyl, benzothiophenyl, benzothiazolyl, benzoxazolyl, quinazolinyl, quinoxalinyl, naphthyridinyl, furopyridinyl, benzothiazolyl (such as benzo[d]thiazol-6-yl), and indazolyl (such as 1H-indazol-5-yl).

"Heterocyclyl", "heterocycle" or "heterocyclic" are interchangeable and refer to a non-aromatic heterocyclyl group comprising one or more heteroatoms selected from nitrogen, oxygen or optionally oxidized sulfur as ring members, with the remaining ring members being carbon, including monocyclic, fused, bridged, and spiro ring, i.e., containing monocyclic heterocyclyl, bridged heterocyclyl, spiro heterocyclyl, and fused heterocyclic groups.

The term "optionally oxidized sulfur" used herein refer to S, SO or $SO_2$.

The term "monocyclic heterocyclyl" refers to monocyclic groups in which at least one ring member (e.g., 1-3 heteroatoms, 1 or 2 heteroatom(s)) is a heteroatom selected from nitrogen, oxygen or optionally oxidized sulfur. A heterocycle may be saturated or partially saturated.

Exemplary monocyclic 4 to 9-membered heterocyclyl groups include, but not limited to, pyrrolidin-1-yl, pyrrolidin-2-yl, pyrrolidin-3-yl, imidazolidin-2-yl, imidazolidin-4-yl, pyrazolidin-2-yl, pyrazolidin-3-yl, piperidin-1-yl, piperidin-2-yl, piperidin-3-yl, piperidin-4-yl, 2,5-piperazinyl, pyranyl, morpholinyl, morpholino, morpholin-2-yl, morpholin-3-yl, oxiranyl, aziridin-1-yl, aziridin-2-yl, azocan-1-yl, azocan-2-yl, azocan-3-yl, azocan-4-yl, azocan-5-yl, thiiranyl, azetidin-1-yl, azetidin-2-yl, azetidin-3-yl, oxetanyl, thietanyl, 1,2-dithietanyl, 1,3-dithietanyl, dihydropyridinyl, tetrahydropyridinyl, thiomorpholinyl, thioxanyl, piperazinyl, homopiperazinyl, homopiperidinyl, azepan-1-yl, azepan-2-yl, azepan-3-yl, azepan-4-yl, oxepanyl, thiepanyl, 1,4-oxathianyl, 1,4-dioxepanyl, 1,4-oxathiepanyl, 1,4-oxaazepanyl, 1,4-dithiepanyl, 1,4-thiazepanyl and 1,4-diazepanyl, 1,4-dithianyl, 1,4-azathianyl, oxazepinyl, diazepinyl, thiazepinyl, dihydrothienyl, dihydropyranyl, dihydrofuranyl, tetrahydrofuranyl, tetrahydrothienyl, tetrahydropyranyl, tetrahydrothiopyranyl, 1-pyrrolinyl, 2-pyrrolinyl, 3-pyrrolinyl, indolinyl, 2H-pyranyl, 4H-pyranyl, 1,4-dioxanyl, 1,3-dioxolanyl, pyrazolinyl, pyrazolidinyl, dithianyl, dithiolanyl, pyrazolidinyl, imidazolinyl, pyrimidinonyl, or 1,1-dioxo-thiomorpholinyl.

The term "spiro heterocyclyl" refers to a 5 to 20-membered polycyclic heterocyclyl with rings connected through one common carbon atom (called a spiro atom), comprising one or more heteroatoms selected from nitrogen, oxygen or optionally oxidized sulfur as ring members, with the remaining ring members being carbon. One or more rings of a spiro heterocyclyl group may contain one or more double bonds, but none of the rings has a completely conjugated pi-electron system. Preferably a spiro heterocyclyl is 6 to 14-membered, and more preferably 7 to 12-membered. According to the number of common Spiro atoms, a spiro heterocyclyl is divided into mono-spiro heterocyclyl, di-spiro heterocyclyl, or poly-spiro heterocyclyl, and preferably refers to mono-spiro heterocyclyl or di-spiro heterocyclyl, and more preferably 4-membered/3-membered, 4-membered/4-membered, 3-membered/5-membered, 4-membered/5-membered, 4-membered/6-membered, 5-membered/5-membered, or 5-membered/6-membered mono-spiro heterocyclyl. Representative examples of spiro heterocyclyls include, but not limited to the following groups: 2,3-dihydrospiro[indene-1,2'-pyrrolidine] (e.g., 2,3-dihydrospiro[indene-1,2'-pyrrolidine]-1'-yl), 1,3-dihydrospiro[indene-2,2'-pyrrolidine] (e.g., 1,3-dihydrospiro[indene-2,2'-pyrrolidine]-1'-yl), azaspiro[2.4]heptane (e.g., 5-azaspiro[2.4]heptane-5-yl), 2-oxa-6-azaspiro[3.3]heptane (e.g., 2-oxa-6-azaspiro[3.3]heptan-6-yl), azaspiro[3.4]octane (e.g., 6-azaspiro[3.4]octane-6-yl), 2-oxa-6-azaspiro[3.4]octane (e.g., 2-oxa-6-azaspiro[3.4]octane-6-yl), azaspiro[3.4]octane (e.g., 6-azaspiro[3.4]octan-6-yl), azaspiro[3.4]octane (e.g., 6-azaspiro[3.4]octan-6-yl), 1,7-dioxaspiro[4.5]decane, 2-oxa-7-aza-spiro[4.4]nonane (e.g., 2-oxa-7-aza-spiro[4.4]non-7-yl), 7-oxa-spiro[3.5]nonyl and 5-oxa-spiro[2.4]heptyl.

The term "fused heterocyclyl" refers to a 5 to 20-membered polycyclic heterocyclyl group, wherein each ring in the system shares an adjacent pair of atoms (carbon and carbon atoms or carbon and nitrogen atoms) with another ring, comprising one or more heteroatoms selected from nitrogen, oxygen or optionally oxidized sulfur as ring members, with the remaining ring members being carbon. One or more rings of a fused heterocyclic group may contain one or more double bonds, but the fused heterocyclic group does not have a completely conjugated pi-electron system. Preferably, a fused heterocyclyl is 6 to 14-membered, and more preferably 7 to 12-membered, or 7- to 10-membered. According to the number of membered rings, a fused heterocyclyl is divided into bicyclic, tricyclic, tetracyclic, or polycyclic fused heterocyclyl. The group can be attached to the remainder of the molecule through either ring.

Specifically, the term "bicyclic fused heterocyclyl" refers to a 7 to 12-membered, preferably 7- to 10-membered, more preferably 9- or 10-membered fused heterocyclyl as defined herein comprising two fused rings and comprising 1 to 4 heteroatoms selected from nitrogen, oxygen or optionally oxidized sulfur as ring members. Typically, a bicyclic fused heterocyclyl is 5-membered/5-membered, 5-membered/6-membered, 6-membered/6-membered, or 6-membered/7-membered bicyclic fused heterocyclyl. Representative examples of (bicyclic) fused heterocycles include, but not limited to, the following groups octahydrocyclopenta[c]pyrrole, octahydropyrrolo[3,4-c]pyrrolyl, octahydroisoindolyl, isoindolinyl, octahydro-benzo[b][1,4]dioxin, indolinyl, isoindolinyl, benzopyranyl, dihydrothiazolopyrimidinyl, tetrahydroquinolyl, tetrahydroisoquinolyl (or tetrahydroisoquinolinyl), dihydrobenzofuranyl, dihydrobenzoxazinyl, dihydrobenzoimidazolyl, tetrahydrobenzothienyl, tetrahydrobenzofuranyl, benzodioxolyl, benzodioxonyl, chromanyl, chromenyl, octahydrochromenyl, dihydrobenzodioxynyl, dihydrobenzoxezinyl, dihydrobenzodioxepinyl, dihydrothienodioxynyl, dihydrobenzooxazepinyl, tetrahydrobenzooxazepinyl, dihydrobenzoazepinyl, tetrahydrobenzoazepinyl, isochromanyl, chromanyl, or tetrahydropyrazolopyrimidinyl (e.g., 4,5,6,7-tetrahydropyrazolo[1,5-a]pyrimidin-3-yl).

The term a "benzo fused heterocyclyl" is a bicyclic fused heterocyclyl in which a monocyclic 4 to 9-membered heterocyclyl as defined herein (preferably 5- or 6-membered) fused to a benzene ring.

The term "bridged heterocyclyl" refers to a 5 to 14-membered polycyclic heterocyclic alkyl group, wherein every two rings in the system share two disconnected atoms, comprising one or more heteroatoms selected from nitrogen, oxygen or optionally oxidized sulfur as ring members, with the remaining ring members being carbon. One or more rings of a bridged heterocyclyl group may contain one or more double bonds, but none of the rings has a completely conjugated pi-electron system. Preferably, a bridged heterocyclyl is 6 to 14-membered, and more preferably 7 to 10-membered. According to the number of membered rings, a bridged heterocyclyl is divided into bicyclic, tricyclic, tetracyclic or polycyclic bridged heterocyclyl, and preferably refers to bicyclic, tricyclic or tetracyclic bridged heterocyclyl, and more preferably bicyclic or tricyclic bridged heterocyclyl. Representative examples of bridged heterocyclyls include, but not limited to, the following groups: 2-azabicyclo[2.2.1]heptyl, azabicyclo[3.1.0]hexyl, 2-azabicyclo[2.2.2]octyl and 2-azabicyclo[3.3.2]decyl.

The term "at least one substituent" disclosed herein includes, for example, from 1 to 4, such as from 1 to 3, further as 1 or 2, substituents, provided that the theory of valence is met. For example, "at least one substituent $R^{6d}$" disclosed herein includes from 1 to 4, such as from 1 to 3, further as 1 or 2, substituents selected from the list of $R^{6d}$ as disclosed herein.

Compounds disclosed herein may contain an asymmetric center and may thus exist as enantiomers. "Enantiomers" refer to two stereoisomers of a compound which are non-superimposable mirror images of one another. Where the compounds disclosed herein possess two or more asymmetric centers, they may additionally exist as diastereomers. Enantiomers and diastereomers fall within the broader class of stereoisomers. All such possible stereoisomers as substantially pure resolved enantiomers, racemic mixtures thereof, as well as mixtures of diastereomers are intended to be included. All stereoisomers of the compounds disclosed herein and/or pharmaceutically acceptable salts thereof are intended to be included. Unless specifically mentioned otherwise, reference to one isomer applies to any of the possible isomers. Whenever the isomeric composition is unspecified, all possible isomers are included.

The term "substantially pure" as used herein means that the target stereoisomer contains no more than 35%, such as no more than 30%, further such as no more than 25%, even further such as no more than 20%, by weight of any other stereoisomer(s). In some embodiments, the term "substantially pure" means that the target stereoisomer contains no more than 10%, for example, no more than 5%, such as no more than 1%, by weight of any other stereoisomer(s).

When compounds disclosed herein contain olefinic double bonds, unless specified otherwise, such double bonds are meant to include both E and Z geometric isomers.

When compounds disclosed herein contain a di-substituted cyclic ring system, substituents found on such ring system may adopt cis and trans formations. Cis formation means that both substituents are found on the upper side of the 2 substituent placements on the carbon, while trans would mean that they were on opposing sides. For example, the di-substituted cyclic ring system may be cyclohexyl or cyclobutyl ring.

It may be advantageous to separate reaction products from one another and/or from starting materials. The desired products of each step or series of steps is separated and/or purified (hereinafter separated) to the desired degree of homogeneity by the techniques common in the art. Typically such separations involve multiphase extraction, crystallization from a solvent or solvent mixture, distillation, sublimation, or chromatography. Chromatography can involve any number of methods including, for example: reverse-phase and normal phase; size exclusion; ion exchange; high, medium and low pressure liquid chromatography methods and apparatus; small scale analytical; simulated moving bed ("SMB") and preparative thin or thick layer chromatography, as well as techniques of small scale thin layer and flash chromatography. One skilled in the art will apply techniques most likely to achieve the desired separation.

"Diastereomers" refers to stereoisomers of a compound with two or more chiral centers but which are not mirror images of one another. Diastereomeric mixtures can be separated into their individual diastereomers on the basis of their physical chemical differences by methods well known to those skilled in the art, such as by chromatography and/or fractional crystallization. Enantiomers can be separated by converting the enantiomeric mixture into a diastereomeric mixture by reaction with an appropriate optically active compound (e.g., chiral auxiliary such as a chiral alcohol or Mosher's acid chloride), separating the diastereomers and converting (e.g., hydrolyzing) the individual diastereoisomers to the corresponding pure enantiomers. Enantiomers can also be separated by use of a chiral HPLC column.

A single stereoisomer, e.g., a substantially pure enantiomer, may be obtained by resolution of the racemic mixture using a method such as formation of diastereomers using optically active resolving agents (Eliel, E. and Wilen, S. *Stereochemistry of Organic Compounds*. New York: John Wiley & Sons, Inc., 1994; Lochmuller, C. H., et al. "*Chromatographic resolution of enantiomers: Selective review.*" *J. Chromatogr.*, 113(3) (1975): pp. 283-302). Racemic mixtures of chiral compounds of the invention can be separated and isolated by any suitable method, including: (1) formation of ionic, diastereomeric salts with chiral compounds and separation by fractional crystallization or other methods, (2) formation of diastereomeric compounds with chiral derivatizing reagents, separation of the diastereomers, and conversion to the pure stereoisomers, and (3) separation of the substantially pure or enriched stereoisomers directly under chiral conditions. See: Wainer, Irving W., Ed. *Drug Stereochemistry: Analytical Methods and Pharmacology*. New York: Marcel Dekker, Inc., 1993.

"Pharmaceutically acceptable salts" refers to those salts which are, within the scope of sound medical judgment, suitable for use in contact with the tissues of humans and lower animals without undue toxicity, irritation, allergic response and the like, and are commensurate with a reasonable benefit/risk ratio. A pharmaceutically acceptable salt may be prepared in situ during the final isolation and purification of the compounds disclosed herein, or separately by reacting the free base function with a suitable organic acid or by reacting the acidic group with a suitable base.

In addition, if a compound disclosed herein is obtained as an acid addition salt, the free base can be obtained by basifying a solution of the acid salt. Conversely, if the product is a free base, an addition salt, such as a pharmaceutically acceptable addition salt, may be produced by dissolving the free base in a suitable organic solvent and treating the solution with an acid, in accordance with conventional procedures for preparing acid addition salts from base compounds. Those skilled in the art will recognize various synthetic methodologies that may be used without undue experimentation to prepare non-toxic pharmaceutically acceptable addition salts.

As defined herein, "a pharmaceutically acceptable salt thereof" include salts of at least one compound of Formula (I), and salts of the stereoisomers of the compound of Formula (I), such as salts of enantiomers, and/or salts of diastereomers.

The terms "administration", "administering", "treating" and "treatment" herein, when applied to an animal, human, experimental subject, cell, tissue, organ, or biological fluid, mean contact of an exogenous pharmaceutical, therapeutic, diagnostic agent, or composition to the animal, human, subject, cell, tissue, organ, or biological fluid. Treatment of a cell encompasses contact of a reagent to the cell, as well as contact of a reagent to a fluid, where the fluid is in contact with the cell. The term "administration" and "treatment"

also means in vitro and ex vivo treatments, e.g., of a cell, by a reagent, diagnostic, binding compound, or by another cell. The term "subject" herein includes any organism, preferably an animal, more preferably a mammal (e.g., rat, mouse, dog, cat, and rabbit) and most preferably a human.

The term "effective amount" or "therapeutically effective amount" refers to an amount of the active ingredient, such as compound that, when administered to a subject for treating a disease, or at least one of the clinical symptoms of a disease or disorder, is sufficient to affect such treatment for the disease, disorder, or symptom. The "therapeutically effective amount" can vary with the compound, the disease, disorder, and/or symptoms of the disease or disorder, severity of the disease, disorder, and/or symptoms of the disease or disorder, the age of the subject to be treated, and/or the weight of the subject to be treated. An appropriate amount in any given instance can be apparent to those skilled in the art or can be determined by routine experiments. In some embodiments, "therapeutically effective amount" is an amount of at least one compound and/or at least one stereoisomer thereof, and/or at least one pharmaceutically acceptable salt thereof disclosed herein effective to "treat" as defined herein, a disease or disorder in a subject. In the case of combination therapy, the "therapeutically effective amount" refers to the total amount of the combination objects for the effective treatment of a disease, a disorder or a condition.

The pharmaceutical composition comprising the compound disclosed herein can be administrated via oral, inhalation, rectal, parenteral or topical administration to a subject in need thereof. For oral administration, the pharmaceutical composition may be a regular solid formulation such as tablets, powder, granule, capsules and the like, a liquid formulation such as water or oil suspension or other liquid formulation such as syrup, solution, suspension or the like; for parenteral administration, the pharmaceutical composition may be solution, water solution, oil suspension concentrate, lyophilized powder or the like. Preferably, the formulation of the pharmaceutical composition is selected from tablet, coated tablet, capsule, suppository, nasal spray or injection, more preferably tablet or capsule. The pharmaceutical composition can be a single unit administration with an accurate dosage. In addition, the pharmaceutical composition may further comprise additional active ingredients.

All formulations of the pharmaceutical composition disclosed herein can be produced by the conventional methods in the pharmaceutical field. For example, the active ingredient can be mixed with one or more excipients, then to make the desired formulation. The "pharmaceutically acceptable excipient" refers to conventional pharmaceutical carriers suitable for the desired pharmaceutical formulation, for example: a diluent, a vehicle such as water, various organic solvents, etc., a filler such as starch, sucrose, etc. a binder such as cellulose derivatives, alginates, gelatin and polyvinylpyrrolidone (PVP); a wetting agent such as glycerol; a disintegrating agent such as agar, calcium carbonate and sodium bicarbonate; an absorption enhancer such as quaternary ammonium compound; a surfactant such as hexadecanol; an absorption carrier such as Kaolin and soap clay; a lubricant such as talc, calcium stearate, magnesium stearate, polyethylene glycol, etc. In addition, the pharmaceutical composition further comprises other pharmaceutically acceptable excipients such as a decentralized agent, a stabilizer, a thickener, a complexing agent, a buffering agent, a permeation enhancer, a polymer, aromatics, a sweetener, and a dye.

The term "disease" refers to any disease, discomfort, illness, symptoms or indications, and can be interchangeable with the term "disorder" or "condition".

Throughout this specification and the claims which follow, unless the context requires otherwise, the term "comprise", and variations such as "comprises" and "comprising" are intended to specify the presence of the features thereafter, but do not exclude the presence or addition of one or more other features. When used herein the term "comprising" can be substituted with the term "containing", "including" or sometimes "having".

Throughout this specification and the claims which follow, the term "$C_{n-m}$" indicates a range which includes the endpoints, wherein n and m are integers and indicate the number of carbons. Examples include $C_{1-8}$, $C_{1-6}$, and the like.

Unless specifically defined elsewhere in this document, all other technical and scientific terms used herein have the meaning commonly understood by one of ordinary skill in the art to which this invention belongs.

General Synthesis

Compounds disclosed herein, including salts thereof, can be prepared using known organic synthesis techniques and can be synthesized according to any of numerous possible synthetic routes.

The reaction for preparing compounds disclosed herein can be carried out in suitable solvents which can be readily selected by one of skill in the art of organic synthesis. Suitable solvents can be substantially non-reactive with the starting materials, the intermediates, or products at the temperatures at which the reactions are carried out, e.g., temperatures which can range from the solvent's boiling temperature. A given reaction can be carried out in one solvent or mixture of solvents.

The selection of appropriate protecting group, can be readily determined by one skilled in the art. Reactions can be monitored according to any suitable method known in the art, such as NMR, UV, HPLC, LC-MS and TLC. Compounds can be purified by a variety of methods, including HPLC and normal phase silica chromatography.

Chiral analytic HPLC was used for the retention time analysis of different chiral examples, the conditions were divided into the methods as below according to the column, mobile phase, solvent ratio used.

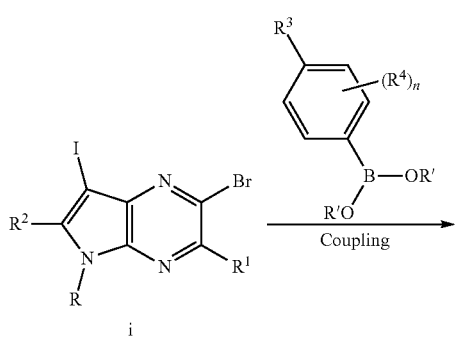

Scheme I

33

-continued

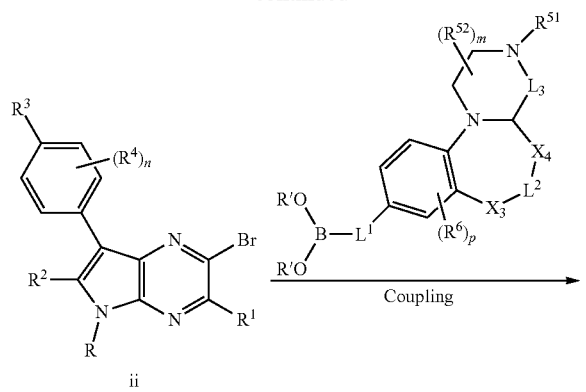

ii

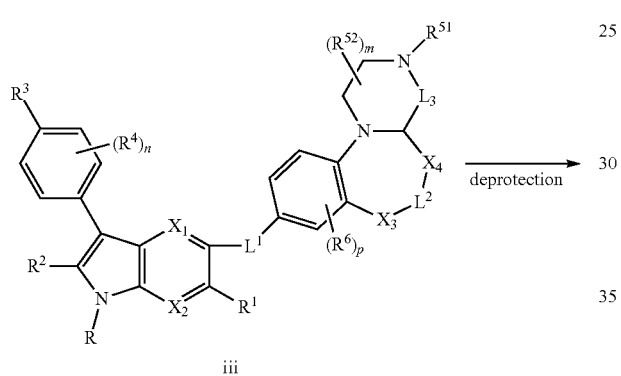

iii

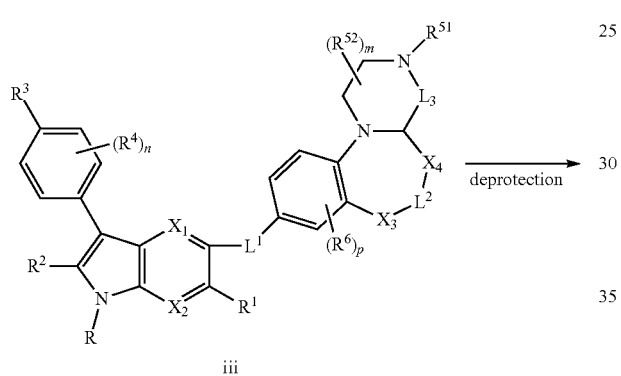

iv

R = Boc or sulfonyl
R' = H or alkyl

For example, compounds of Formula (I) can be formed as shown in Scheme I. Compound (i) can be reacted with boronic acid or boronic ester using transition metal catalyzed reaction to give compound (ii); compound (ii) can be reacted with boronic acid or boronic ester using transition

34 metal-catalyzed reaction to give compound (iii); compound (iii) can be deprotected in situ or stepwise to give compound (iv) [i.e., Formula (I)].

Scheme II

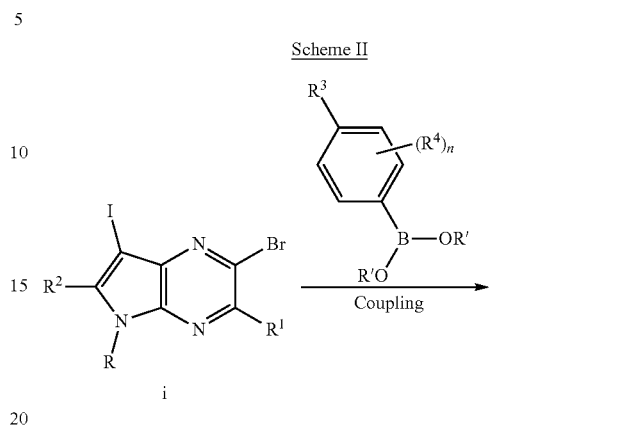

i ii

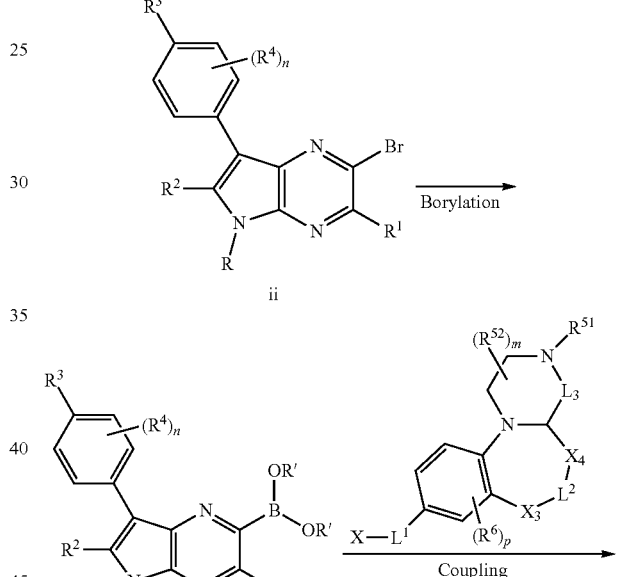

iii iv

-continued

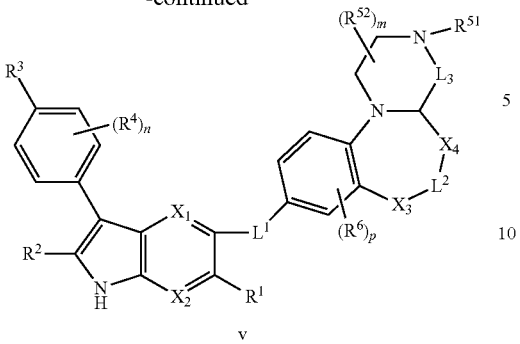

R = Boc or sulfonyl
R' = H or alkyl
X = Cl or Br or I

For example, compounds of Formula (I) can be formed as shown in Scheme II. Compound (i) can be reacted with boronic acid or boronic ester using transition metal catalyzed reaction to give compound (ii); compound (ii) can be borylated to give compound (iii); compound (iii) can be reacted with boronic acid or boronic ester using transition metal catalyzed reaction to give compound (iv); compound (iv) can be deprotected in situ or stepwise to give compound (v) [i.e., Formula (I)].

ABBREVIATIONS

Ts p-toluenesulfonyl (tosyl)
THF tetrahydrofuran
LDA lithium diisopropylamide
DMF N,N-dimethylformamide
Et ethyl
Ac acetyl
PE petroleum ether
NMR nuclear magnetic resonance
LC-MS liquid chromatograph mass spectrometer
TFA trifluoroacetic acid
Me methyl
DCM dichloromethane
dppf 1,1'-bis(diphenylphosphino)ferrocene
Xphos 2-Dicyclohexylphosphino-2',4',6'-triisopropylbiphenyl
TLC thin-layer chromatography
HATU 2-(7-azabenzotriazol-1-yl)-N,N,N',N'-tetramethyluronium hexafluorophosphate
DIPEA N,N-diisopropylethylamine
TBS tert-butyldimethylsilyl
UV ultraviolet
TBAF tetra-n-butylammonium fluoride
HPLC high performance liquid chromatography
DMSO dimethyl sulfoxide
DEA diethylamine
MtBE methyl tert-butyl ether
Boc tert-butyloxycarbonyl Example 1

4-(5-(3,10-dimethyl-2,3,4,4a,5,6-hexahydro-1H-pyrazino[1,2-a]quinolin-8-yl)-1H-pyrrolo[2,3-b]pyridin-3-yl)-N,N-dimethylbenzamide

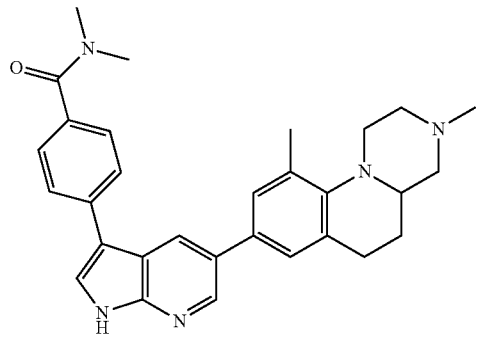 [SMILES: Cc1cc(-c2cnc3[nH]cc(-c4ccc(C(=O)N(C)C)cc4)c3c2)cc2c1N1CCN(C)CC1CC2]

Step 1: 5-bromo-2-fluoro-3-methylbenzaldehyde

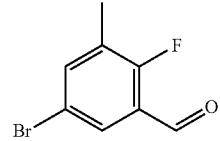

To a solution of 4-bromo-1-fluoro-2-methylbenzene (50 g, 264.6 mmol) in anhydrous THF (500 mL) was added LDA (2 N in THF, 344 mmol) dropwise at −78° C. under N₂. The reaction mixture was stirred at −78° C. for 0.5 h, then DMF (50 mL) was added dropwise at −78° C. The reaction mixture was stirred for another 0.5 h. The reaction was quenched with saturated NH₄Cl solution (500 mL) while the internal temperature was controlled between −60~30° C. The pH of the mixture was adjusted to 1 with 1 N HCl and the mixture was extracted with EtOAc (200 mL×3). Combined organic phase was dried over Na₂SO₄, filtered and evaporated in vacuo. The residue was purified by silica gel chromatography (EtOAc:PE=1:100) to give the title compound (38 g, 66%). ¹H NMR (400 MHz, CDCl₃) δ 10.29 (s, 1H), 7.86-7.74 (m, 1H), 7.63-7.51 (m, 1H), 2.33 (s, 3H).

Step 2: ethyl 4-(5-bromo-2-fluoro-3-methylphenyl)-4-hydroxybut-2-ynoate

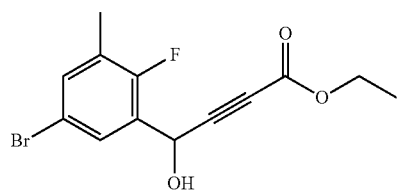 [SMILES: CCOC(=O)C#CC(O)c1cc(Br)cc(C)c1F]

To a solution of ethyl propiolate (18.9 g, 193 mmol) in THF (200 mL) was added LDA (2 N in THF, 194 mmol) dropwise at −78° C. under N₂. After being stirred for 0.5 h, 5-bromo-2-fluoro-3-methylbenzaldehyde (38 g, 175 mmol)

in THF (100 mL) was added dropwise. The reaction mixture was stirred at −78° C. for 0.5 h at which time the cooling bath was removed. The mixture was stirred for an additional 1 h, then quenched with saturated NH₄Cl (100 mL). The mixture was extracted with EtOAc (200 mL×3). The combined organic layer was washed with brine, dried over Na₂SO₄, filtered, and concentrated. The residue was purified by silica gel chromatography (EtOAc:PE=1:10) to give the title compound (40 g, 67%). ¹H NMR (400 MHz, CDCl₃) δ 7.58-7.49 (m, 1H), 7.36-7.29 (m, 1H), 5.77 (s, 1H), 4.25 (q, J=7.1 Hz, 2H), 3.85-3.15 (m, 1H), 2.26 (s, 3H), 1.31 (t, J=7.1 Hz, 3H).

Step 3: ethyl (E)-4-(5-bromo-2-fluoro-3-methylphenyl)-4-oxobut-2-enoate

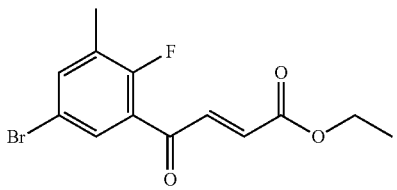 [SMILES: CCOC(=O)/C=C/C(=O)c1cc(Br)cc(C)c1F]

To a solution of ethyl 4-(5-bromo-2-fluoro-3-methylphenyl)-4-hydroxybut-2-ynoate (40 g, 127 mmol) in dioxane (250 mL) was added Et₃N (32 g, 317 mmol). The mixture was heated to 60° C. and stirred for 16 h. The reaction was cooled to room temperature and washed with water (200 mL). The aqueous layer was extracted with EtOAc (200 mL×3). The combined organic layer was washed with brine, dried over Na₂SO₄, filtered and concentrated. The residue was purified by silica gel chromatography (EtOAc:PE=1:10) to give the title compound (30 g, 75%). ¹H NMR (400 MHz, CDCl₃) δ 7.74-7.64 (m, 2H), 7.56-7.51 (m, 1H), 6.86-6.76 (m, 1H), 4.29 (q, J=7.1 Hz, 2H), 2.32 (d, J=2.3 Hz, 3H), 1.34 (t, J=7.1 Hz, 3H).

Step 4: 8-bromo-10-methyl-2,3,4a,5-tetrahydro-1H-pyrazino[1,2-a]quinoline-4,6-dione

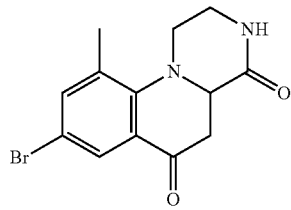 [SMILES: Cc1cc(Br)cc2c1N1CCNC(=O)C1CC2=O]

To a solution of ethyl (E)-4-(5-bromo-2-fluoro-3-methylphenyl)-4-oxobut-2-enoate (57 g, 181 mmol) in DMF (400 mL) was added 1,2-diaminoethane (14.1 g, 235 mmol). The reaction mixture was stirred at 60° C. for 18 h. The mixture was cooled to room temperature and concentrated under reduced pressure. The crude was partitioned between EtOAc (200 mL) and water (200 mL). The aqueous layer was extracted with EtOAc (200 mL×2). The combined organic layer was washed with brine, dried over Na₂SO₄, filtered and concentrated. The residue was purified by silica gel chromatography (EtOAc:PE=1:1) to give the compound (19.5 g, 35%). LC-MS (M+H)⁺=308.8, 310.9.

Step 5: 8-bromo-10-methyl-2,3,5,6-tetrahydro-1H-pyrazino[1,2-a]quinolin-4(4aH)-one

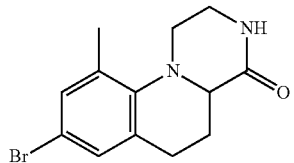 [SMILES: Cc1cc(Br)cc2c1N1CCNC(=O)C1CC2]

A mixture of 8-bromo-10-methyl-2,3,4a,5-tetrahydro-1H-pyrazino[1,2-a]quinoline-4,6-dione (5 g, 16.2 mmol) and Et₃SiH (15 mL) in TFA (60 mL) was stirred overnight at room temperature. The reaction mixture was concentrated in vacuo. The residue was triturated with water (200 mL) with rapid stirring for 0.5 h. The precipitate was collected by filtration, then triturated with EtOAc (30 mL) with rapid stirring for 0.5 h. The precipitate was collected by filtration and dried in vacuo to give the title compound (3.7 g, 77%). ¹H NMR (400 MHz, DMSO-d6) δ 8.01-7.92 (m, 1H), 7.21-7.16 (m, 1H), 7.12-7.07 (m, 1H), 3.51-3.34 (m, 2H), 3.13-3.00 (m, 2H), 2.88-2.77 (m, 3H), 2.21 (s, 3H), 2.01-1.88 (m, 2H). LC-MS (M+H)⁺=294.9, 296.9.

Step 6: 8-bromo-10-methyl-2,3,4,4a,5,6-hexahydro-1H-pyrazino[1,2-a]quinoline

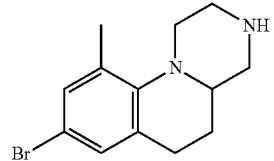 [SMILES: Cc1cc(Br)cc2c1N1CCNCC1CC2]

To a solution of 8-bromo-10-methyl-2,3,5,6-tetrahydro-1H-pyrazino[1,2-a]quinolin-4(4aH)-one (3.7 g, 12.6 mmol) in THF (100 mL) was added borane-THF (38 mL, 1.0 M, 38 mmol). The mixture was stirred at 60° C. for 2 h under N₂. The mixture was cooled to room temperature and quenched by addition of MeOH (50 mL) dropwise. 2N HCl (100 mL) was added and the resulting mixture was stirred at 60° C. overnight. The reaction mixture was concentrated to small volume (100 mL). The pH of the mixture was adjusted to 8 to 9 by addition of sat. NaHCO₃. The solution was extracted with EtOAc (100 mL×3). The combined organic layer was washed with brine, dried over Na₂SO₄, filtered and concentrated to give the title compound (5.5 g, crude). The material was used in step 7 without further purification. LC-MS (M+H)⁺=280.9, 282.9.

Step 7: 8-bromo-3,10-dimethyl-2,3,4,4a,5,6-hexahydro-1H-pyrazino[1,2-a]quinoline

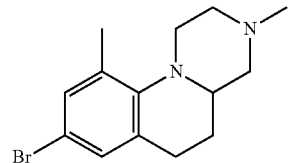 [SMILES: Cc1cc(Br)cc2c1N1CCN(C)CC1CC2]

To a solution of crude 8-bromo-10-methyl-2,3,4,4a,5,6-hexahydro-1H-pyrazino[1,2-a]quinoline (5.5 g, 12.6 mmol) in MeOH (100 mL) was added formalin (10.2 g, 37% in water, 126 mmol) and NaBH(OAc)$_3$ (4.0 g, 18.9 mmol). The resulting solution was stirred at room temperature for 0.5 h. Water (100 mL) was added and the mixture was extracted with EtOAc (100 mL×3). The combined organic layer was washed with brine, dried over Na$_2$SO$_4$, filtered and concentrated. The residue was purified by silica gel chromatography (DCM:MeOH=20:1) to give the title compound (3.56 g, 96% over 2 steps). LC-MS (M+H)$^+$=294.9, 296.9.

Step 8: tert-butyl 5-bromo-3-iodo-1H-pyrrolo[2,3-b]pyridine-1-carboxylate

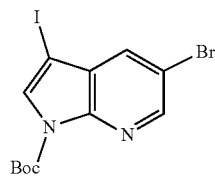

5-bromo-1H-pyrrolo[2,3-b]pyridine (5.3 g, 26.9 mmol) and NIS (6.4 g, 28.2 mmol) was added to a solution of 5-bromo-1H-pyrrolo[2,3-b]pyridine (5.3 g, 26.9 mmol) in THF (100 mL). The reaction mixture was stirred at room temperature for 2 h, then (Boc)$_2$O (7.6 g, 35.0 mmol) and Et$_3$N (11 mL, 80.7 mmol) was sequentially added. The reaction mixture was heated to 60° C. and stirred for 4 h. Water (100 mL) was added and the mixture was extracted with EtOAc (100 mL×3). Combined organic layer was washed with brine (100 mL), dried over Na$_2$SO$_4$, filtered and concentrated in vacuo. The residue was triturated in PE to give the title compound (11.4 g, 100%). LCMS (M+H)$^+$=422.6.

Step 9: tert-butyl 5-bromo-3-(4-(dimethylcarbamoyl)phenyl)-1H-pyrrolo[2,3-b]pyridine-1-carboxylate

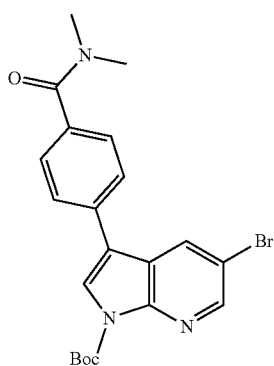 [SMILES: CN(C)C(=O)c1ccc(-c2cn(C(=O)OC(C)(C)C)c3ncc(Br)cc23)cc1]

To a solution of tert-butyl 5-bromo-3-iodo-1H-pyrrolo[2,3-b]pyridine-1-carboxylate (4.0 g, 9.5 mmol) and (4-(dimethylcarbamoyl)phenyl)boronic acid (1.8 g, 9.5 mmol) in dioxane (100 mL) and water (20 mL) was added Pd(dppf)Cl$_2$ (350 mg, 0.47 mmol) and K$_2$CO$_3$ (2.0 g, 14.2 mmol) under N$_2$. The reaction mixture was heated to refluxed overnight. The mixture was cooled to room temperature and the solvent was removed in vacuo. The residue was purified by silica gel chromatography with EtOAc to give the title compound (1.86 g, 44%). LCMS (M+H)$^+$=444.0.

Step 10: tert-butyl 3-(4-(dimethylcarbamoyl)phenyl)-5-(4,4,5,5-tetramethyl-1,3,2-dioxaborolan-2-yl)-1H-pyrrolo[2,3-b]pyridine-1-carboxylate

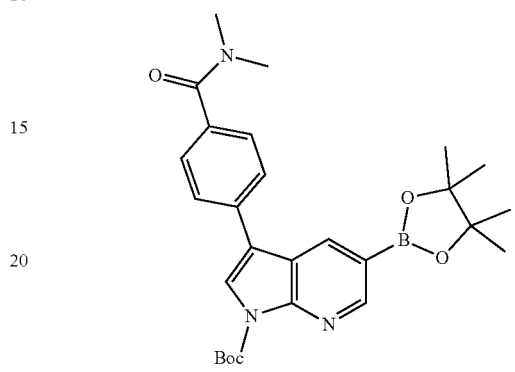

To a solution of tert-butyl 5-bromo-3-(4-(dimethylcarbamoyl)phenyl)-1H-pyrrolo[2,3-b]pyridine-1-carboxylate (1.86 g, 4.2 mmol) and 4,4,4',4',5,5,5',5'-octamethyl-2,2'-bi(1,3,2-dioxaborolane) (1.65 g, 6.5 mmol) in dioxane (50 mL) was added Pd(dppf)Cl$_2$ (200 mg, 0.27 mmol) and AcOK (800 mg, 8.1 mmol) under N$_2$. The reaction mixture was heated to reflux overnight. The reaction mixture was cooled to room temperature and solvent was removed in vacuo. The residue was purified by silica gel chromatography (DCM:MeOH=20:1) to give the title compound (1.0 g, 48%). LC-MS (M+H)$^+$=492.0.

Step 11: 4-(5-(3,10-dimethyl-2,3,4,4a,5,6-hexahydro-1H-pyrazino[1,2-a]quinolin-8-yl)-1H-pyrrolo[2,3-b]pyridin-3-yl)-N,N-dimethylbenzamide

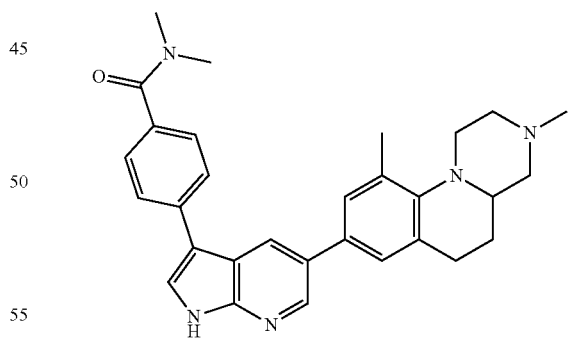

To a solution of tert-butyl 3-(4-(dimethylcarbamoyl)phenyl)-5-(4,4,5,5-tetramethyl-1,3,2-dioxaborolan-2-yl)-1H-pyrrolo[2,3-b]pyridine-1-carboxylate (225 mg, 0.459 mmol) and 8-bromo-3,10-dimethyl-2,3,4,4a,5,6-hexahydro-1H-pyrazino[1,2-a]quinoline (135 mg, 0.459 mmol) in 1,4-dioxane (10 mL) and H$_2$O (10 mL) was added XPhos Pd G2 (36 mg, 0.046 mmol) and K$_3$PO$_4$ (195 mg, 0.918 mmol). The resulting mixture was stirred at 80° C. under N$_2$ overnight. Water (10 mL) was added and the mixture was extracted with EtOAc (10 mL×3). The combined organic layer was washed with brine, dried over Na$_2$SO$_4$, filtered and concentrated. The residue was purified by silica gel chromatography (DCM:MeOH=20:1), and then purified by prep-TLC (DCM:MeOH=10:1) to give Example 1 (16 mg, 7%). $^1$H NMR (400 MHz, CDCl$_3$) δ 9.97 (s, 1H), 8.54 (s, 1H), 8.32 (s, 1H), 7.77-7.64 (m, 2H), 7.62-7.48 (m, 3H), 7.26 (s, 1H), 7.19 (s, 1H), 3.54-3.27 (m, 2H), 3.26-2.77 (m, 14H), 2.78-2.47 (m, 4H), 2.36 (s, 3H). LC-MS (M+H)$^+$=479.9.

Example 2A/2B 4-(5-((R)-3,10-dimethyl-2,3,4,4a,5,6-hexahydro-1H-pyrazino[1,2-a]quinolin-8-yl)-1H-pyrrolo[2,3-b]pyridin-3-yl)-N—((S)-2-hydroxypropyl)-N-methyl-benzamide & 4-(5-((S)-3,10-dimethyl-2,3,4,4a,5,6-hexahydro-1H-pyrazino[1,2-a]quinolin-8-yl)-1H-pyrrolo[2,3-b]pyridin-3-yl)-N—((S)-2-hydroxypropyl)-N-methylbenzamide

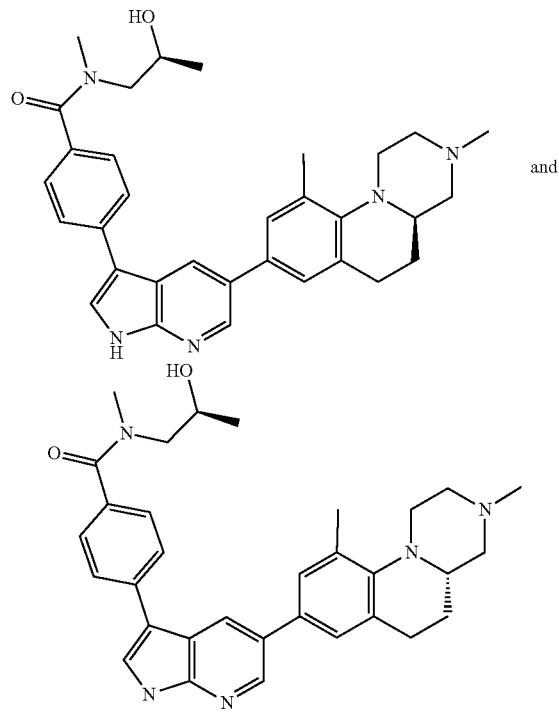

and

Step 1: 4-bromo-N-[(2S)-2-hydroxypropyl]benzamide

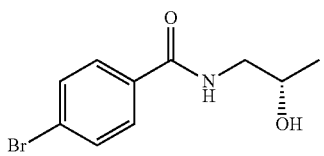

To solution of 4-bromobenzoic acid (11.80 g, 55.8 mmol) in DMF (120 mL) was added DIPEA (10.50 g, 104 mmol), HATU (22.40 g, 58.9 mmol) and (2S)-1-aminopropan-2-ol (4.00 g, 53.3 mmol). The resulting mixture was stirred for 6 h at room temperature. The reaction was quenched by addition of water. The resulting mixture was extracted with EtOAc (600 mL×3). The combined organic layers were washed with brine (100 mL), dried over anhydrous Na$_2$SO$_4$. After filtration, the filtrate was concentrated under reduced pressure. The residue was purified by silica gel column chromatography, eluted with PE/EtOAc (30:70) to give the title compound (12.0 g, 88%). LC-MS (M+H)$^+$=258.1

Step 2: 4-bromo-N-[(2S)-2-[(tert-butyldimethylsilyl)oxy]propyl]benzamide

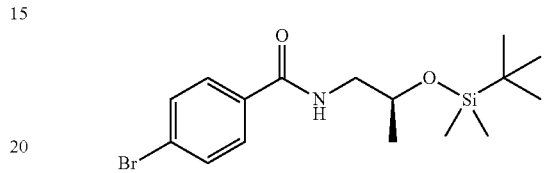

To a stirred mixture of 4-bromo-N-[(2S)-2-hydroxypropyl]benzamide (12.0 g, 46.7 mmol) and TBSCl (15.0 g, 59.0 mmol) in DCM (150 mL) was added Et$_3$N (15.0 g, 149 mmol) dropwise at 0° C. The resulting mixture was stirred for 15 h at room temperature. The reaction was quenched by addition of water. The resulting mixture was extracted with DCM (500 mL×3). The combined organic layers were washed with brine (100 mL), dried over anhydrous Na$_2$SO$_4$. After filtration, the filtrate was concentrated under reduced pressure to provide the title compound (19.0 g, crude). The crude product was used in step 3 directly without further purification. LC-MS (M+H)$^+$=372.2.

Step 3: 4-bromo-N-[(2S)-2-[(tert-butyldimethylsilyl)oxy]propyl]-N-methylbenzamide

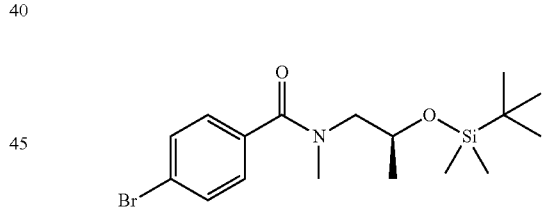

To a stirred solution of 4-bromo-N-[(2S)-2-[(tert-butyldimethylsilyl)oxy]propy]benzamide (19.0 g, crude from step 2) in DMF (120 mL) was added NaH (5.10 g, 60% in mineral oil, 127 mmol) in portions at 0° C. under nitrogen atmosphere. The resulting mixture was stirred for 30 min then CH$_3$I (9.50 g, 63.6 mmol) was added dropwise at 0° C. The resulting mixture was stirred for 3 h at room temperature under nitrogen atmosphere. The reaction was quenched with ice water at 0° C. The resulting mixture was extracted with EtOAc (700 mL×3). The combined organic layer was washed with brine (150 mL), dried over anhydrous Na$_2$SO$_4$. After filtration, the filtrate was concentrated under reduced pressure to give the title compound (18.0 g, crude). The crude product was used in step 4 directly without further purification. LC-MS (M+H)$^+$=386.3.

Step 4: 4-bromo-N-[(2S)-2-hydroxypropyl]-N-methylbenzamide

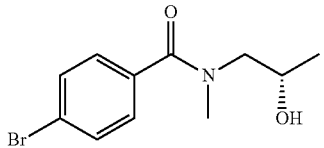

To a solution of 4-bromo-N-[(2S)-2-[(tert-butyldimethylsilyl)oxy]propyl]-N-methylbenzamide (18.0 g, crude from step 3) in THF (200 mL) was added TBAF (1.0 M in THF, 70 mL, 70 mmol). The resulting mixture was stirred for 15 h at room temperature. The reaction mixture was concentrated under vacuum and the residue was purified by silica gel column chromatography, eluted with EtOAc to give the title compound (8.3 g, 65% over 3 steps). LC-MS (M+H)$^+$=272.0.

Step 5: N-[(2S)-2-hydroxypropyl]-N-methyl-4-(4,4,5,5-tetramethyl-1,3,2-dioxaborolan-2-yl)benzamide

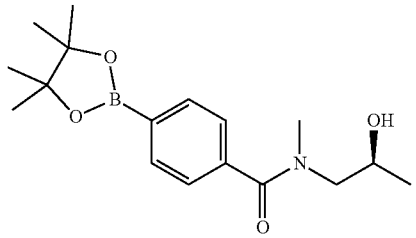 [SMILES: C[C@H](O)CN(C)C(=O)c1ccc(B2OC(C)(C)C(C)(C)O2)cc1]

To a solution of 4-bromo-N-[(2S)-2-hydroxypropyl]-N-methylbenzamide (8.3 g, 30.5 mmol) and 4,4,4',4',5,5,5',5'-octamethyl-2,2'-bi(1,3,2-dioxaborolane) (12.0 g, 44.9 mmol) in dioxane (200 mL) was added Pd(dppf)Cl$_2$.DCM (2.60 g, 3.02 mmol) and KOAc (9.30 g, 90.0 mmol). The reaction mixture was stirred for 3 h at 100° C. under nitrogen atmosphere. The mixture was cooled down to room temperature then filtered. The filter cake was rinsed with dioxane (10 mL×3). The filtrate was concentrated under reduced pressure. The residue was purified by silica gel column chromatography, eluted with EtOAc to give the title compound (7.8 g, 80%). LC-MS (M+H)$^+$=320.2.

Step 6: 5-bromo-3-iodo-1-(phenylsulfonyl)-1H-pyrrolo[2,3-b]pyridine

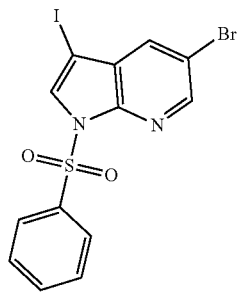 [SMILES: O=S(=O)(c1ccccc1)n1cc(I)c2cc(Br)cnc21]

To a solution of 5-bromo-3-iodo-1H-pyrrolo[2,3-b]pyridine (43.3 g, 134.1 mmol) in DMF (300 mL) was added NaH (60%, 7.0 g, 175 mmol) at 0° C. in portions. The mixture was stirred at 0° C. for 30 min. To the mixture was added benzenesulfonyl chloride (35.5 g, 201 mmol) dropwise at 0° C. and the mixture was stirred at room temperature for 3 h. The reaction was quenched with water (300 mL). The precipitate was collected by filtration, washed with water (50 mL×5) and dried under vacuum to give the title compound (65.0 g, 100%). LC-MS (M+H)$^+$=462.6, 464.5.

Step 7: (S)-4-(5-bromo-1H-pyrrolo[2,3-b]pyridin-3-yl)-N-(2-hydroxypropyl)-N-methylbenzamide

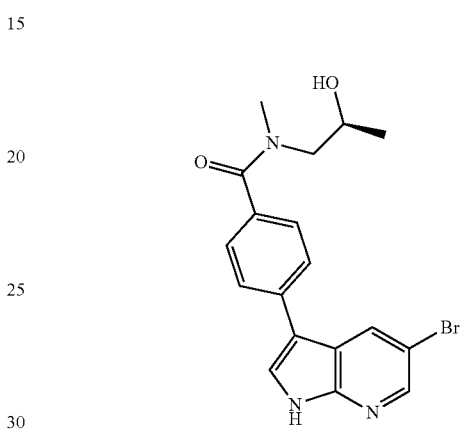

To a mixture of 5-bromo-3-iodo-1-(phenylsulfonyl)-1H-pyrrolo[2,3-b]pyridine (1.0 g, 2.16 mmol), N-[(2S)-2-hydroxypropyl]-N-methyl-4-(4,4,5,5-tetramethyl-1,3,2-dioxaborolan-2-yl)benzamide (689 mg, 2.16 mmol) and K$_2$CO$_3$ (596 mg, 4.32 mmol) in 1,4-dioxane (20 mL) and water (20 mL) was added Pd(dppf)Cl$_2$.DCM (176 mg, 0.216 mmol). The reaction mixture was stirred at 80° C. under N$_2$ overnight. Water (20 mL) was added and the mixture was extracted with EtOAc (20 mL×3). The combined organic layer was washed with brine, dried over Na$_2$SO$_4$, filtered and concentrated. The crude was purified by silica gel chromatography (DCM:MeOH=30:1~20:1) to give the title compound (330 mg, 45%). LC-MS (M+H)$^+$=387.8, 389.8.

Step 8: 3,10-dimethyl-8-(4,4,5,5-tetramethyl-1,3,2-dioxaborolan-2-yl)-2,3,4,4a,5,6-hexahydro-1H-pyrazino[1,2-a]quinoline

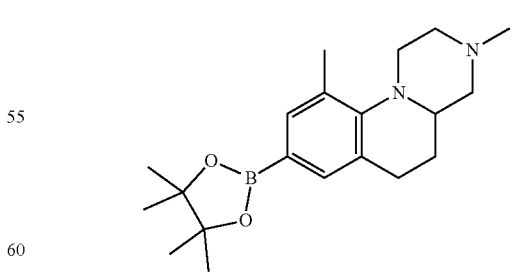

To a solution of 8-bromo-3,10-dimethyl-2,3,4,4a,5,6-hexahydro-1H-pyrazino[1,2-a]quinoline (2.0 g, 6.78 mmol) in 1,4-dioxane (100 mL) was added 4,4,4',4',5,5,5',5'-octamethyl-2,2'-bi(1,3,2-dioxaborolane) (2.58 g, 10.2 mmol) and Pd(dppf)Cl$_2$.DCM (277 mg, 0.339 mmol) and KOAc (1.33 g, 13.56 mmol). The solution was stirred at 90° C. under N₂ overnight. Water (100 mL) was added and the mixture was extracted with EtOAc (100 mL×3). The combined organic layer was washed with brine, dried over Na₂SO₄, filtered and concentrated. The residue was purified by silica gel chromatography (DCM:MeOH=20:1) to give the title compound (1.93 g, 83%). LC-MS (M+H)⁺=343.1.

Step 9: 4-(5-((R)-3,10-dimethyl-2,3,4,4a,5,6-hexahydro-1H-pyrazino[1,2-a]quinolin-8-yl)-1H-pyrrolo[2,3-b]pyridin-3-yl)-N—((S)-2-hydroxypropyl)-N-methylbenzamide & 4-(5-((S)-3,10-dimethyl-2,3,4,4a,5,6-hexahydro-1H-pyrazino[1,2-a]quinolin-8-yl)-1H-pyrrolo[2,3-b]pyridin-3-yl)-N—((S)-2-hydroxypropyl)-N-methylbenzamide

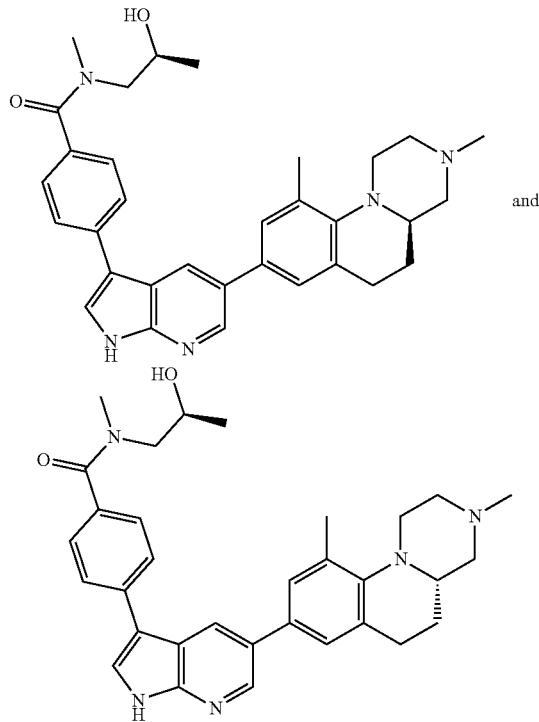

To a solution of (S)-4-(5-bromo-1H-pyrrolo[2,3-b]pyridin-3-yl)-N-(2-hydroxypropyl)-N-methylbenzamide (330 mg, 0.853 mmol) and 3,10-dimethyl-8-(4,4,5,5-tetramethyl-1,3,2-dioxaborolan-2-yl)-2,3,4,4a,5,6-hexahydro-1H-pyrazino[1,2-a]quinoline (292 mg, 0.853 mmol) in 1,4-dioxane (10 mL) and water (10 mL) was added XPhos Pd G2 (67 mg, 0.085 mmol) and K₃PO₄ (362 mg, 1.71 mmol). The reaction mixture was stirred at 80° C. under N₂ overnight. Water (10 mL) was added and the mixture was extracted with EtOAc (10 mL×3). The combined organic layer was washed with brine, dried over Na₂SO₄, filtered and concentrated. The crude was purified by silica gel chromatography (DCM:MeOH=10:1) to give the isomeric mixture (160 mg) which was then separated by chiral HPLC to give Example 2A/2B.

Example 2A: (55 mg, 12%) ¹H NMR (400 MHz, DMSO-d6) δ 12.01 (s, 1H), 8.49 (d, J=1.7 Hz, 1H), 8.37 (d, J=1.7 Hz, 1H), 7.97 (d, J=2.6 Hz, 1H), 7.87-7.78 (m, 2H), 7.52-7.46 (m, 2H), 7.34 (s, 1H), 7.27 (s, 1H), 4.92-4.76 (m, 1H), 4.05-3.80 (m, 1H), 3.55-3.42 (m, 0.5H), 3.37-3.27 (m, 1H), 3.22-3.12 (m, 0.5H), 3.09-2.81 (m, 8H), 2.65-2.56 (m, 2H), 2.48-2.42 (m, 1H), 2.34-2.24 (m, 4H), 2.24-2.12 (m, 4H), 1.65-1.52 (m, 1H), 1.17-0.88 (m, 3H). LC-MS (M+H)⁺ =524.0. tR on chiral-HPLC: 2.83 min.

Example 2B: (50 mg, 11%) ¹H NMR (400 MHz, DMSO-d6) δ 12.02 (s, 1H), 8.49 (s, 1H), 8.37 (s, 1H), 7.98 (d, J=2.4 Hz, 1H), 7.88-7.77 (m, 2H), 7.53-7.45 (m, 2H), 7.34 (s, 1H), 7.27 (s, 1H), 4.93-4.77 (m, 1H), 4.08-3.81 (d, J=39.0 Hz, 1H), 3.55-3.43 (m, 0.5H), 3.37-3.27 (m, 1H), 3.22-3.12 (m, 1H), 3.11-2.81 (m, 8H), 2.66-2.55 (m, 2H), 2.48-2.41 (m, 1H), 2.35-2.25 (m, 4H), 2.23-2.12 (m, 4H), 1.65-1.50 (d, J=12.9 Hz, 1H), 1.17-0.88 (m, 3H). LC-MS (M+H)⁺=524.0. tR on chiral-HPLC: 3.41 min.

Prep-HPLC Condition

| Column | CHIRALPAK AD |
|---|---|
| Column size | 2 cm × 25 cm, 5 μm |
| Injection | 0.3 mL |
| Mobile phase | Hexane(2 mM NH₃—MeOH):EtOH = 80:20 |
| Flow rate | 20 mL/min |
| Wavelength | UV 220 nm |

Chiral Analytical HPLC Condition

| Column | CHIRALPAK IH-3 |
|---|---|
| Column size | 0.46 cm × 5 cm, 3 μm |
| Injection | 5 μL |
| Mobile phase | Hexane(0.1% DEA):MtBE:MeOH = 20:70:10 |
| Flow rate | 1.0 mL/min |
| Wavelength | UV 220 nm |

Example 3A/3B 4-(5-((R)-3,10-dimethyl-2,3,4,4a,5,6-hexahydro-1H-pyrazino[1,2-a]quinolin-8-yl)-1H-pyrrolo[2,3-b]pyridin-3-yl)-N—((R)-2-hydroxypropyl)-N-methylbenzamide & 4-(5-((S)-3,10-dimethyl-2,3,4,4a,5,6-hexahydro-1H-pyrazino[1,2-a]quinolin-8-yl)-1H-pyrrolo[2,3-b]pyridin-3-yl)-N—((R)-2-hydroxypropyl)-N-methylbenzamide

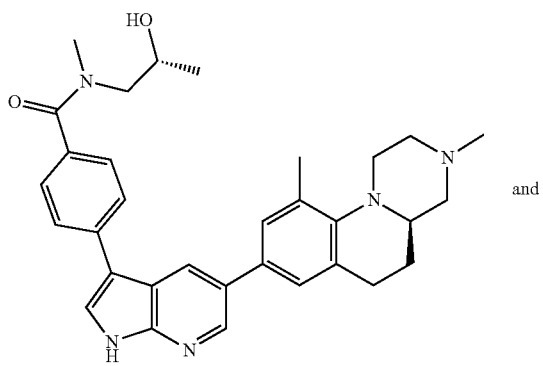

-continued

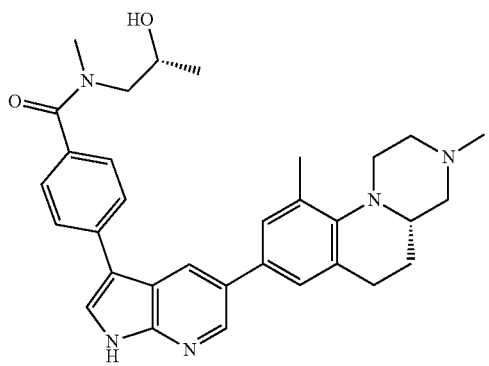

Step 1: 4-bromo-N-[(2R)-2-hydroxypropyl]benzamide

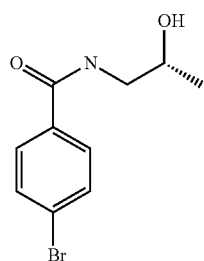

The title compound (4.63 g, 67%) was prepared in a manner similar to that in Example 2A/2B, Step 1 from 4-bromobenzoic acid and (2R)-1-aminopropan-2-ol. LC-MS (M+H)⁺=258.1.

Step 2: 4-bromo-N-[(2R)-2-[(tert-butyldimethylsilyl)oxy]propyl]benzamide

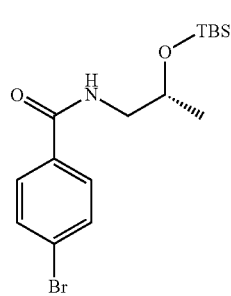

The title compound (12.1 g, 60%) was prepared in a manner similar to that in Example 2A/2B, Step 2 from 4-bromo-N-[(2R)-2-hydroxypropyl]benzamide and TBSC1. LC-MS (M+H)⁺=372.3.

Step 3: 4-bromo-N-[(2R)-2-[(tert-butyldimethylsilyl)oxy]propyl]-N-methylbenzamide

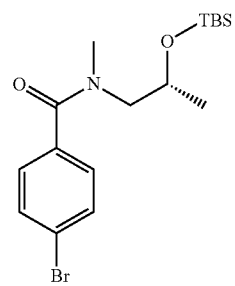

The title compound (9.79 g, 53%) was prepared in a manner similar to that in Example 2A/2B, Step 3 from 4-bromo-N-[(2R)-2-[(tert-butyldimethylsilyl)oxy]propy]benzamide and Met LC-MS (M+H)⁺=386.1.

Step 4: 4-bromo-N-[(2R)-2-hydroxyoropyl]-N-methylbenzamide

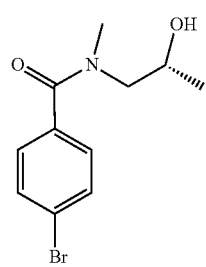

The title compound (5.48 g, 70%) was prepared in a manner similar to that in Example 2A/2B, Step 4 from 4-bromo-N-[(2R)-2-[(tert-butyldimethylsilyl)oxy]propyl]-N-methylbenzamide. LC-MS (M+H)⁺=272.0.

Step 5: (R)—N-(2-hydroxypropyl)-N-methyl-4-(4,4,5,5-tetramethyl-1,3,2-dioxaborolan-2-yl)benzamide

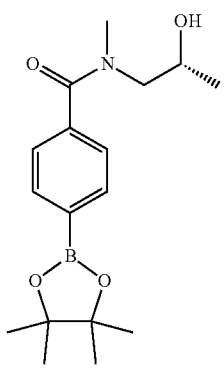 [SMILES: C[C@@H](O)CN(C)C(=O)c1ccc(B2OC(C)(C)C(C)(C)O2)cc1]

The title compound (3.75 g, 47%) was prepared in a manner similar to that in Example 2A/2B, Step 5 from 4-bromo-N-[(2R)-2-hydroxypropyl]-N-methylbenzamide. LC-MS (M+H)⁺=320.1.

Step 6: (R)-4-(5-bromo-1-(phenylsulfonyl)-1H-pyrrolo[2,3-b]pyridin-3-yl)-N-(2-hydroxypropyl)-N-methylbenzamide

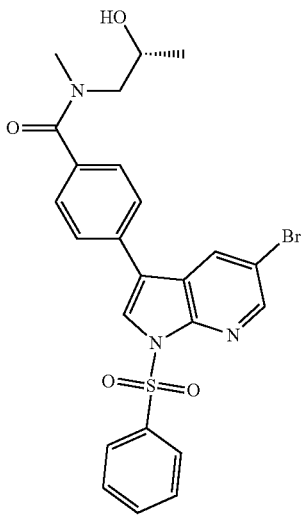 [SMILES: C[C@@H](O)CN(C)C(=O)c1ccc(-c2cn(S(=O)(=O)c3ccccc3)c3ncc(Br)cc23)cc1]

To a mixture of 5-bromo-3-iodo-1-(phenylsulfonyl)-1H-pyrrolo[2,3-b]pyridine (1.0 g, 2.16 mmol) and (R)—N-(2-hydroxypropyl)-N-methyl-4-(4,4,5,5-tetramethyl-1,3,2-dioxaborolan-2-yl)benzamide (689 mg, 2.16 mmol) and K₂CO₃ (596 mg, 4.32 mmol) in 1,4-dioxane (20 mL) and water (20 mL) was added XPhos Pd G2 (165 mg, 0.216 mmol). The reaction mixture was stirred at 50° C. under N₂ overnight. Water (20 mL) was added and the mixture was extracted with EtOAc (20 mL×3). The combined organic layer was washed with brine, dried over Na₂SO₄, filtered and concentrated. The residue was purified by silica gel chromatography (DCM:MeOH=30:1~20:1) to give the title compound (582 mg, 51%). LC-MS (M+H)⁺=527.7, 529.7

Step 7: 4-(5-(3,10-dimethyl-2,3,4,4a,5,6-hexahydro-1H-pyrazino[1,2-a]quinolin-8-yl)-1-(phenylsulfonyl)-1H-pyrrolo[2,3-b]pyridin-3-yl)-N-((R)-2-hydroxypropyl)-N-methylbenzamide

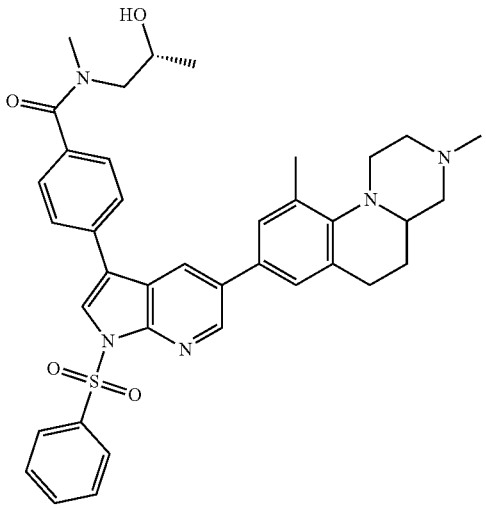 [SMILES: Cc1cc(-c2cnc3c(c2)c(-c2ccc(C(=O)N(C)C[C@@H](C)O)cc2)cn3S(=O)(=O)c2ccccc2)cc2c1N1CCN(C)CC1CC2]

To a solution of (R)-4-(5-bromo-1-(phenylsulfonyl)-1H-pyrrolo[2,3-b]pyridin-3-yl)-N-(2-hydroxypropyl)-N-methylbenzamide (582 mg, 1.10 mmol) and 3,10-dimethyl-8-(4,4,5,5-tetramethyl-1,3,2-dioxaborolan-2-yl)-2,3,4,4a,5,6-hexahydro-1H-pyrazino[1,2-a]quinoline (378 mg, 1.10 mmol) in 1,4-dioxane (20 mL) and water (20 mL) was added XPhos Pd G2 (87 mg, 0.11 mmol) and K₃PO₄ (468 mg, 2.21 mmol). The reaction mixture was stirred at 80° C. under N₂ overnight. Water (20 mL) was added and the mixture was extracted with EtOAc (20 mL×3). The combined organic layer was washed with brine, dried over Na₂SO₄, filtered and concentrated. The residue was purified by silica gel chromatography (DCM:MeOH=20:1) to give the title compound (437 mg, 60%). LC-MS (M+H)⁺=663.9

Step 8: 4-(5-((R)-3,10-dimethyl-2,3,4,4a,5,6-hexahydro-1H-pyrazino[1,2-a]quinolin-8-yl)-1H-pyrrolo[2,3-b]pyridin-3-yl)-N—((R)-2-hydroxypropyl)-N-methylbenzamide & 4-(5-((S)-3,10-dimethyl-2,3,4,4a,5,6-hexahydro-1H-pyrazino[1,2-a]quinolin-8-yl)-1H-pyrrolo[2,3-b]pyridin-3-yl)-N—((R)-2-hydroxypropyl)-N-methylbenzamide

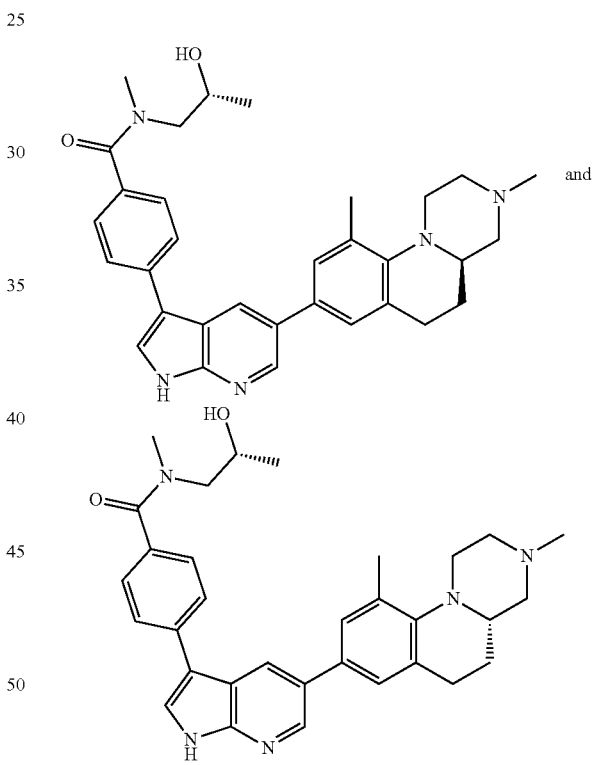

To a solution of 4-(5-(3,10-dimethyl-2,3,4,4a,5,6-hexahydro-1H-pyrazino[1,2-a]quinolin-8-yl)-1-(phenylsulfonyl)-1H-pyrrolo[2,3-b]pyridin-3-yl)-N—((R)-2-hydroxypropyl)-N-methylbenzamide (437 mg, 0.69 mmol) in MeOH (10 mL) was added K₂CO₃ (286 mg, 2.07 mmol). The resulting mixture was stirred at room temperature for 3 h. Water (10 mL) was added and the mixture was extracted with EtOAc (10 mL×3). The combined organic layer was washed with brine, dried over Na₂SO₄, filtered and concentrated. The residue was purified by silica gel chromatography (DCM:MeOH=15:1) to give the isomeric mixture (230 mg) which was then separated by chiral HPLC to give Example 3A/3B.

Example 3A: (79 mg, 22%) ¹H NMR (400 MHz, DMSO-d6) δ 12.02 (s, 1H), 8.50 (d, J=1.7 Hz, 1H), 8.37 (d, J=1.8 Hz, 1H), 7.98 (d, J=2.6 Hz, 1H), 7.87-7.78 (m, 2H), 7.52-7.46 (m, 2H), 7.34 (s, 1H), 7.27 (s, 1H), 4.91-4.78 (m, 1H), 4.07-3.80 (m, 1H), 3.53-3.44 (m, 0.5H), 3.36-3.28 (m, 1H), 3.23-3.11 (m, 0.5H), 3.08-2.81 (m, 8H), 2.65-2.57 (m, 2H), 2.49-2.40 (m, 1H), 2.34-2.25 (m, 4H), 2.24-2.13 (m, 4H), 1.65-1.52 (m, 1H), 1.17-0.88 (m, 3H). LC-MS (M+H)⁺=524.0. tR on chiral-HPLC: 4.50 min.

Example 3B: (88 mg, 24%) ¹H NMR (400 MHz, DMSO-d6) δ 12.02 (s, 1H), 8.49 (s, 1H), 8.37 (d, J=1.6 Hz, 1H), 7.98 (d, J=2.6 Hz, 1H), 7.87-7.78 (m, 2H), 7.52-7.46 (m, 2H), 7.34 (s, 1H), 7.26 (s, 1H), 4.98-4.72 (m, 1H), 4.04-3.79 (m, 1H), 3.54-3.43 (m, 0.5H), 3.35-3.25 (m, 1H), 3.24-3.11 (m, 0.5H), 3.07-2.79 (m, 8H), 2.66-2.54 (m, 2H), 2.49-2.41 (m, 1H), 2.34-2.24 (m, 4H), 2.23-2.09 (m, 4H), 1.66-1.51 (m, 1H), 1.19-0.81 (m, 3H). LC-MS (M+H)⁺=524.0. tR on chiral-HPLC: 5.65 min.

Prep-HPLC Condition

| Column | CHIRALPAK ID |
| --- | --- |
| Column size | 2 cm × 25 cm, 5 μm |
| Injection | 1.0 mL |
| Mobile phase | MTBE (2 mM NH$_3$—MeOH):MeOH = 95:5 |
| Flow rate | 20 mL/min |
| Wavelength | UV 220 nm |

Chiral Analytical HPLC Condition

| Column | CHIRALPAK ID-3 |
| --- | --- |
| Column size | 0.46 cm × 5 cm, 3 μm |
| Injection | 3 μL/1 μL |
| Mobile phase | MtBE(0.1% DEA):MeOH = 95:5 |
| Flow rate | 1.0 mL/min |
| Wavelength | UV 220 nm |

Example 4A/4B 4-(5-((R)-3,10-dimethyl-2,3,4,4a,5,6-hexahydro-1H-pyrazino[1,2-a]quinolin-8-yl)-1H-pyrrolo[2,3-b]pyridin-3-yl)-N-methyl-N—(((S)-tetrahydrofuran-3-yl)methyl)benzamide & 4-(5-((S)-3,10-dimethyl-2,3,4,4a,5,6-hexahydro-1H-pyrazino[1,2-a]quinolin-8-yl)-1H-pyrrolo[2,3-b]pyridin-3-yl)-N-methyl-N—(((S)-tetrahydrofuran-3-yl)methyl)benzamide

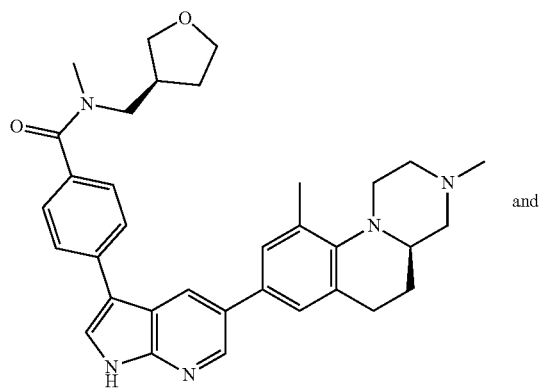

and

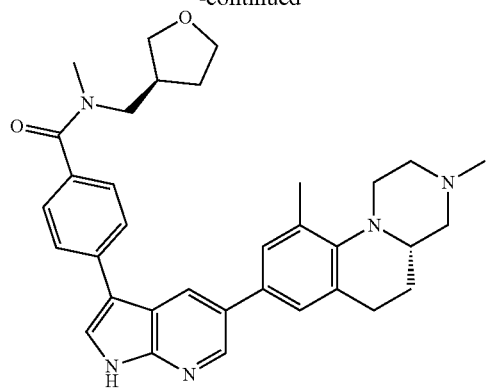

Step 1: (S)-4-bromo-N-((tetrahydrofuran-3-yl)methyl)benzamide

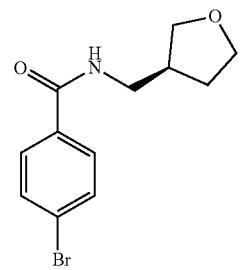 [SMILES: O=C(NC[C@@H]1CCOC1)c1ccc(Br)cc1]

To a solution of 4-bromobenzoic acid (2.0 g, 9.9 mmol) and (S)-(tetrahydrofuran-3-yl)methanamine (1.0 g, 9.9 mmol) in DMF (20 mL) was added HATU (5.64 g, 14.9 mmol) and DIPEA (2.55 g, 19.8 mmol). The resulting solution was stirred at room temperature overnight. Water (20 mL) was added and the solution was extracted with EtOAc (20 mL×3). The combined organic layer was washed with brine, dried over Na$_2$SO$_4$, filtered and concentrated. The residue was purified by silica gel chromatography, eluted with CH$_2$Cl$_2$/MeOH (100:1) to give the title compound (4.6 g, contained DMF). The material was used in step 2 without further purification. LC-MS (M+H)⁺=283.8, 285.8.

Step 2: (S)-4-bromo-N-methyl-N-((tetrahydrofuran-3-yl)methyl)benzamide

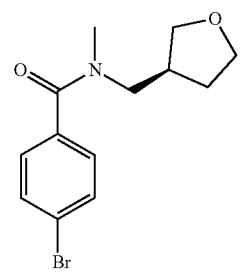 [SMILES: CN(C[C@@H]1CCOC1)C(=O)c1ccc(Br)cc1]

NaH (1.3 g, 32.4 mmol, 60%) was added to a solution of (S)-4-bromo-N-((tetrahydrofuran-3-yl)methyl)benzamide (4.6 g, from step 1) in DMF (30 mL) at 0° C. under N₂. The resulting solution was stirred at 0° C. for 1 h, and MeI (3.45 g, 24.3 mmol) was added dropwise. The solution was warmed to room temperature and stirred for 1 h. Water (30 mL) was added and the solution was extracted with EtOAc (30 mL×3). The combined organic layer was washed with brine, dried over Na₂SO₄, filtered and concentrated. The residue was purified by silica gel chromatography, eluted with DCM/MeOH (100:1) to give the title compound (2.42 g, 82% for 2 steps). LC-MS (M+H)⁺=297.8, 299.8.

Step 3: (S)—N-methyl-N-((tetrahydrofuran-3-yl)methyl)-4-(4,4,5,5-tetramethyl-1,3,2-dioxaborolan-2-yl)benzamide

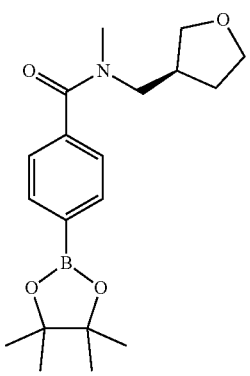 [SMILES: CN(C[C@@H]1CCOC1)C(=O)c1ccc(B2OC(C)(C)C(C)(C)O2)cc1]

To a solution of (S)-4-bromo-N-methyl-N-((tetrahydrofuran-3-yl)methyl)benzamide (2.42 g, 8.12 mmol) in 1,4-dioxane (50 mL) was added 4,4,4',4',5,5,5',5'-octamethyl-2,2'-bi(1,3,2-dioxaborolane) (3.09 g, 12.2 mmol), Pd(dppf)Cl₂.DCM (332 mg, 0.406 mmol) and KOAc (1.59 g, 16.2 mmol) under N₂. The resulting solution was stirred at 90° C. overnight. Water (50 mL) was added and the mixture was extracted with EtOAc (50 mL×3). The combined organic layer was washed with brine, dried over Na₂SO₄, filtered and concentrated. The residue was purified by silica gel chromatography, eluted with EtOAc/PE (1:3) to give the title compound (2.53 g, 90%). 41 NMR (400 MHz, CDCl₃) δ 7.83 (d, J=7.8 Hz, 2H), 7.36 (d, J=7.1 Hz, 2H), 4.02-3.19 (m, 6H), 3.16-2.89 (m, 3H), 2.79-2.45 (m, 1H), 2.15-1.66 (m, 2H), 1.35 (s, 12H). LC-MS (M+H)⁺=346.0.

Step 4: (S)-4-(5-bromo-1-(phenylsulfonyl)-1H-pyrrolo[2,3-b]pyridin-3-yl)-N-methyl-N-((tetrahydrofuran-3-yl)methyl)benzamide

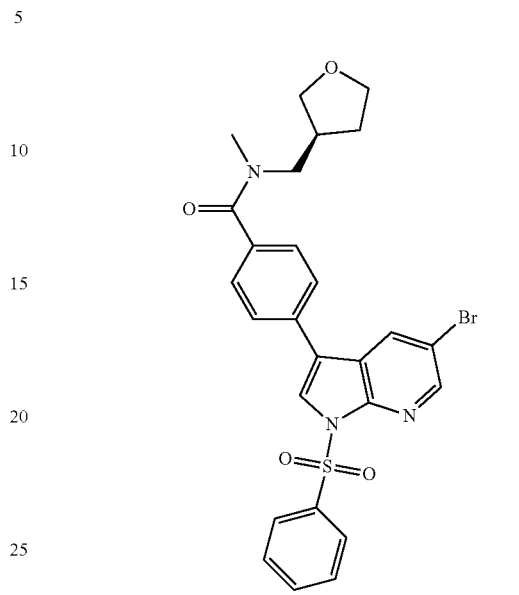

To a mixture of 5-bromo-3-iodo-1-(phenylsulfonyl)-1H-pyrrolo[2,3-b]pyridine(2 g, 4.3 mmol), (S)—N-methyl-N-((tetrahydrofuran-3-yl)methyl)-4-(4,4,5,5-tetramethyl-1,3,2-dioxaborolan-2-yl)benzamide (1.49 g, 4.3 mmol) and K₂CO₃ (1.19 g, 8.6 mmol) in 1,4-dioxane (30 mL) and water (20 mL) was added Pd(dppf)Cl₂.DCM (351 mg, 0.43 mmol). The reaction mixture was stirred at 80° C. under N₂ overnight. Water (20 mL) was added and the mixture was extracted with EtOAc (30 mL×3). The combined organic layer was washed with brine, dried over Na₂SO₄, filtered and concentrated. The residue was purified by silica gel chromatography (EtOAc:PE=1:1) to give the title compound (1.8 g, 75%). LC-MS (M+H)⁺=553.7, 555.7

Step 5: (S)-4-(5-bromo-1H-pyrrolo[2,3-b]pyridin-3-yl)-N-methyl-N-((tetrahydrofuran-3-yl)methyl)benzamide

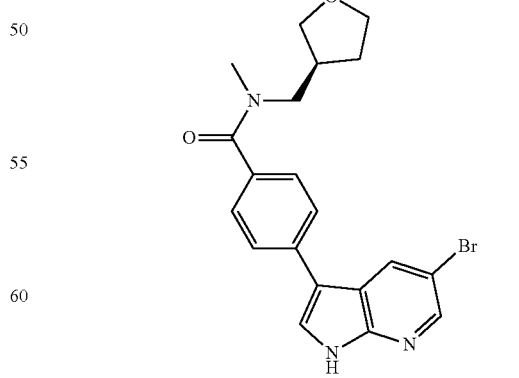

To a solution of (S)-4-(5-bromo-1-(phenylsulfonyl)-1H-pyrrolo[2,3-b]pyridin-3-yl)-N-methyl-N-((tetrahydrofuran-3-yl)methyl)benzamide (1.8 g, 3.25 mmol) in MeOH (50 mL) was added K$_2$CO$_3$ (1.35 g, 9.74 mmol). The reaction solution was stirred at room temperature overnight. Water (50 mL) was added and the mixture was extracted with EtOAc (50 mL×3). The combined organic layer was washed with brine, dried over Na$_2$SO$_4$, filtered and concentrated. The residue was purified by silica gel chromatography (DCM:MeOH=100:1) to give the title compound (1.15 g, 85%). LC-MS (M+H)$^+$=413.8, 415.8

Step 6: 4-(5-((R)-3,10-dimethyl-2,3,4,4a,5,6-hexahydro-1H-pyrazino[1,2-a]quinolin-8-yl)-1H-pyrrolo[2,3-b]pyridin-3-yl)-N-methyl-N—(((S)-tetrahydrofuran-3-yl)methyl)benzamide & 4-(5-((S)-3,10-dimethyl-2,3,4,4a,5,6-hexahydro-1H-pyrazino[1,2-a]quinolin-8-yl)-1H-pyrrolo[2,3-b]pyridin-3-yl)-N-methyl-N—(((S)-tetrahydrofuran-3-yl)methyl)benzamide

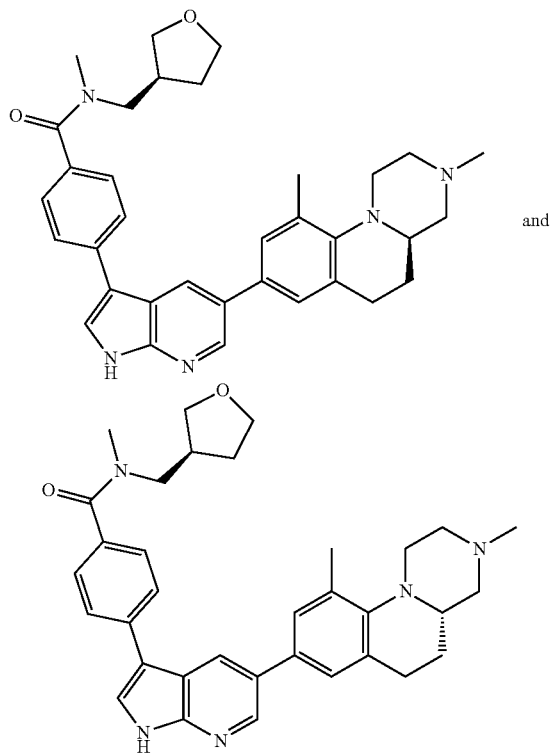

and

To a solution of (S)-4-(5-bromo-1H-pyrrolo[2,3-b]pyridin-3-yl)-N-methyl-N-((tetrahydrofuran-3-yl)methyl)benzamide (403.5 mg, 0.947 mmol) and 3,10-dimethyl-8-(4,4,5,5-tetramethyl-1,3,2-dioxaborolan-2-yl)-2,3,4,4a,5,6-hexahydro-1H-pyrazino[1,2-a]quinoline (333 mg, 0.947 mmol) in 1,4-dioxane (20 mL) and water (10 mL) was added XPhos Pd G2 (77 mg, 0.097 mmol) and K$_3$PO$_4$ (413 mg, 1.948 mmol). The resulting mixture was stirred at 80° C. under N$_2$ overnight. Water (20 mL) was added and the mixture was extracted with EtOAc (20 mL×3). The combined organics was washed with brine, dried over Na$_2$SO$_4$, filtered and concentrated.

The crude was purified by silica gel chromatography (DCM:MeOH=10:1) to give the isomeric mixture (310 mg) which was separated by chiral HPLC to give Example 4A/4B.

Example 4A: (127 mg, 24%) $^1$H NMR (400 MHz, DMSO-d6) δ 12.03 (s, 1H), 8.50 (d, J=2.0 Hz, 1H), 8.37 (d, J=1.9 Hz, 1H), 7.99 (d, J=2.5 Hz, 1H), 7.89-7.81 (m, 2H), 7.53-7.41 (m, 2H), 7.34 (s, 1H), 7.27 (s, 1H), 3.86-3.38 (m, 6H), 3.05-2.98 (m, 4H), 2.96-2.84 (m, 4H), 2.74-2.53 (m, 4H), 2.49-2.42 (m, 1H), 2.36-2.26 (m, 4H), 2.25-2.13 (m, 4H), 2.08-1.53 (m, 2H). LC-MS (M+H)$^+$=549.9. tR on chiral-HPLC: 3.38 min.

Example 4B: (101 mg, 19%) $^1$H NMR (400 MHz, DMSO-d6) δ 12.03 (s, 1H), 8.50 (d, J=1.8 Hz, 1H), 8.37 (d, J=1.9 Hz, 1H), 7.99 (d, J=2.4 Hz, 1H), 7.89-7.81 (m, 2H), 7.53-7.41 (m, 2H), 7.34 (s, 1H), 7.26 (s, 1H), 3.86-3.36 (m, 6H), 3.05-2.95 (m, 4H), 2.95-2.81 (m, 4H), 2.70-2.54 (m, 3H), 2.48-2.42 (m, 1H), 2.33-2.24 (m, 4H), 2.24-2.12 (m, 4H), 2.08-1.51 (m, 3H). LC-MS (M+H)$^+$=549.9. tR on chiral-HPLC: 4.07 min.

Prep-HPLC Condition

| Column | CHIRALPAK IA |
|---|---|
| Column size | 2 cm × 25 cm, 5 μm |
| Injection | 0.5 mL |
| Mobile phase | MTBE(2 mM NH$_3$—MeOH):EtOH = 90:10 |
| Flow rate | 20 mL/min |
| Wavelength | UV 220 nm |

Chiral Analytical HPLC Condition

| Column | CHIRALPAK IA-3 |
|---|---|
| Column size | 0.46 cm × 5 cm, 3 μm |
| Injection | 2 μL |
| Mobile phase | MtBE(0.1% DEA):EtOH = 90:10 |
| Flow rate | 1.0 mL/min |
| Wavelength | UV 220 nm |

Example 5A/5B 4-(5-((R)-3,10-dimethyl-2,3,4,4a,5,6-hexahydro-1H-pyrazino[1,2-a]quinolin-8-yl)-1H-pyrrolo[2,3-b]pyridin-3-yl)-N-methyl-N—(((R)-tetrahydrofuran-3-yl)methyl)benzamide & 4-(5-((S)-3,10-dimethyl-2,3,4,4a,5,6-hexahydro-1H-pyrazino[1,2-a]quinolin-8-yl)-1H-pyrrolo[2,3-b]pyridin-3-yl)-N-methyl-N—(((R)-tetrahydrofuran-3-yl)methyl)benzamide

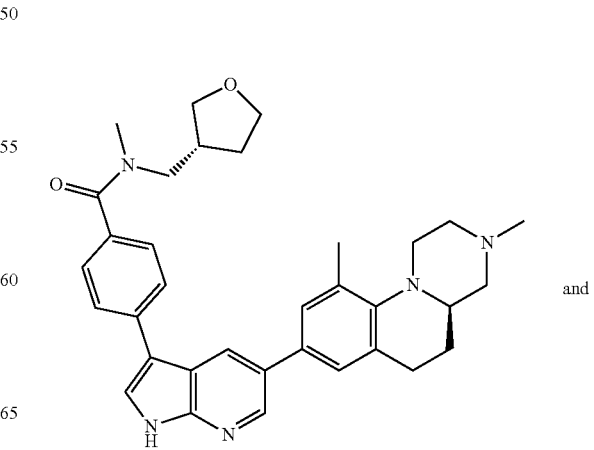

and

-continued

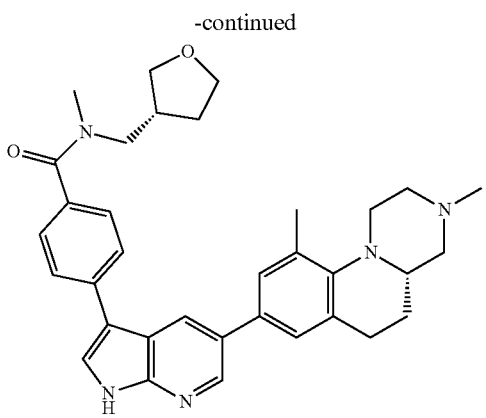

Step 1: (R)-4-bromo-N-((tetrahydrofuran-3-yl)methyl)benzamide

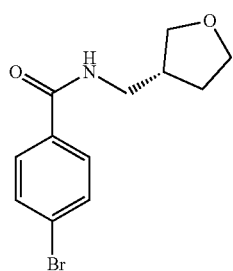 [SMILES: O=C(NC[C@H]1CCOC1)c1ccc(Br)cc1]

To a solution of 4-bromobenzoic acid (2.0 g, 9.9 mmol) and (R)-(tetrahydrofuran-3-yl)methanamine (1.0 g, 9.9 mmol) in DMF (20 mL) was added HATU (5.64 g, 14.85 mmol) and DIPEA (2.55 g, 19.8 mmol). The resulting solution was stirred at room temperature overnight. Water (20 mL) was added and the mixture was extracted with EtOAc (20 mL×3). The combined organic layer was washed with brine, dried over Na$_2$SO$_4$, filtered and concentrated. The residue was purified by silica gel chromatography (DCM:MeOH=100:1) to give the title compound (7.18 g, contained DMF). This material was used in step 2 without further purification. LC-MS (M+H)$^+$=283.8, 285.8.

Step 2: (R)-4-bromo-N-methyl-N-((tetrahydrofuran-3-yl)methyl)benzamide

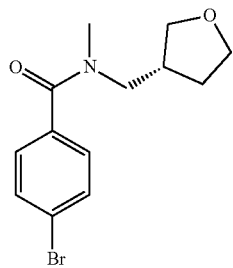 [SMILES: CN(C[C@H]1CCOC1)C(=O)c1ccc(Br)cc1]

NaH (2.02 g, 50.4 mmol, 60%) was added to a 0° C. solution of (R)-4-bromo-N-((tetrahydrofuran-3-yl)methyl)benzamide (7.18 g, contained DMF, 9.9 mmol) in DMF (40 mL) under N$_2$. The resulting mixture was stirred at 0° C. for 1 h, then MeI (5.37 g, 37.8 mmol) was added dropwise. The reaction mixture was warmed to room temperature and stirred for 1 h. Water (40 mL) was added and the mixture was extracted with EtOAc (40 mL×3). The combined organic layer was washed with brine, dried over Na$_2$SO$_4$, filtered and concentrated. The residue was purified by silica gel chromatography (DCM:MeOH=100:1) to give the title compound (3.5 g, contained DMF). This material was used in step 3 without further purification. LC-MS (M+H)$^+$=297.8, 299.8.

Step 3: (R)—N-methyl-N-((tetrahydrofuran-3-yl)methyl)-4-(4,4,5,5-tetramethyl-1,3,2-dioxaborolan-2-yl)benzamide

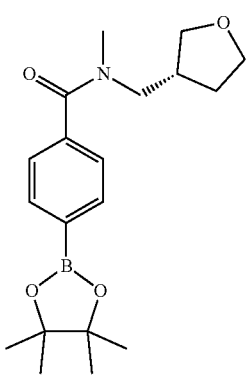 [SMILES: CN(C[C@H]1CCOC1)C(=O)c1ccc(B2OC(C)(C)C(C)(C)O2)cc1]

To a solution of (R)-4-bromo-N-methyl-N-((tetrahydrofuran-3-yl)methyl)benzamide (3.5 g, contained DMF, 9.9 mmol) in 1,4-dioxane (50 mL) was added 4,4,4',4',5,5,5',5'-octamethyl-2,2'-bi(1,3,2-dioxaborolane) (3.09 g, 12.18 mmol), Pd(dppf)Cl$_2$·DCM (332 mg, 0.406 mmol) and KOAc (1.59 g, 16.24 mmol). The resulting mixture was stirred at 90° C. under N$_2$ overnight. Water (50 mL) was added and the mixture was extracted with EtOAc (50 mL×3). The combined organic layer was washed with brine, dried over Na$_2$SO$_4$, filtered and concentrated. The residue was purified by silica gel chromatography (EtOAc:PE=1:3) to give the title compound (1.76 g, 52% over 3 steps). $^1$H NMR (400 MHz, CDCl$_3$) δ 7.83 (d, J=7.8 Hz, 2H), 7.36 (d, J=7.1 Hz, 2H), 4.03-3.19 (m, 6H), 3.16-2.90 (m, 3H), 2.79-2.45 (m, 1H), 2.15-1.68 (m, 2H), 1.35 (s, 12H). LC-MS (M+H)$^+$=346.0.

Step 4: (R)-4-(5-bromo-1-(phenylsulfonyl)-1H-pyrrolo[2,3-b]pyridin-3-yl)-N-methyl-N-((tetrahydrofuran-3-yl)methyl)benzamide

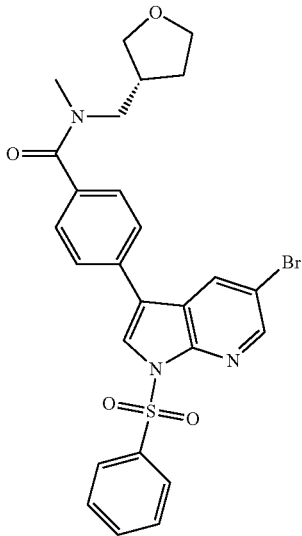 [SMILES: CN(C[C@H]1CCOC1)C(=O)c1ccc(-c2cn(S(=O)(=O)c3ccccc3)c3ncc(Br)cc23)cc1]

To a mixture of 5-bromo-3-iodo-1-(phenylsulfonyl)-1H-pyrrolo[2,3-b]pyridine(2.0 g, 4.3 mmol), (R)—N-methyl-N-((tetrahydrofuran-3-yl)methyl)-4-(4,4,5,5-tetramethyl-1,3,2-dioxaborolan-2-yl)benzamide and (1.49 g, 4.3 mmol) and K₂CO₃ (1.19 g, 8.6 mmol) in 1,4-dioxane (30 mL) and water (20 mL) was added Pd(dppf)Cl₂'DCM (351 mg, 0.43 mmol). The resulting mixture was stirred at 80° C. under N₂ overnight. Water (20 mL) was added and the mixture was extracted with EtOAc (30 mL×3). The combined organic layer was washed with brine, dried over Na₂SO₄, filtered and concentrated. The residue was purified by silica gel chromatography (EtOAc:PE=1:1) to give the title compound (1.8 g, 75%). LC-MS (M+H)⁺=553.7, 555.7.

Step 5: (R)-4-(5-bromo-1H-pyrrolo[2,3-b]pyridin-3-yl)-N-methyl-N-((tetrahydrofuran-3-yl)methyl)benzamide

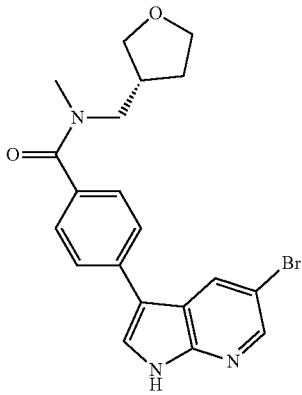 [SMILES: CN(C[C@H]1CCOC1)C(=O)c1ccc(-c2c[nH]c3ncc(Br)cc23)cc1]

To a solution of (R)-4-(5-bromo-1-(phenylsulfonyl)-1H-pyrrolo[2,3-b]pyridin-3-yl)-N-methyl-N-((tetrahydrofuran-3-yl)methyl)benzamide (1.8 g, 3.25 mmol) in MeOH (50 mL) was added K₂CO₃ (1.35 g, 9.74 mmol). The resulting mixture was stirred at room temperature overnight. Water (50 mL) was added and the mixture was extracted with EtOAc (50 mL×3). The combined organic layer was washed with brine, dried over Na₂SO₄, filtered and concentrated. The residue was purified by silica gel chromatography (EtOAc:PE=1:1) to give the title compound (908 mg, 67%). LC-MS (M+H)⁺=413.8, 415.8.

Step 6: 4-(5-((R)-3,10-dimethyl-2,3,4,4a,5,6-hexahydro-1H-pyrazino[1,2-a]quinolin-8-yl)-1H-pyrrolo[2,3-b]pyridin-3-yl)-N-methyl-N—(((R)-tetrahydrofuran-3-yl)methyl)benzamide & 4-(5-((S)-3,10-dimethyl-2,3,4,4a,5,6-hexahydro-1H-pyrazino[1,2-a]quinolin-8-yl)-1H-pyrrolo[2,3-b]pyridin-3-yl)-N-methyl-N—(((R)-tetrahydrofuran-3-yl)methyl)benzamide

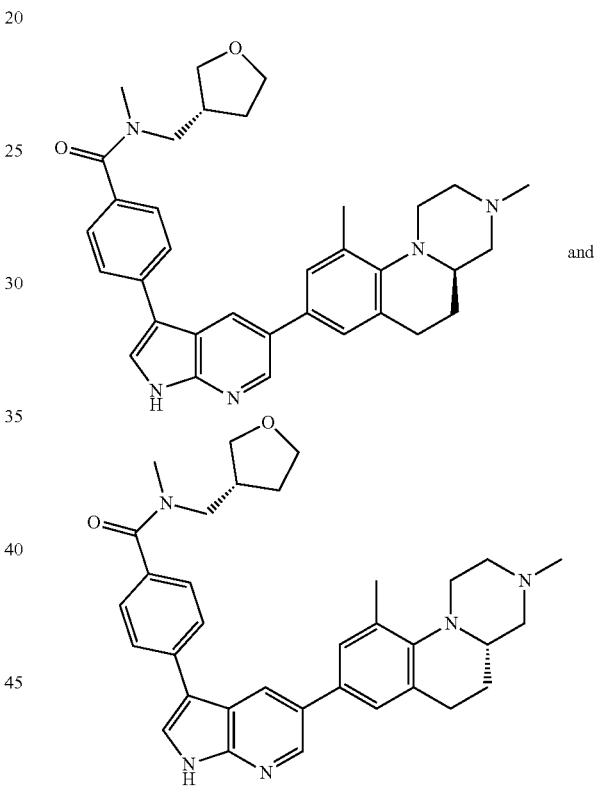

and

To a solution of (R)-4-(5-bromo-1H-pyrrolo[2,3-b]pyridin-3-yl)-N-methyl-N-((tetrahydrofuran-3-yl)methyl)benzamide (404 mg, 0.947 mmol) and 3,10-dimethyl-8-(4,4,5,5-tetramethyl-1,3,2-dioxaborolan-2-yl)-2,3,4,4a,5,6-hexahydro-1H-pyrazino[1,2-a]quinoline (333 mg, 0.947 mmol) in 1,4-dioxane (20 mL) and water (10 mL) was added XPhos Pd G2 (77 mg, 0.097 mmol) and K₃PO₄ (413 mg, 1.95 mmol). The resulting mixture was stirred at 80° C. under N₂ overnight. Water (20 mL) was added and the mixture was extracted with EtOAc (20 mL×3). The combined organic layer was washed with brine, dried over Na₂SO₄, filtered and concentrated. The residue was purified by silica gel chromatography (DCM:MeOH=10:1) to give the isomeric mixture (240 mg) which was separated by chiral HPLC to give Example 5A/5B.

Example 5A: (101 mg, 19%) ¹H NMR (400 MHz, DMSO-d6) δ 12.03 (s, 1H), 8.50 (d, J=1.9 Hz, 1H), 8.37 (d, J=1.7 Hz, 1H), 7.99 (d, J=2.5 Hz, 1H), 7.87-7.81 (m, 2H), 7.51-7.41 (m, 2H), 7.34 (s, 1H), 7.27 (s, 1H), 3.88-3.35 (m, 6H), 3.05-2.96 (m, 4H), 2.95-2.82 (m, 4H), 2.70-2.53 (m, 3H), 2.48-2.42 (m, 1H), 2.36-2.24 (m, 4H), 2.24-2.12 (m, 4H), 2.08-1.52 (m, 3H). LC-MS (M+H)$^+$=549.9. tR on chiral-HPLC: 2.93 min.

Example 5B: (82 mg, 16%) $^1$H NMR (400 MHz, DMSO-d6) δ 12.03 (s, 1H), 8.50 (d, J=1.9 Hz, 1H), 8.37 (d, J=1.7 Hz, 1H), 7.99 (d, J=2.5 Hz, 1H), 7.87-7.81 (m, 2H), 7.51-7.41 (m, 2H), 7.34 (s, 1H), 7.27 (s, 1H), 3.89-3.34 (m, 6H), 3.05-2.96 (m, 4H), 2.95-2.79 m, 4H), 2.71-2.53 (m, 3H), 2.46-2.39 (m, 1H), 2.35-2.24 (m, 4H), 2.24-2.12 (m, 4H), 2.09-1.52 (m, 3H). LC-MS (M+H)$^+$=549.9. tR on chiral-HPLC: 2.80 min.

Prep-HPLC Condition

| Column | CHIRALPAK IH |
| --- | --- |
| Column size | 2 cm × 25 cm, 5 μm |
| Injection | 0.8 mL |
| Mobile phase | MTBE(2 mM NH$_3$—MeOH):MeOH = 90:10 |
| Flow rate | 20 mL/min |
| Wavelength | UV 220 nm |

Chiral Analytical HPLC Condition

| Column | CHIRALPAK IH-3 |
| --- | --- |
| Column size | 0.46 cm × 5 cm, 3 μm |
| Injection | 1 μL |
| Mobile phase | MtBE(0.1% DEA):MeOH = 90:10 |
| Flow rate | 1.0 mL/min |
| Wavelength | UV 220 nm |

Example 6A/6B (R)-4-(2-(3,10-dimethyl-2,3,4,4a,5,6-hexahydro-1H-pyrazino[1,2-a]quinolin-8-yl)-5H-pyrrolo[2,3-b]pyrazin-7-yl)-N,N,2-trimethylbenzamide & (S)-4-(2-(3,10-dimethyl-2,3,4,4a,5,6-hexahydro-1H-pyrazino[1,2-a]quinolin-8-yl)-5H-pyrrolo[2,3-b]pyrazin-7-yl)-N,N,2-trimethylbenzamide

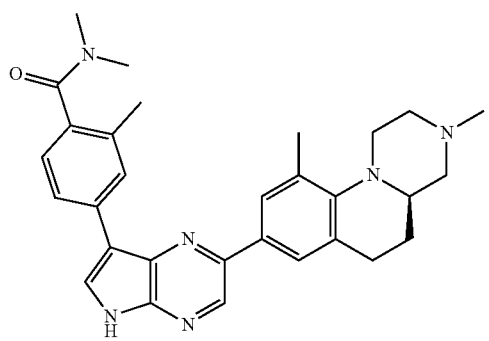

and

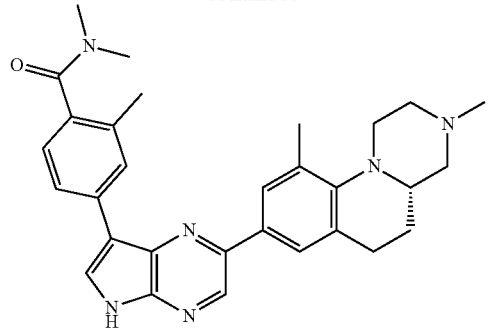

Step 1: 4-bromo-N,N,2-trimethylbenzamide

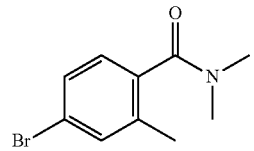

A mixture of 4-bromo-2-methylbenzoic acid (25.0 g, 116 mmol) in SOCl$_2$ (200 mL) was stirred at 60° C. for 3 h. The solvent was removed in vacuo. The residue was re-dissolved in anhydrous DCM (200 mL). Dimethylamine hydrochloride (14.0 g, 174.4 mmol) and TEA (80 mL, 581 mmol) was added at 0° C. The mixture was stirred at room temperature for 2 h. Water (200 mL) was added and the mixture was extracted with DCM (200 mL×3). The combined organic layer was washed with brine (150 mL), dried over Na$_2$SO$_4$, concentrated under reduced pressure to give the title compound (28.0 g, 99%). LC-MS (M+H)$^+$=242.0, 244.0.

Step 2: N,N,2-trimethyl-4-(4,4,5,5-tetramethyl-1,3,2-dioxaborolan-2-yl)benzamide

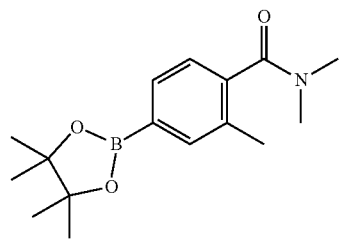

4-bromo-N,N,2-trimethylbenzamide (28.0 g, 115 mmol), 4,4,4',4',5,5,5',5'-octamethyl-2,2'-bi(1,3,2-dioxaborolane) (44.0 g, 174 mmol), Pd(dppf)Cl$_2$ (5.1 g, 6.94 mmol) and AcOK (22.7 g, 231 mmol) was added to dioxane (400 mL) under nitrogen. The reaction mixture was heated to reflux overnight then cooled to room temperature. EtOAc (400 mL) was added and the mixture was washed with brine (300 mL×2). The aqueous layer was extracted with EtOAc (400 mL). The combined organic layer was dried over Na$_2$SO$_4$, then concentrated under reduced pressure. The residue was purified by silica gel column chromatography, eluted with EtOAc/PE (1:5 to 2:1) to give the title compound (26.0 g, 73%). LC-MS (M+H)$^+$=290.1.

Step 3: 2-bromo-7-iodo-5-tosyl-5H-pyrrolo[2,3-b]pyrazine

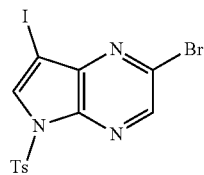 [SMILES: Cc1ccc(S(=O)(=O)n2cc(I)c3nc(Br)cnc32)cc1]

To a solution of 2-bromo-7-iodo-5H-pyrrolo[2,3-b]pyrazine (162 g, 500 mmol) in anhydrous DMF (1500 mL) was added sodium hydride (30.0 g, 750 mmol) at 0° C. in portions. The resulting mixture was stirred for 15 min at 0° C., and then TsCl (124 g, 650 mmol) was added in portions. The mixture was warmed to room temperature while being stirred. After 3 h, the reaction mixture was poured into ice water (2 L) and the precipitate was collected by filtration. The solid was rinsed with water (200 mL×5) then dried under vacuum to give the title compound (239 g, 99%). LCMS (M+H)$^+$=479.9.

Step 4: 4-(2-bromo-5-tosyl-5H-pyrrolo[2,3-b]pyrazin-7-yl)-N,N,2-trimethylbenzamide

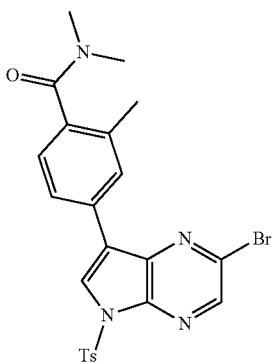 [SMILES: Cc1ccc(S(=O)(=O)n2cc(-c3ccc(C(=O)N(C)C)c(C)c3)c3nc(Br)cnc32)cc1]

To a solution of 2-bromo-7-iodo-5-tosyl-5H-pyrrolo[2,3-b]pyrazine (16.5 g, 34.6 mmol) and N,N,2-trimethyl-4-(4,4,5,5-tetramethyl-1,3,2-dioxaborolan-2-yl)benzamide (10.0 g, 34.5 mmol) in dioxane (150 mL) and water (50 mL) was added K$_2$CO$_3$ (9.55 g, 69.2 mmol) and Pd(dppf)Cl$_2$ (1.54 g, 2.07 mmol) under nitrogen atmosphere. After stirring for 5 h at 50° C., the reaction mixture was cooled to room temperature and concentrated under reduced pressure. The residue was purified by silica gel column chromatography, eluted with EtOAc/PE (1:2 to 2:1) to give the title compound (11.0 g, 62%). $^1$H NMR (400 MHz, DMSO-d6) δ 8.88 (s, 1H), 8.68 (s, 1H), 8.09-8.01 (m, 4H), 7.49-7.44 (m, 2H), 7.29 (d, J=7.8 Hz, 1H), 3.02 (s, 3H), 2.79 (s, 3H), 2.36 (s, 3H), 2.27 (s, 3H). LCMS (M+H)$^+$=513.0.

Step 5: 4-(2-(3,10-dimethyl-2,3,4,4a,5,6-hexahydro-1H-pyrazino[1,2-a]quinolin-8-yl)-5-tosyl-5H-pyrrolo[2,3-b]pyrazin-7-yl)-N,N,2-trimethylbenzamide

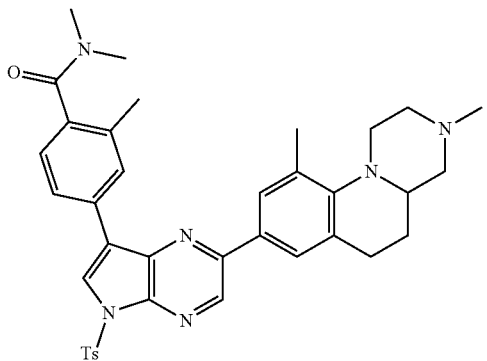 [SMILES: Cc1ccc(S(=O)(=O)n2cc(-c3ccc(C(=O)N(C)C)c(C)c3)c3nc(-c4cc(C)c5c(c4)CCC4CN(C)CCN54)cnc32)cc1]

To a solution of 4-(2-bromo-5-tosyl-5H-pyrrolo[2,3-b]pyrazin-7-yl)-N,N,2-trimethylbenzamide (375 mg, 0.731 mmol) and 3,10-dimethyl-8-(4,4,5,5-tetramethyl-1,3,2-dioxaborolan-2-yl)-2,3,4,4a,5,6-hexahydro-1H-pyrazino[1,2-a]quinoline (250 mg, 0.731 mmol) in 1,4-dioxane (20 mL) and water (10 mL) was added XPhos Pd G2 (57 mg, 0.073 mmol) and K$_3$PO$_4$ (310 mg, 1.46 mmol). The reaction mixture was stirred at 80° C. under N$_2$ overnight. Water (20 mL) was added and the mixture was extracted with EtOAc (20 mL×3). The combined organic layer was washed with brine, dried over Na$_2$SO$_4$, filtered and concentrated. The residue was purified by silica gel chromatography (DCM:MeOH=20:1) to give the title compound (400 mg, 84%). LC-MS (M+H)$^+$=649.1.

Step 6: (R)-4-(2-(3,10-dimethyl-2,3,4,4a,5,6-hexahydro-1H-pyrazino[1,2-a]quinolin-8-yl)-5H-pyrrolo[2,3-b]pyrazin-7-yl)-N,N,2-trimethylbenzamide & (S)-4-(2-(3,10-dimethyl-2,3,4,4a,5,6-hexahydro-1H-pyrazino[1,2-a]quinolin-8-yl)-5H-pyrrolo[2,3-b]pyrazin-7-yl)-N,N,2-trimethylbenzamide

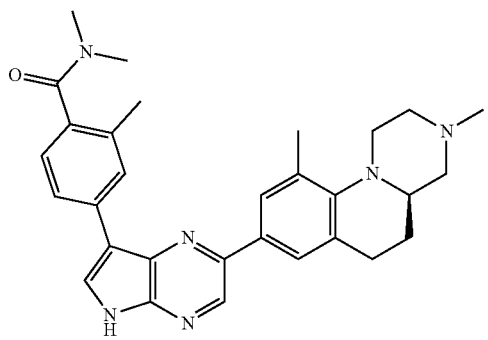

and

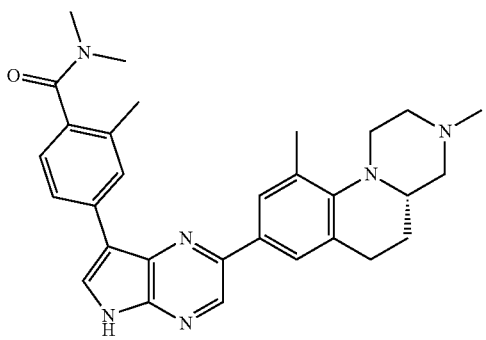

To a solution of 4-(2-(3,10-dimethyl-2,3,4,4a,5,6-hexahydro-1H-pyrazino[1,2-a]quinolin-8-yl)-5-tosyl-5H-pyrrolo[2,3-b]pyrazin-7-yl)-N,N,2-trimethylbenzamide (400 mg, 0.617 mmol) in MeOH (20 mL) was added $K_2CO_3$ (340 mg, 2.48 mmol). The resulting mixture was stirred at room temperature for 2 h. Water (50 mL) was added and the mixture was extracted with EtOAc (50 mL×3). The combined organic layers was washed with brine, dried over $Na_2SO_4$, filtered and concentrated. The residue was purified by silica gel chromatography (DCM:MeOH=30:1) to give the isomeric mixture (162 mg) which was separated by chiral HPLC to give the Example 6A/6B.

Example 6A: (69 mg, 23%) $^1$H NMR (400 MHz, DMSO-d6) δ 12.28 (s, 1H), 8.82 (s, 1H), 8.43 (d, J=2.7 Hz, 1H), 8.26 (s, 1H), 8.18 (d, J=8.0 Hz, 1H), 7.80 (s, 1H), 7.73 (s, 1H), 7.23 (d, J=7.9 Hz, 1H), 3.09-2.97 (m, 5H), 2.96-2.86 (m, 3H), 2.83 (s, 3H), 2.63-2.53 (m, 3H), 2.38-2.31 (m, 4H), 2.29 (s, 3H), 2.21 (s, 3H), 2.19-2.08 (m, 1H), 1.69-1.59 (m, 1H). LC-MS (M+H)$^+$=495.0. tR on chiral-HPLC: 4.97 min.

Example 6B: (69 mg, 23%)$^1$H NMR (400 MHz, DMSO-d6) δ 12.28 (s, 1H), 8.81 (s, 1H), 8.43 (d, J=2.7 Hz, 1H), 8.26 (s, 1H), 8.18 (d, J=7.8 Hz, 1H), 7.80 (s, 1H), 7.73 (s, 1H), 7.23 (d, J=8.0 Hz, 1H), 3.09-2.98 (m, 5H), 2.96-2.87 (m, 3H), 2.83 (s, 3H), 2.63-2.51 (m, 3H), 2.38-2.31 (m, 4H), 2.29 (s, 3H), 2.21 (s, 3H), 2.19-2.10 (m, 1H), 1.69-1.59 (m, 1H). LC-MS (M+H)$^+$=495.0. tR on chiral-HPLC: 6.56 min.

Prep-HPLC Condition

| Column | CHIRALPAK AD-H |
|---|---|
| Column size | 2 cm × 25 cm, 5 μm |
| Injection | 0.5 mL |
| Mobile phase | Hexane(2 mM $NH_3$—MeOH):EtOH = 80:20 |
| Flow rate | 20 mL/min |
| Wavelength | UV 220 nm |

Chiral Analytical HPLC Condition

| Column | CHIRALPAK AD |
|---|---|
| Column size | 0.46 cm × 10 cm, 5 μm |
| Injection | 5 μL |
| Mobile phase | Hex(0.1% DEA):EtOH = 80:20 |
| Flow rate | 1.0 mL/min |
| Wavelength | UV 220 nm |

Example 7A/7B (R)-4-(2-(3,10-dimethyl-2,3,4,4a,5,6-hexahydro-1H-pyrazino[1,2-a] quinolin-8-yl)-5H-pyrrolo[2,3-b] pyrazin-7-yl)-N,N-dimethylbenzamide & (S)-4-(2-(3,10-dimethyl-2,3,4,4a,5,6-hexahydro-1H-pyrazino[1,2-a] quinolin-8-yl)-5H-pyrrolo[2,3-b]pyrazin-7-yl)-N,N-dimethylbenzamide

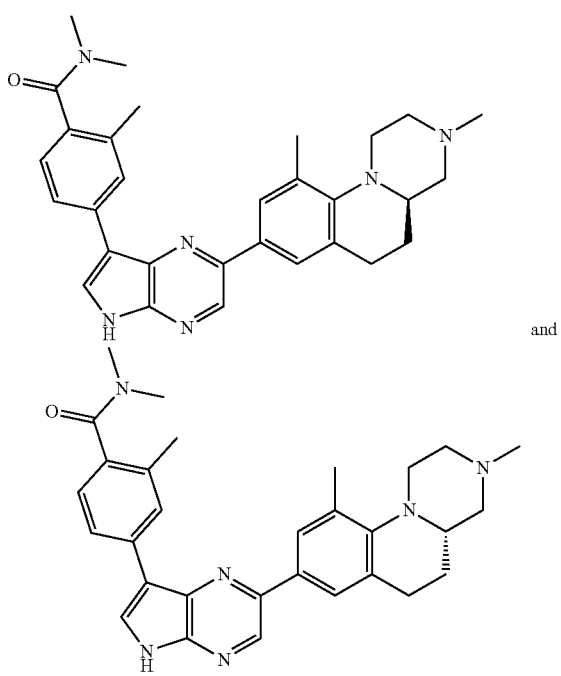

and

Step 1: 4-(2-bromo-5-tosyl-5H-pyrrolo[2,3-b]pyrazin-7-yl)-N,N-dimethylbenzamide

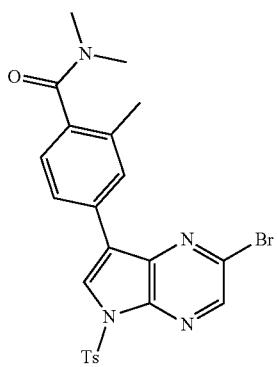 [SMILES: Cc1ccc(S(=O)(=O)n2cc(-c3ccc(C(=O)N(C)C)c(C)c3)c3nc(Br)cnc32)cc1]

To a solution of 2-bromo-7-iodo-5-tosyl-5H-pyrrolo[2,3-b]pyrazine (240 mg, 0.50 mmol) and [4-(dimethylcarbamoyl)phenyl]boronic acid (106 mg, 0.52 mmol) in 1,4-dioxane (6 mL) and water (1 mL) was added $K_2CO_3$ (207 mg, 1.42 mmol) and Pd(dppf)$Cl_2CH_2Cl_2$ (41 mg, 0.048 mmol). After stirring for 3 h at 70° C. under a nitrogen atmosphere, the reaction mixture was concentrated under reduced pressure. The residue was purified by silica gel column chromatography, eluted with CHCl₃/MeOH (9:1) to give the title compound (200 mg, 75%). LCMS (M+H)⁺=499.2.

Step 2: 4-(2-(3,10-dimethyl-2,3,4,4a,5,6-hexahydro-1H-pyrazino[1,2-a]quinolin-8-yl)-5-tosyl-5H-pyrrolo[2,3-b]pyrazin-7-yl)-N,N-dimethylbenzamide

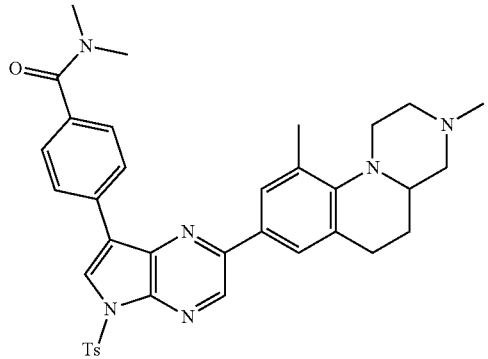 [SMILES: Cc1ccc(S(=O)(=O)n2cc(-c3ccc(C(=O)N(C)C)cc3)c3nc(-c4cc(C)c5c(c4)CCC4CN(C)CCN54)cnc32)cc1]

To a solution of 4-(2-bromo-5-tosyl-5H-pyrrolo[2,3-b]pyrazin-7-yl)-N,N-dimethylbenzamide (384 mg, 0.769 mmol) and 3,10-dimethyl-8-(4,4,5,5-tetramethyl-1,3,2-dioxaborolan-2-yl)-2,3,4,4a,5,6-hexahydro-1H-pyrazino[1,2-a]quinoline (263 mg, 0.769 mmol) in 1,4-dioxane (20 mL) and water (10 mL) was added XPhos Pd G2 (61 mg, 0.077 mmol) and K₃PO₄ (326 mg, 1.54 mmol). The resulting mixture was stirred at 80° C. under N₂ overnight. Water (20 mL) was added and the mixture was extracted with EtOAc (20 mL×3). The combined organic layer was washed with brine, dried over Na₂SO₄, filtered and concentrated. The residue was purified by silica gel chromatography (DCM:MeOH=30:1) to give the title compound (370 mg, 76%). LC-MS (M+H)⁺=635.1.

Step 3: (R)-4-(2-(3,10-dimethyl-2,3,4,4a,5,6-hexahydro-1H-pyrazino[1,2-a]quinolin-8-yl)-5H-pyrrolo[2,3-b]pyrazin-7-yl)-N,N-dimethylbenzamide & (S)-4-(2-(3,10-dimethyl-2,3,4,4a,5,6-hexahydro-1H-pyrazino[1,2-a]quinolin-8-yl)-5H-pyrrolo[2,3-b]pyrazin-7-yl)-N,N-dimethylbenzamide

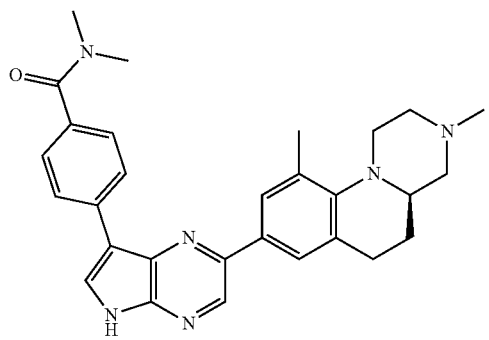

and

-continued

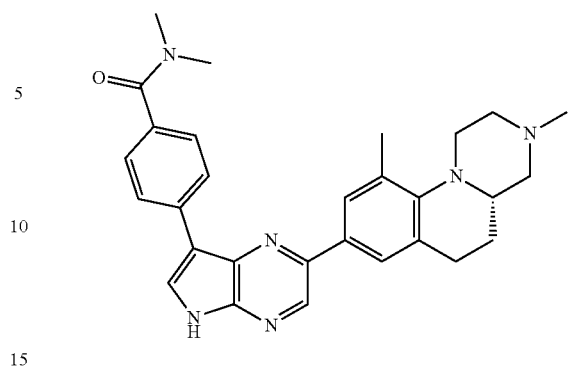

To a solution of 4-(2-(3,10-dimethyl-2,3,4,4a,5,6-hexahydro-1H-pyrazino[1,2-a]quinolin-8-yl)-5-tosyl-5H-pyrrolo[2,3-b]pyrazin-7-yl)-N,N-dimethylbenzamide (370 mg, 0.584 mmol) in MeOH (20 mL) was added K₂CO₃ (242 mg, 1.75 mmol). The reaction mixture was stirred at room temperature for 2 h. Water (50 mL) was added and the mixture was extracted with EtOAc (50 mL×3). The combined organic layer was washed with brine, dried over Na₂SO₄, filtered and concentrated. The residue was purified by silica gel chromatography (DCM:MeOH=30:1) to give the isomeric mixture (160 mg) which was separated by chiral HPLC to give Example 7A/7B.

Example 7A: (72 mg, 26%) ¹H NMR (400 MHz, DMSO-d6) δ 10.06 (s, 1H), 8.76 (s, 1H), 8.46 (s, 1H), 8.39-8.33 (m, 2H), 7.77 (s, 1H), 7.70 (s, 1H), 7.52-7.45 (m, 2H), 3.09-2.97 (m, 8H), 2.96-2.86 (m, 3H), 2.64-2.51 (m, 3H), 2.39-2.28 (m, 4H), 2.21 (s, 3H), 2.19-2.08 (m, 1H), 1.68-1.59 (m, 1H). LC-MS (M+H)⁺=480.9. tR on chiral-HPLC: 4.47 min.

Example 7B: (73 mg, 26%) ¹H NMR (400 MHz, DMSO-d6) δ. 9.52 (s, 1H), 8.75 (s, 1H), 8.46 (s, 1H), 8.40-8.33 (m, 2H), 7.77 (s, 1H), 7.70 (s, 1H), 7.51-7.45 (m, 2H), 3.09-2.96 (m, 8H), 2.95-2.86 (m, 3H), 2.63-2.51 (m, 3H), 2.39-2.29 (m, 4H), 2.21 (s, 3H), 2.18-2.08 (m, 1H), 1.69-1.57 (m, 1H). LC-MS (M+H)⁺=481.0. tR on chiral-HPLC: 5.87 min.

Prep-HPLC Condition

| Column | Lux ® 5 μm Cellulose-4 |
|---|---|
| Column size | 2 cm × 25 cm, 5 μm |
| Injection | 1.1 mL |
| Mobile phase | CO₂:[MeOH:ACN(2 mM NH₃—MeOH) = 1:1] = 45:55 |
| Flow rate | 45 mL/min |
| Wavelength | UV 220 nm |

Chiral Analytical HPLC Condition

| Column | Enantiocel C4-3 |
|---|---|
| Column size | 0.46 cm × 10 cm, 3 μm |
| Injection | 10 μL |
| Mobile phase | MeOH:ACN(0.1% DEA) = 1:1 |
| Flow rate | 4.0 mL/min |
| Wavelength | UV 254 nm |

Example 8A/8B (R)-(4-(2-(3,10-dimethyl-2,3,4,4a,5,6-hexahydro-1H-pyrazino[1,2-a]quinolin-8-yl)-5H-pyrrolo[2,3-b]pyrazin-7-yl)-2-methylphenyl)(2-oxa-6-azaspiro[3.3]heptan-6-yl)methanone & (S)-(4-(2-(3,10-dimethyl-2,3,4,4a,5,6-hexahydro-1H-pyrazino[1,2-a]quinolin-8-yl)-5H-pyrrolo[2,3-b]pyrazin-7-yl)-2-methylphenyl)(2-oxa-6-azaspiro[3.3]heptan-6-yl)methanone

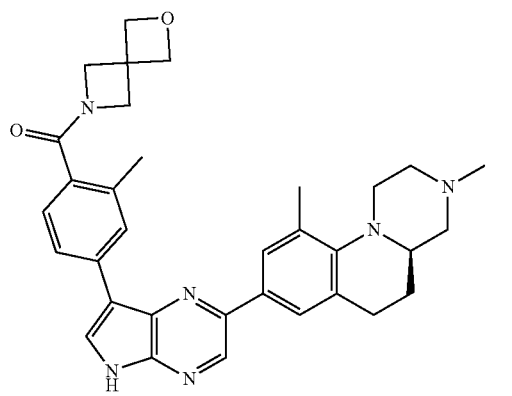

and

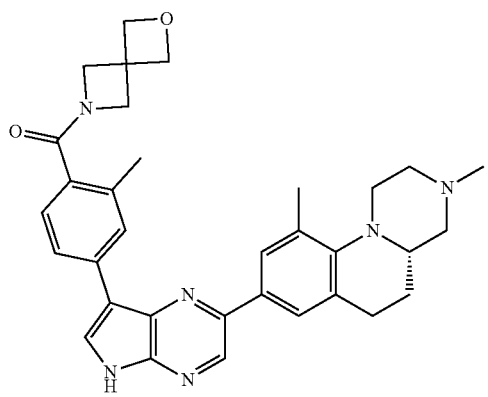

Step 1: 6-(4-bromo-2-methylbenzoyl)-2-oxa-6-azaspiro[3.3]heptane

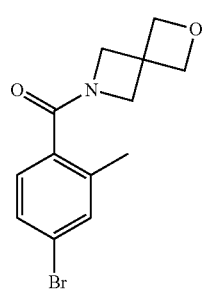 [SMILES: Cc1cc(Br)ccc1C(=O)N1CC2(COC2)C1]

The title compound (250 mg, 78%) was prepared in a manner similar to that in Example 2A/2B, Step 1 from 4-bromo-2-methylbenzoic acid and 2-oxa-6-azaspiro[3.3]heptane. LCMS (M+H)⁺=296.0.

Step 2: (2-methyl-4-(4,4,5,5-tetramethyl-1,3,2-dioxaborolan-2-yl)phenyl)(2-oxa-6-azaspiro[3.3]heptan-6-yl)methanone

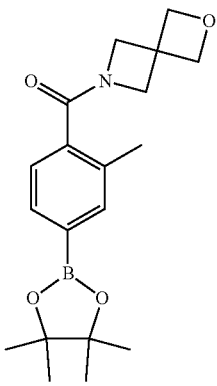 [SMILES: Cc1cc(B2OC(C)(C)C(C)(C)O2)ccc1C(=O)N1CC2(COC2)C1]

The title compound (200 mg, 67%) was prepared in a manner similar to that in Example 2A/2B, Step 5 from 6-(4-bromo-2-methylbenzoyl)-2-oxa-6-azaspiro[3.3]heptane and 4,4,4',4',5,5,5',5'-octamethyl-2,2'-bi(1,3,2-dioxaborolane). LCMS (M+H)⁺=344.2.

Step 3: (4-(2-bromo-5-tosyl-5H-pyrrolo[2,3-b]pyrazin-7-yl)-2-methylphenyl)(2-oxa-6-azaspiro[3.3]heptan-6-yl)methanone

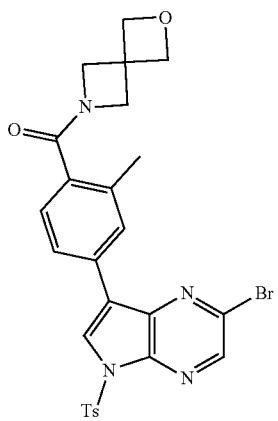 [SMILES: Cc1ccc(S(=O)(=O)n2cc(-c3ccc(C(=O)N4CC5(COC5)C4)c(C)c3)c3nc(Br)cnc32)cc1]

The title compound (185 mg, 67%) was prepared in a manner similar to that in Example 6A/6B, Step 4 from (2-methyl-4-(4,4,5,5-tetramethyl-1,3,2-dioxaborolan-2-yl)phenyl)(2-oxa-6-azaspiro[3.3]heptan-6-yl)methanone and 2-bromo-7-iodo-5-tosyl-5H-pyrrolo[2,3-b]pyrazine. LC-MS (M+H)⁺=567.1.

Step 4: (4-(2-(3,10-dimethyl-2,3,4,4a,5,6-hexa-hydro-1H-pyrazino[1,2-a]quinolin-8-yl)-5-tosyl-5H-pyrrolo[2,3-b]pyrazin-7-yl)-2-methylphenyl)(2-oxa-6-azaspiro[3.3]heptan-6-yl)methanone

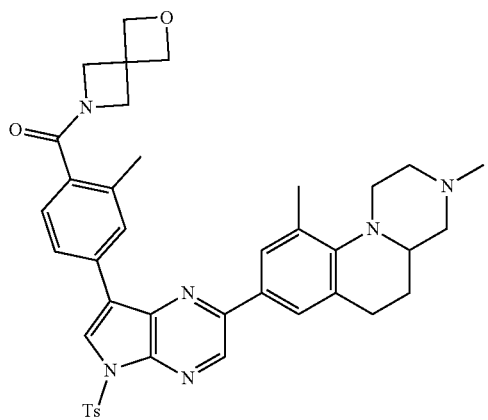 [SMILES: Cc1ccc(S(=O)(=O)n2cc(-c3ccc(C(=O)N4CC5(COC5)C4)c(C)c3)c3nc(-c4cc(C)c5c(c4)CCC4CN(C)CCN54)cnc32)cc1]

To a solution of (4-(2-bromo-5-tosyl-5H-pyrrolo[2,3-b]pyrazin-7-yl)-2-methylphenyl)(2-oxa-6-azaspiro[3.3]heptan-6-yl)methanone (340 mg, 0.60 mmol) and 3,10-dimethyl-8-(4,4,5,5-tetramethyl-1,3,2-dioxaborolan-2-yl)-2,3,4,4a,5,6-hexahydro-1H-pyrazino[1,2-a]quinoline (205 mg, 0.60 mmol) in 1,4-dioxane (20 mL) and water (10 mL) was added XPhos Pd G2 (47 mg, 0.06 mmol) and $K_3PO_4$ (254 mg, 1.2 mmol). The reaction mixture was stirred at 80° C. under $N_2$ overnight. Water (20 mL) was added and the mixture was extracted with EtOAc (20 mL×3). The combined organic layer was washed with brine, dried over $Na_2SO_4$, filtered and concentrated. The crude was purified by silica gel chromatography (DCM:MeOH=20:1) to give the title compound (300 mg, 71%). LC-MS (M+H)$^+$=703.0.

Step 5: (R)-(4-(2-(3,10-dimethyl-2,3,4,4a,5,6-hexa-hydro-1H-pyrazino[1,2-a]quinolin-8-yl)-5H-pyrrolo[2,3-b]pyrazin-7-yl)-2-methylphenyl)(2-oxa-6-azaspiro[3.3]heptan-6-yl)methanone & (S)-(4-(2-(3,10-dimethyl-2,3,4,4a,5,6-hexahydro-1H-pyrazino[1,2-a]quinolin-8-yl)-5H-pyrrolo[2,3-b]pyrazin-7-yl)-2-methylphenyl)(2-oxa-6-azaspiro[3.3]heptan-6-yl)methanone

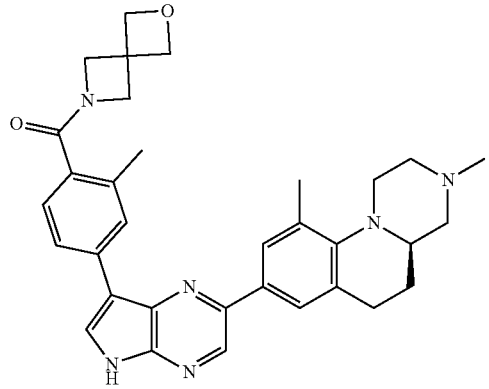

and

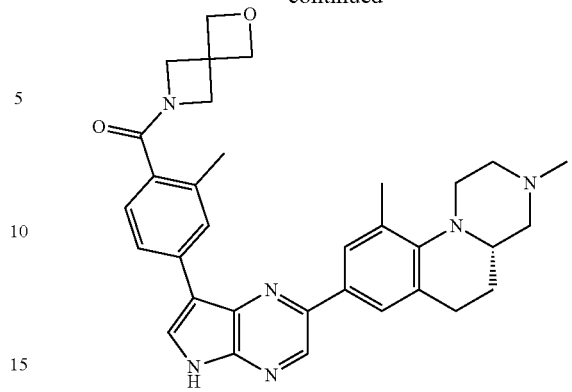

To a solution of (4-(2-(3,10-dimethyl-2,3,4,4a,5,6-hexa-hydro-1H-pyrazino[1,2-a]quinolin-8-yl)-5-tosyl-5H-pyrrolo[2,3-b]pyrazin-7-yl)-2-methylphenyl)(2-oxa-6-azaspiro[3.3]heptan-6-yl)methanone (300 mg, 0.427 mmol) in MeOH (20 mL) was added $K_2CO_3$ (177 mg, 1.28 mmol). The reaction mixture was stirred at room temperature for 2 h. Water (30 mL) was added and the mixture was extracted with EtOAc (30 mL×3). The combined organic layer was washed with brine, dried over $Na_2SO_4$, filtered and concentrated. The residue was purified by silica gel chromatography (DCM:MeOH=20:1) to give the isomeric mixture (108 mg) which was separated by chiral HPLC to give Example 8A/8B.

Example 8A: (39 mg, 17%) $^1$H NMR (400 MHz, DMSO-d6) δ 12.32 (s, 1H), 8.82 (s, 1H), 8.45 (s, 1H), 8.27 (s, 1H), 8.17 (d, J=8.1 Hz, 1H), 7.80 (s, 1H), 7.74 (s, 1H), 7.36 (d, J=7.9 Hz, 1H), 4.76-4.58 (m, 4H), 4.26-4.12 (m, 4H), 3.10-2.98 (m, 2H), 2.97-2.84 (m, 3H), 2.63-2.51 (m, 3H), 2.39 (s, 3H), 2.37-2.29 (m, 4H), 2.21 (s, 3H), 2.19-2.11 (m, 1H), 1.70-1.59 (m, 1H). LC-MS (M+H)$^+$=548.9. tR on chiral-HPLC: 3.74 min.

Example 8B: (46 mg, 20%) $^1$H NMR (400 MHz, DMSO-d6) δ 12.32 (s, 1H), 8.82 (s, 1H), 8.45 (s, 1H), 8.27 (s, 1H), 8.17 (d, J=7.8 Hz, 1H), 7.80 (s, 1H), 7.73 (s, 1H), 7.36 (d, J=8.0 Hz, 1H), 4.75-4.61 (m, 4H), 4.30-4.08 (m, 4H), 3.11-2.98 (m, 2H), 2.97-2.84 (m, 3H), 2.64-2.52 (m, 3H), 2.39 (s, 3H), 2.37-2.29 (m, 4H), 2.21 (s, 3H), 2.19-2.08 (m, 1H), 1.70-1.59 (m, 1H). LC-MS (M+H)$^+$=549.0. tR on chiral-HPLC: 5.23 min.

Prep-HPLC Condition

| Column | CHIRALPAK AD-H |
|---|---|
| Column size | 2 cm × 25 cm, 5 μm |
| Injection | 1.0 mL |
| Mobile phase | Hexane:EtOH = 50:50 |
| Flow rate | 17 mL/min |
| Wavelength | UV 220 nm |

Chiral Analytical HPLC Condition

| Column | CHIRALPAK AD |
|---|---|
| Column size | 0.46 cm × 10 cm, 5 μm |
| Injection | 5 μL/6 μL |
| Mobile phase | Hex(0.1% DEA):EtOH:IPA = 45:45:10 |
| Flow rate | 1.0 mL/min |
| Wavelength | UV 220 nm |

Example 9A/9B (R)-(4-(2-(3,10-dimethyl-2,3,4,4a,5,6-hexahydro-1H-pyrazino[1,2-a]quinolin-8-yl)-5H-pyrrolo[2,3-b]pyrazin-7-yl)phenyl)(2-oxa-6-azaspiro[3.3]heptan-6-yl)methanone & (S)-(4-(2-(3,10-dimethyl-2,3,4,4a,5,6-hexahydro-1H-pyrazino[1,2-a]quinolin-8-yl)-5H-pyrrolo[2,3-b]pyrazin-7-yl)phenyl)(2-oxa-6-azaspiro[3.3]heptan-6-yl)methanone

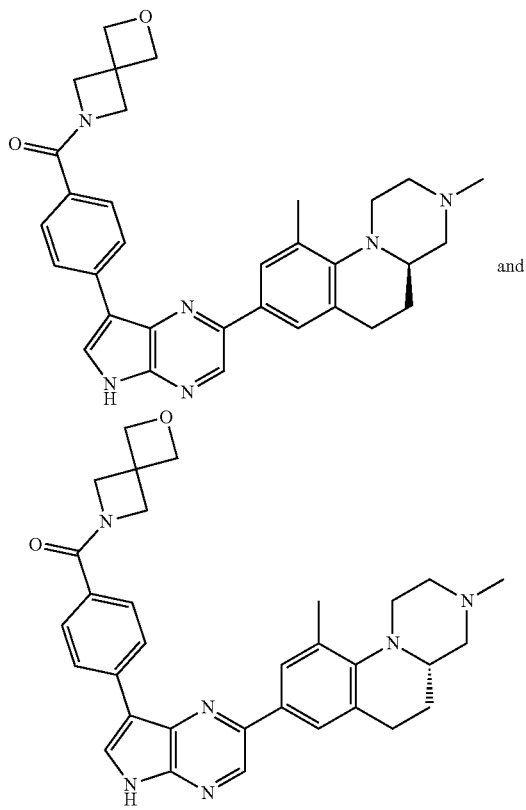

Step 1: (4-(2-oxa-6-azaspiro[3.3]heptane-6-carbonyl)phenyl)boronic Acid

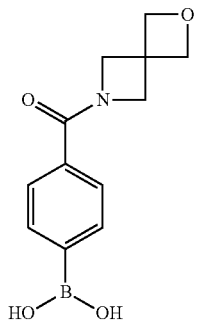

To a solution of 4-boronobenzoic acid (3.32 g, 19.0 mmol) in DMF (20 mL) at 0° C. was added HATU (10.8 g, 28.5 mmol), DIPEA (7.37 g, 57.0 mmol) and 2-oxa-6-azaspiro[3.3]heptane (1.98 g, 19.0 mmol). The resulting mixture was warmed to room temperature. After 16 h, the mixture was concentrated under vacuum then diluted with water (50 mL). The precipitate was collected by filtration and the solid was washed with water (30 mL×2) to give the title compound (4.7 g, 97%). LC-MS (M+H)$^+$=248.1.

Step 2: (4-(2-bromo-5-tosyl-5H-pyrrolo[2,3-b]pyrazin-7-yl)phenyl)(2-oxa-6-azaspiro[3.3]heptan-6-yl)methanone

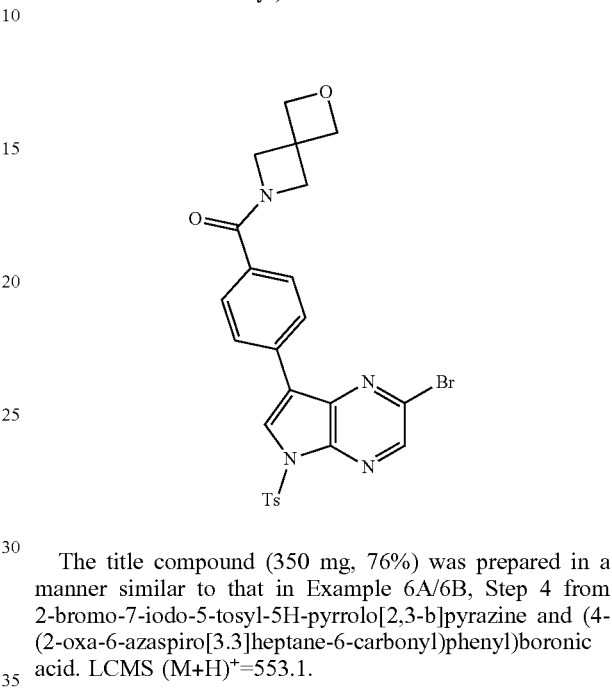

The title compound (350 mg, 76%) was prepared in a manner similar to that in Example 6A/6B, Step 4 from 2-bromo-7-iodo-5-tosyl-5H-pyrrolo[2,3-b]pyrazine and (4-(2-oxa-6-azaspiro[3.3]heptane-6-carbonyl)phenyl)boronic acid. LCMS (M+H)$^+$=553.1.

Step 3: (4-(2-(3,10-dimethyl-2,3,4,4a,5,6-hexahydro-1H-pyrazino[1,2-a]quinolin-8-yl)-5-tosyl-5H-pyrrolo[2,3-b]pyrazin-7-yl)phenyl)(2-oxa-6-azaspiro[3.3]heptan-6-yl)methanone

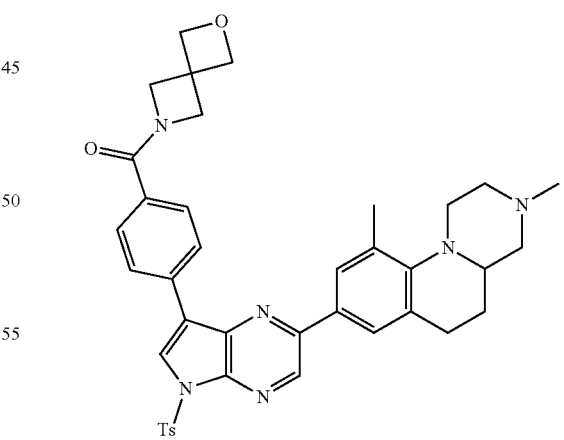

To a solution of (4-(2-bromo-5-tosyl-5H-pyrrolo[2,3-b]pyrazin-7-yl)phenyl)(2-oxa-6-azaspiro[3.3]heptan-6-yl)methanone (320 mg, 0.578 mmol), 3,10-dimethyl-8-(4,4,5,5-tetramethyl-1,3,2-dioxaborolan-2-yl)-2,3,4,4a,5,6-hexahydro-1H-pyrazino[1,2-a]quinoline (198 mg, 0.578 mmol) in 1,4-dioxane (20 mL) and water (10 mL) was added XPhos Pd G2 (47 mg, 0.06 mmol) and K$_3$PO$_4$ (254 mg, 1.2 mmol). The reaction mixture was stirred at 50° C. under N₂ overnight. Water (20 mL) was added and the mixture was extracted with EtOAc (20 mL×3). The combined organic layer was washed with brine, dried over Na₂SO₄, filtered and concentrated to give the title compound (398 mg, crude). This material was used in step 4 without further purification. LC-MS (M+H)⁺=689.0.

Step 4: (R)-(4-(2-(3,10-dimethyl-2,3,4,4a,5,6-hexahydro-1H-pyrazino[1,2-a]quinolin-8-yl)-5H-pyrrolo[2,3-b]pyrazin-7-yl)phenyl)(2-oxa-6-azaspiro[3.3]heptan-6-yl)methanone & (S)-(4-(2-(3,10-dimethyl-2,3,4,4a,5,6-hexahydro-1H-pyrazino[1,2-a]quinolin-8-yl)-5H-pyrrolo[2,3-b]pyrazin-7-yl)phenyl)(2-oxa-6-azaspiro[3.3]heptan-6-yl)methanone

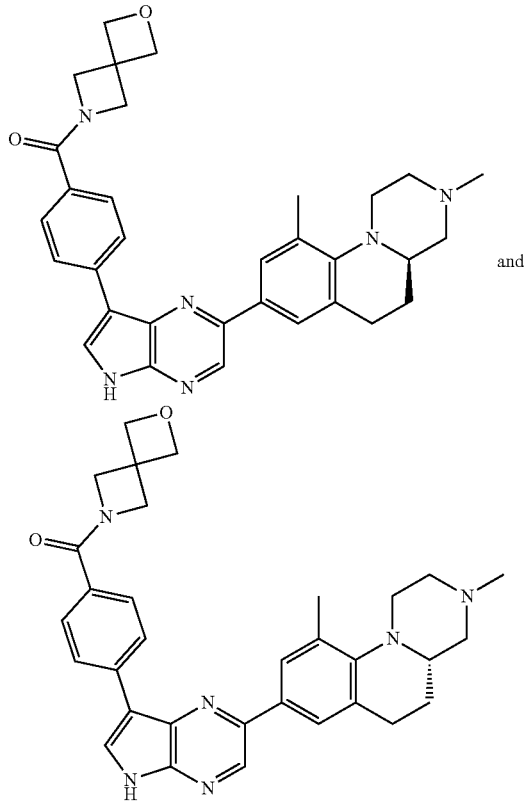

and

To a solution of (4-(2-(3,10-dimethyl-2,3,4,4a,5,6-hexahydro-1H-pyrazino[1,2-a]quinolin-8-yl)-5-tosyl-5H-pyrrolo[2,3-b]pyrazin-7-yl)phenyl)(2-oxa-6-azaspiro[3.3]heptan-6-yl)methanone (398 mg, 0.578 mmol) in 1,4-dioxane (25 mL) and H₂O (25 mL) was added K₂CO₃ (319 mg, 2.31 mmol). The resulting mixture was stirred at 80° C. for 6 h. Water (30 mL) was added and the mixture was extracted with EtOAc (30 mL×3). The combined organic layer was washed with brine, dried over Na₂SO₄, filtered and concentrated. The residue was purified by silica gel chromatography (DCM: MeOH=20:1) to give the isomeric mixture (165 mg) which was separated by chiral HPLC to give Example 9A/9B.

Example 9A: (73 mg, 24% over 2 steps) ¹H NMR (400 MHz, DMSO-d6) δ 12.39 (s, 1H), 8.82 (s, 1H), 8.51 (s, 1H), 8.43-8.37 (m, 2H), 7.78 (s, 1H), 7.75-7.67 (m, 3H), 4.70 (s, 4H), 4.57 (s, 2H), 4.23 (s, 2H), 3.10-2.99 (m, 2H), 2.97-2.86 (m, 3H), 2.64-2.52 (m, 3H), 2.40-2.29 (m, 4H), 2.21 (s, 3H), 2.19-2.09 (m, 1H), 1.70-1.60 (m, 1H). LC-MS (M+H)⁺=535.5. tR on chiral-HPLC: 8.42 min.

Example 9A: (55 mg, 18% over 2 steps)¹H NMR (400 MHz, DMSO-d6) δ 12.38 (s, 1H), 8.82 (s, 1H), 8.51 (s, 1H), 8.44-8.36 (m, 2H), 7.78 (s, 1H), 7.75-7.68 (m, 3H), 4.70 (s, 4H), 4.57 (s, 2H), 4.23 (s, 2H), 3.11-2.99 (m, 2H), 2.98-2.86 (m, 3H), 2.64-2.52 (m, 3H), 2.42-2.31 (m, 4H), 2.24 (s, 3H), 2.19-2.06 (m, 1H), 1.70-1.59 (m, 1H). LC-MS (M+H)⁺=535.5. tR on chiral-HPLC: 10.02 min.

Prep-HPLC Condition

| Column | CHIRALPAK AD-H |
| --- | --- |
| Column size | 2 cm × 25 cm, 5 µm |
| Injection | 1.0 mL |
| Mobile phase | Hexane:EtOH = 70:30 |
| Flow rate | 20 mL/min |
| Wavelength | UV 220 nm |

Chiral Analytical HPLC Condition

| Column | CHIRALPAK AD |
| --- | --- |
| Column size | 0.46 cm × 10 cm, 5 µm |
| Injection | 5 µL |
| Mobile phase | Hex(0.1% DEA):EtOH = 70:30 |
| Flow rate | 1.0 mL/min |
| Wavelength | UV 214 nm |

Example 10A/10B 4-(2-((R)-3,10-dimethyl-2,3,4,4a,5,6-hexahydro-1H-pyrazino[1,2-a]quinolin-8-yl)-5H-pyrrolo[2,3-b]pyrazin-7-yl)-N-methyl-N—(((S)-tetrahydrofuran-3-yl)methyl)benzamide & 4-(2-((S)-3,10-dimethyl-2,3,4,4a,5,6-hexahydro-1H-pyrazino[1,2-a]quinolin-8-yl)-5H-pyrrolo[2,3-b]pyrazin-7-yl)-N-methyl-N—(((S)-tetrahydrofuran-3-yl)methyl)benzamide

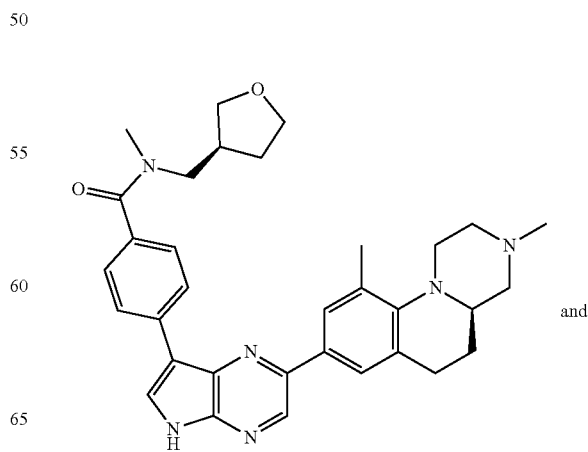

and

-continued

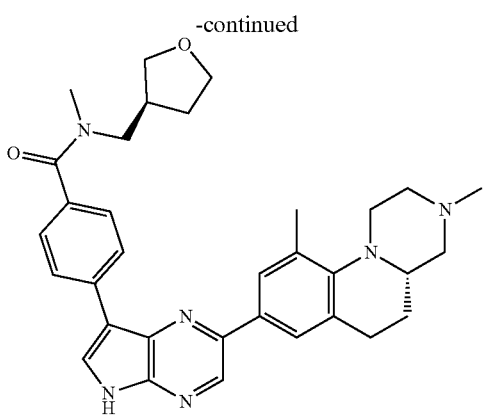

Step 1: (S)-4-(2-bromo-5-tosyl-5H-pyrrolo[2,3-b]pyrazin-7-yl)-N-methyl-N-((tetrahydrofuran-3-yl)methyl)benzamide

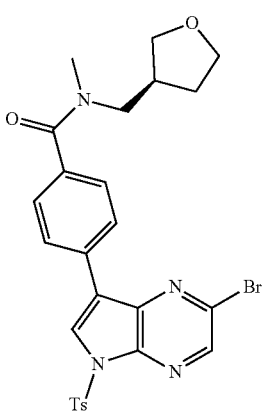 [SMILES: Cc1ccc(S(=O)(=O)n2cc(-c3ccc(C(=O)N(C)C[C@@H]4CCOC4)cc3)c3nc(Br)cnc32)cc1]

To a solution of (S)—N-methyl-N-((tetrahydrofuran-3-yl)methyl)-4-(4,4,5,5-tetramethyl-1,3,2-dioxaborolan-2-yl)benzamide (400 mg, 1.16 mmol) and 2-bromo-7-iodo-5-tosyl-5H-pyrrolo[2,3-b]pyrazine (665 mg, 1.39 mmol) in dioxane (40 mL) and H$_2$O (8 mL) were added Pd(dppf)Cl$_2$ (85 mg, 0.116 mmol) and K$_2$CO$_3$ (320 mg, 2.32 mmol) under N$_2$. The mixture was refluxed for 5 h under a condenser. The mixture was cooled to room temperature and diluted with EtOAc (50 mL), then washed with brine (50 mL), dried over Na$_2$SO$_4$, and concentrated under reduced pressure. The residue was purified by silica gel chromatography, eluted with EtOAc/PE (1:3) to give the title compound (350 mg, 58%). LC-MS (M+H)$^+$=568.9, 570.9.

Step 2: 4-(2-(3,10-dimethyl-2,3,4,4a,5,6-hexahydro-1H-pyrazino[1,2-a]quinolin-8-yl)-5-tosyl-5H-pyrrolo[2,3-b]pyrazin-7-yl)-N-methyl-N—(((S)-tetrahydrofuran-3-yl)methyl)benzamide

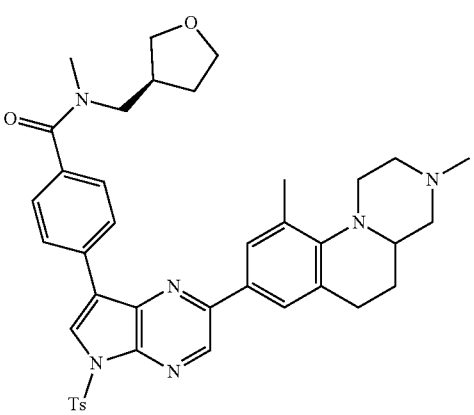 [SMILES: Cc1ccc(S(=O)(=O)n2cc(-c3ccc(C(=O)N(C)C[C@@H]4CCOC4)cc3)c3nc(-c4cc(C)c5c(c4)CCC4CN(C)CCN54)cnc32)cc1]

To a solution of (S)-4-(2-bromo-5-tosyl-5H-pyrrolo[2,3-b]pyrazin-7-yl)-N-methyl-N-((tetrahydrofuran-3-yl)methyl)benzamide (200 mg, 0.349 mmol), 3,10-dimethyl-8-(4,4,5,5-tetramethyl-1,3,2-dioxaborolan-2-yl)-2,3,4,4a,5,6-hexahydro-1H-pyrazino[1,2-a]quinoline (119 mg, 0.349 mmol) in 1,4-dioxane (20 mL) and water (10 mL) was added XPhos Pd G2 (28 mg, 0.035 mmol) and K$_3$PO$_4$ (148 mg, 0.698 mmol). The reaction mixture was stirred at 80° C. under N2 overnight. Water (20 mL) was added and the mixture was extracted with EtOAc (20 mL×3). The combined organic layer was washed with brine, dried over Na$_2$SO$_4$, filtered and concentrated to give the title compound (246 mg, crude). This material was used in step 4 without further purification. LC-MS (M+H)$^+$=705.1.

Step 3: 4-(2-((R)-3,10-dimethyl-2,3,4,4a,5,6-hexahydro-1H-pyrazino[1,2-a]quinolin-8-yl)-5H-pyrrolo[2,3-b]pyrazin-7-yl)-N-methyl-N—(((S)-tetrahydrofuran-3-yl)methyl)benzamide & 4-(2-((S)-3,10-dimethyl-2,3,4,4a,5,6-hexahydro-1H-pyrazino[1,2-a]quinolin-8-yl)-5H-pyrrolo[2,3-b]pyrazin-7-yl)-N-methyl-N—(((S)-tetrahydrofuran-3-yl)methyl)benzamide

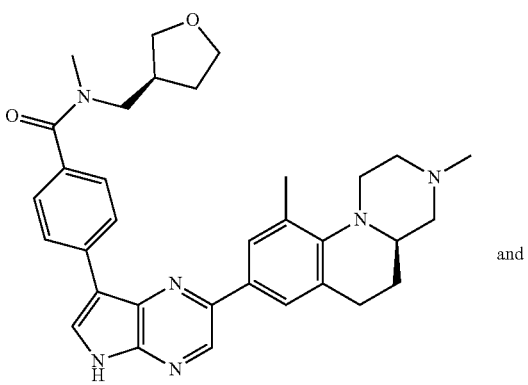

and

-continued

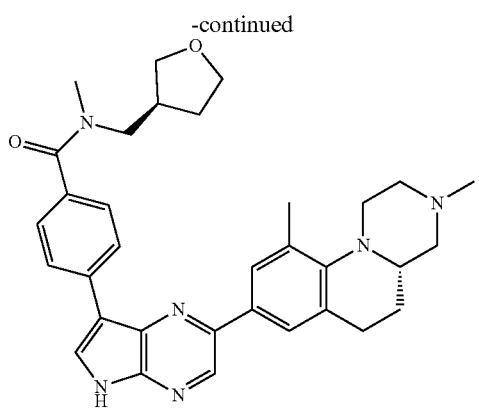

To a solution of 4-(2-(3,10-dimethyl-2,3,4,4a,5,6-hexahydro-1H-pyrazino[1,2-a]quinolin-8-yl)-5-tosyl-5H-pyrrolo[2,3-b]pyrazin-7-yl)-N-methyl-N—(((S)-tetrahydrofuran-3-yl)methyl)benzamide (246 mg, 0.349 mmol) in 1,4-dioxane (25 mL) and H$_2$O (25 mL) was added K$_2$CO$_3$ (193 mg, 1.40 mmol). The resulting mixture was stirred at 80° C. for 6 h. Water (30 mL) was added and the mixture was extracted with EtOAc (30 mL×3). The combined organic layer was washed with brine, dried over Na$_2$SO$_4$, filtered and concentrated. The residue was purified by silica gel chromatography (DCM:MeOH=20:1) to give the isomeric mixture (108 mg) which was separated by chiral HPLC to give Example 10A/10B.

Example 10A: (45 mg, 23% over 2 steps) $^1$H NMR (400 MHz, DMSO-d6) δ 12.34 (s, 1H), 8.81 (s, 1H), 8.48 (s, 1H), 8.42-8.34 (m, 2H), 7.78 (s, 1H), 7.72 (s, 1H), 7.53-7.42 (m, 2H), 3.87-3.37 (m, 6H), 3.09-2.98 (m, 5H), 2.95-2.87 (m, 3H), 2.72-2.52 (m, 5H), 2.41-2.29 (m, 4H), 2.21 (s, 3H), 2.18-1.84 (m, 2H), 1.69-1.57 (m, 1H). LC-MS (M+H)$^+$=551.0. tR on chiral-HPLC: 2.67 min.

Example 10B: (41 mg, 21% over 2 steps) $^1$H NMR (400 MHz, DMSO-d6) δ 12.34 (s, 1H), 8.81 (s, 1H), 8.48 (s, 1H), 8.41-8.35 (m, 2H), 7.78 (s, 1H), 7.71 (s, 1H), 7.52-7.43 (m, 2H), 3.88-3.37 (m, 6H), 3.08-2.96 (m, 5H), 2.96-2.86 (m, 3H), 2.70-2.51 (m, 5H), 2.40-2.27 (m, 4H), 2.21 (s, 3H), 2.18-1.84 (m, 2H), 1.67-1.60 (m, 1H). LC-MS (M+H)$^+$=551.0. tR on chiral-HPLC: 3.83 min.

Prep-HPLC Condition

| Column | CHIRALPAK IG |
| --- | --- |
| Column size | 2 cm × 25 cm, 5 µm |
| Injection | 1.0 mL |
| Mobile phase | MtBE(2 mM NH$_3$—MeOH):IPA = 80:20 |
| Flow rate | 20 mL/min |
| Wavelength | UV 220 nm |

Chiral Analytical HPLC Condition

| Column | CHIRALPAK IG-3 |
| --- | --- |
| Column size | 0.46 cm × 5 cm, 3 µm |
| Injection | 5 µL/10 µL |
| Mobile phase | MtBE(0.1% DEA):IPA = 80:20 |
| Flow rate | 1.0 mL/min |
| Wavelength | UV 220 nm |

Example 11A/11B 4-(2-((R)-3,10-dimethyl-2,3,4,4a,5,6-hexahydro-1H-pyrazino[1,2-a] quinolin-8-yl)-5H-pyrrolo[2,3-b]pyrazin-7-yl)-N,2-dimethyl-N—(((S)-tetrahydrofuran-3-yl)methyl)benzamide & 4-(2-((S)-3,10-dimethyl-2,3,4,4a,5,6-hexahydro-1H-pyrazino[1,2-a]quinolin-8-yl)-5H-pyrrolo[2,3-b]pyrazin-7-yl)-N,2-dimethyl-N—(((S)-tetrahydrofuran-3-yl)methyl)benzamide

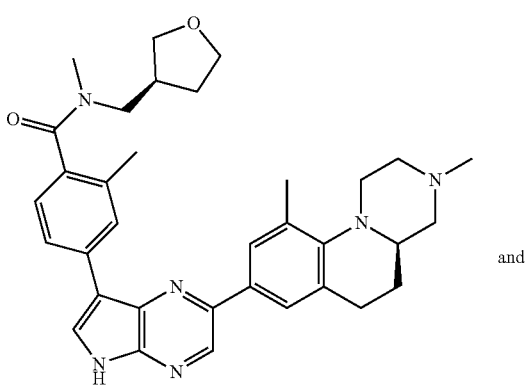

and

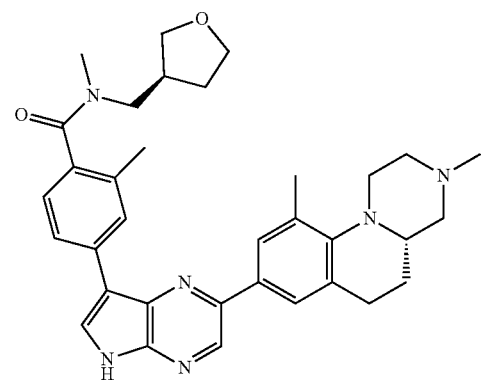

Step 1: (S)-4-bromo-2-methyl-N-((tetrahydrofuran-3-yl)methyl)benzamide

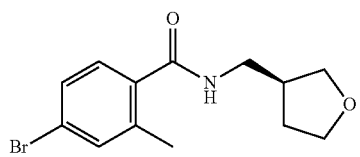 [SMILES: Cc1cc(Br)ccc1C(=O)NC[C@@H]1CCOC1]

The title compound (1.10 g, 81%) was prepared in a manner similar to that in Example 4A/4B, Step 1 from 4-bromo-2-methylbenzoic acid and (S)-(tetrahydrofuran-3-yl)methanamine. LC-MS (M+H)$^+$=298.0, 300.0.

Step 2: (S)-4-bromo-N,2-dimethyl-N-((tetrahydro-furan-3-yl)methyl)benzamide

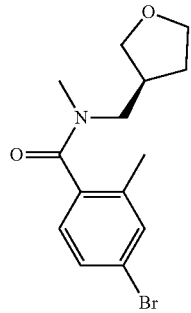 [SMILES: Cc1cc(Br)ccc1C(=O)N(C)C[C@@H]1CCOC1]

The title compound (1.07 g, 93%) was prepared in a manner similar to that in Example 4A/4B, Step 2 from (S)-4-bromo-2-methyl-N-((tetrahydrofuran-3-yl)methyl) benzamide and iodomethane. LC-MS (M+H)$^+$=311.9, 313.9.

Step 3: (S)—N,2-dimethyl-N-((tetrahydrofuran-3-yl)methyl)-4-(4,4,5,5-tetramethyl-1,3,2-dioxaboro-lan-2-yl)benzamide

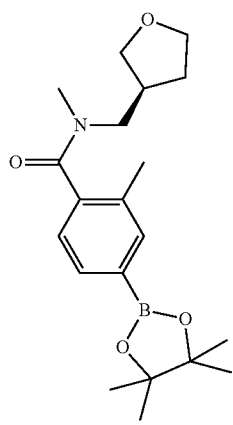 [SMILES: Cc1cc(B2OC(C)(C)C(C)(C)O2)ccc1C(=O)N(C)C[C@@H]1CCOC1]

The title compound (1.20 g, 99%) was prepared in a manner similar to that in Example 4A/4B, Step 3 from (S)-4-bromo-N,2-dimethyl-N-((tetrahydrofuran-3-yl) methyl)benzamide and 4,4,4',4',5,5,5',5'-octamethyl-2,2'-bi (1,3,2-dioxaborolane). LC-MS (M+H)$^+$=359.9.

Step 4: (S)-4-(2-bromo-5-tosyl-5H-pyrrolo[2,3-b] pyrazin-7-yl)-N,2-dimethyl-N-((tetrahydrofuran-3-yl)methyl)benzamide

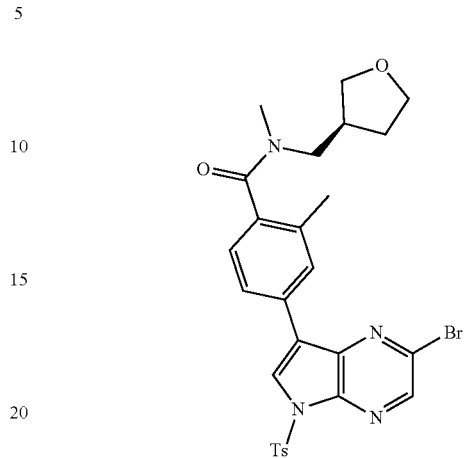

The title product (400 mg, 41%) was prepared in a manner similar to that in Example 4A/4B, Step 4 from 2-bromo-7-iodo-5-tosyl-5H-pyrrolo[2,3-b]pyrazine and (S)—N,2-dimethyl-N-((tetrahydrofuran-3-yl)methyl)-4-(4,4,5,5-tetramethyl-1,3,2-dioxaborolan-2-yl)benzamide. LC-MS (M+H)$^+$=582.9, 584.9.

Step 5: 4-(2-((R)-3,10-dimethyl-2,3,4,4a,5,6-hexahydro-1H-pyrazino[1,2-a]quinolin-8-yl)-5H-pyrrolo[2,3-b]pyrazin-7-yl)-N,2-dimethyl-N—(((S)-tetrahydrofuran-3-yl)methyl)benzamide & 4-(2-((S)-3,10-dimethyl-2,3,4,4a,5,6-hexahydro-1H-pyrazino[1,2-a]quinolin-8-yl)-5H-pyrrolo[2,3-b]pyrazin-7-yl)-N,2-dimethyl-N—(((S)-tetrahydrofuran-3-yl)methyl) benzamide

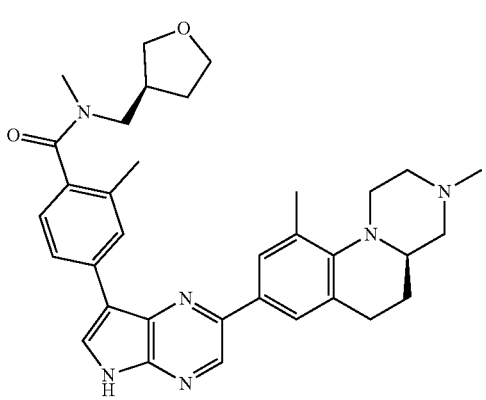

and

-continued

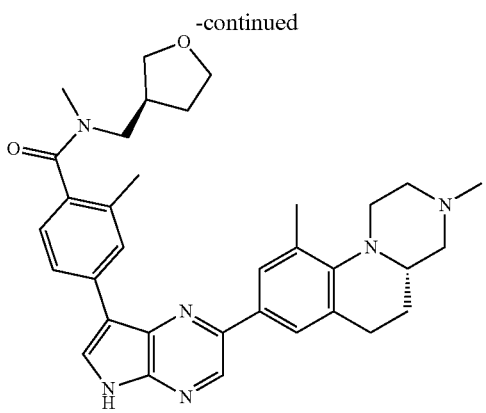

To a solution of (S)-4-(2-bromo-5-tosyl-5H-pyrrolo[2,3-b]pyrazin-7-yl)-N,2-dimethyl-N-((tetrahydrofuran-3-yl)methyl)benzamide (100 mg, 0.171 mmol) and 3,10-dimethyl-8-(4,4,5,5-tetramethyl-1,3,2-dioxaborolan-2-yl)-2,3,4,4a,5,6-hexahydro-1H-pyrazino[1,2-a]quinoline (59 mg, 0.171 mmol) in 1,4-dioxane (15 mL) and H$_2$O (15 mL) was added XPhos Pd G2 (14 mg, 0.017 mmol) and K$_2$CO$_3$ (71 mg, 0.513 mmol). The resulting solution was stirred at 90° C. under N$_2$ overnight and 100° C. for another 3 h. Water (15 mL) was added and the mixture was extracted with EtOAc (15 mL×3). The combined organic layer was washed with brine, dried over Na$_2$SO$_4$, filtered and concentrated. The residue was purified by silica gel chromatography (DCM:MeOH=20:1) to give the isomeric mixture (53 mg) which was separated by chiral HPLC to give Example 11A/11B.

Example 11A: (20 mg, 21%) $^1$H NMR (400 MHz, DMSO-d6) δ 12.28 (s, 1H), 8.80 (s, 1H), 8.47-8.40 (m, 1H), 8.30-8.24 (m, 1H), 8.22-8.15 (m, 1H), 7.80 (s, 1H), 7.74 (s, 1H), 7.26-7.19 (m, 1H), 3.86-3.42 (m, 5H), 3.25-3.14 (m, 1H), 3.09-2.98 (m, 3H), 2.97-2.87 (m, 3H), 2.83 (s, 2H), 2.71-2.53 (m, 4H), 2.41-2.26 (m, 7H), 2.21 (s, 3H), 2.18-2.10 (m, 1H), 2.07-1.94 (m, 1H), 1.93-1.57 (m, 2H). LC-MS (M+H)$^+$=565.0. tR on chiral-HPLC: 10.55 min.

Example 11B: (25 mg, 26%) $^1$H NMR (400 MHz, DMSO-d6) δ 12.30 (s, 1H), 8.80 (s, 1H), 8.47-8.40 (m, 1H), 8.30-8.24 (m, 1H), 8.22-8.15 (m, 1H), 7.80 (s, 1H), 7.73 (s, 1H), 7.26-7.19 (m, 1H), 3.87-3.40 (m, 5H), 3.25-3.14 (m, 1H), 3.09-2.98 (m, 3H), 2.97-2.88 (m, 3H), 2.83 (s, 2H), 2.71-2.51 (m, 4H), 2.41-2.26 (m, 7H), 2.21 (s, 3H), 2.18-2.10 (m, 1H), 2.07-1.94 (m, 1H), 1.93-1.58 (m, 2H). LC-MS (M+H)$^+$=565.0. tR on chiral-HPLC: 12.82 min.

Prep-HPLC Condition

| Column | CHIRALPAK AD-H |
| --- | --- |
| Column size | 2 cm × 25 cm, 5 μm |
| Injection | 0.3 mL |
| Mobile phase | Hexane (2 mMNH$_3$—MeOH):EtOH = 80:20 |
| Flow rate | 20 mL/min |
| Wavelength | UV 220 nm |

Chiral Analytical HPLC Condition

| Column | CHIRALPAK AD |
| --- | --- |
| Column size | 0.46 cm × 10 cm, 5 μm |
| Injection | 5 μL |
| Mobile phase | Hex(0.1% DEA):EtOH = 80:20 |
| Flow rate | 1.0 mL/min |
| Wavelength | UV 214 nm |

Example 12A/12B (R)-4-(2-(3,10-dimethyl-2,3,4,4a,5,6-hexahydro-1H-pyrazino[1,2-a]quinolin-8-yl)-5H-pyrrolo[2,3-b]pyrazin-7-yl)-N-(2-hydroxy-2-methylpropyl)-N-methylbenzamide & (S)-4-(2-(3,10-dimethyl-2,3,4,4a,5,6-hexahydro-1H-pyrazino[1,2-a]quinolin-8-yl)-5H-pyrrolo[2,3-b]pyrazin-7-yl)-N-(2-hydroxy-2-methylpropyl)-N-methylbenzamide

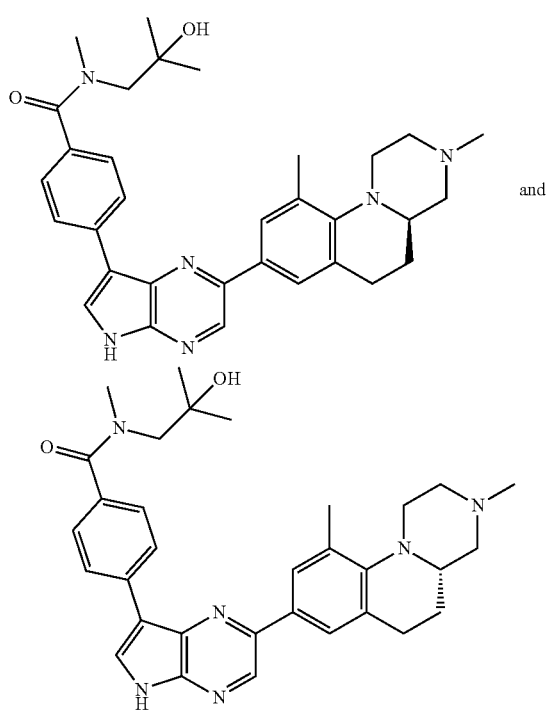

and

Step 1: 4-((2-hydroxy-2-methylpropyl)(methyl)carbamoyl)phenylboronic Acid

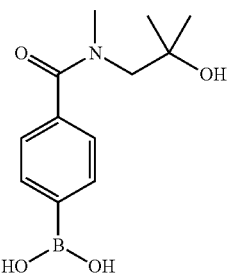 [SMILES: CN(CC(C)(C)O)C(=O)c1ccc(B(O)O)cc1]

The title compound (415 mg, 45%) was prepared in a manner similar to that in Example 9A/9B, Step 1 from 2-methyl-1-(methylamino)propan-2-ol and 4-boronobenzoic acid. LC-MS (M+H)⁺=252.2.

Step 2: 4-(2-bromo-5-tosyl-5H-pyrrolo[2,3-b]pyrazin-7-yl)-N-(2-hydroxy-2-methylpropyl)-N-methylbenzamide

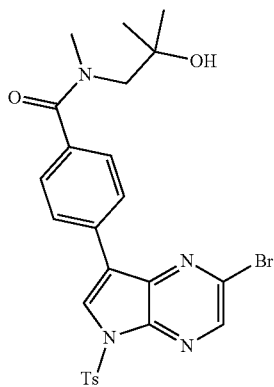 [SMILES: Cc1ccc(S(=O)(=O)n2cc(-c3ccc(C(=O)N(C)CC(C)(C)O)cc3)c3nc(Br)cnc32)cc1]

The title compound (241 mg, 32%) was prepared in a manner similar to that in Example 6A/6B, Step 4 from 4-((2-hydroxy-2-methylpropyl)(methyl)carbamoyl)phenylboronic acid and 2-bromo-7-iodo-5-tosyl-5H-pyrrolo[2,3-b]pyrazine. LC-MS (M+H)⁺=557.2.

Step 3: (R)-4-(2-(3,10-dimethyl-2,3,4,4a,5,6-hexahydro-1H-pyrazino[1,2-a]quinolin-8-yl)-5H-pyrrolo[2,3-b]pyrazin-7-yl)-N-(2-hydroxy-2-methylpropyl)-N-methylbenzamide & (S)-4-(2-(3,10-dimethyl-2,3,4,4a,5,6-hexahydro-1H-pyrazino[1,2-a]quinolin-8-yl)-5H-pyrrolo[2,3-b]pyrazin-7-yl)-N-(2-hydroxy-2-methylpropyl)-N-methylbenzamide

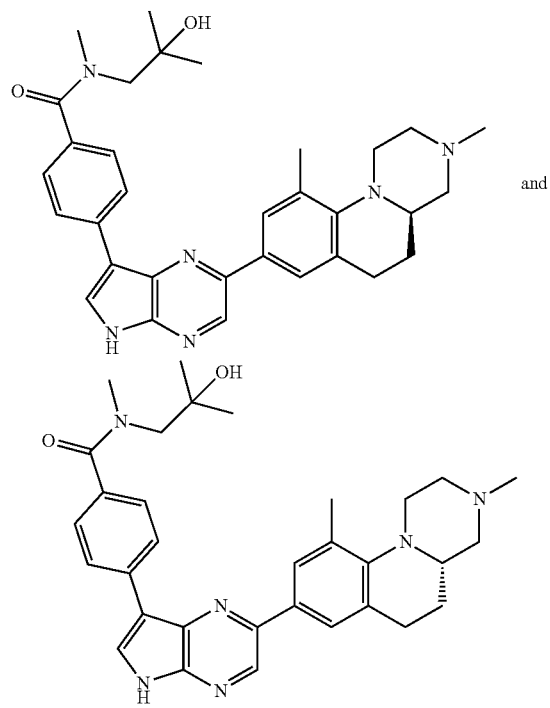

To a solution of 4-(2-bromo-5-tosyl-5H-pyrrolo[2,3-b]pyrazin-7-yl)-N-(2-hydroxy-2-methylpropyl)-N-methylbenzamide (295 mg, 0.530 mmol) and 3,10-dimethyl-8-(4,4,5,5-tetramethyl-1,3,2-dioxaborolan-2-yl)-2,3,4,4a,5,6-hexahydro-1H-pyrazino[1,2-a]quinoline (181 mg, 0.530 mmol) in 1,4-dioxane (20 mL) and H₂O (20 mL) was added XPhos Pd G2 (42 mg, 0.053 mmol) and K₂CO₃ (219 mg, 1.59 mmol). The resulting mixture was stirred at 90° C. under N₂ overnight. Water (20 mL) was added and the mixture was extracted with EtOAc (20 mL×3). The combined organics was washed with brine, dried over Na₂SO₄, filtered and concentrated. The residue was purified by silica gel chromatography (DCM:MeOH=20:1) to give the isomeric mixture (145 mg) which was separated by chiral HPLC to give Example 12A/12B.

Example 12A: (52 mg, 18%) ¹H NMR (400 MHz, DMSO-d6) δ 12.33 (s, 1H), 8.81 (s, 1H), 8.51-8.45 (m, 1H), 8.41-8.34 (m, 2H), 7.79 (s, 1H), 7.72 (s, 1H), 7.56-7.38 (m, 2H), 4.67-4.50 (m, 1H), 3.49 (s, 1H), 3.40-3.28 (m, 1H), 3.10 (s, 3H), 3.08-2.99 (m, 2H), 2.98-2.86 (m, 3H), 2.57 (s, 3H), 2.43-2.31 (m, 4H), 2.25 (s, 3H), 2.19-2.06 (m, 1H), 1.71-1.59 (m, 1H), 1.30-1.10 (m, 5H), 1.00-0.90 (m, 1H). LC-MS (M+H)⁺=539.5. tR on chiral-HPLC: 14.93 min.

Example 12B: (52 mg, 16%) ¹H NMR (400 MHz, DMSO-d6) δ 12.33 (s, 1H), 8.81 (s, 1H), 8.50-8.44 (m, 1H), 8.42-8.35 (m, 2H), 7.79 (s, 1H), 7.72 (s, 1H), 7.56-7.38 (m, 2H), 4.68-4.51 (m, 1H), 3.49 (s, 1H), 3.38-3.28 (m, 1H), 3.10 (s, 3H), 3.08-2.99 (m, 2H), 2.99-2.87 (m, 3H), 2.57 (s, 3H), 2.43-2.31 (m, 4H), 2.23 (s, 3H), 2.19-2.06 (m, 1H), 1.70-1.60 (m, 1H), 1.30-1.10 (m, 5H), 1.00-0.90 (m, 1H). LC-MS (M+H)⁺=539.6. tR on chiral-HPLC: 16.98 min.

Prep-HPLC Condition

| Column | CHIRALPAK AD-H |
| --- | --- |
| Column size | 3 cm × 25 cm, 5 µm |
| Injection | 0.8 mL |
| Mobile phase | Hexane (2 mM NH₃—MeOH):EtOH = 90:10 |
| Flow rate | 45 mL/min |
| Wavelength | UV 220 nm |

Chiral Analytical HPLC Condition

| Column | CHIRAL ART Amylose-C Neo |
| --- | --- |
| Column size | 0.46 cm × 15 cm, 3 µm |
| Injection | 5 µL/10 µL |
| Mobile phase | Hex(0.1% DEA):EtOH = 85:15 |
| Flow rate | 1.0 mL/min |
| Wavelength | UV 214 nm |

Example 13A/13B (R)-4-(2-(3,10-dimethyl-2,3,4,4a,5,6-hexahydro-1H-pyrazino[1,2-a]quinolin-8-yl)-5H-pyrrolo[2,3-b]pyrazin-7-yl)-N-(2-hydroxy-2-methyl propyl)-N,2-dimethylbenzamide & (S)-4-(2-(3,10-dimethyl-2,3,4,4a,5,6-hexahydro-1H-pyrazino[1,2-a] quinolin-8-yl)-5H-pyrrolo[2,3-b]pyrazin-7-yl)-N-(2-hydroxy-2-methylpropyl)-N,2-dimethylbenzamide

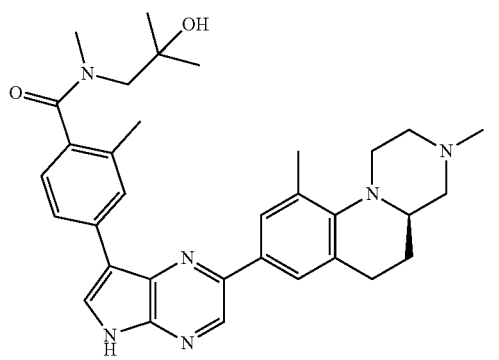

and

Step 1: 4-bromo-N-(2-hydroxy-2-methylpropyl)-N,2-dimethylbenzamide

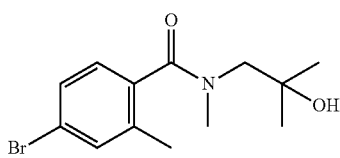 [SMILES: Cc1cc(Br)ccc1C(=O)N(C)CC(C)(C)O]

The title compound (2.5 g, 86%) was prepared in a manner similar to that in Example 2A/2B, Step 1 from 4-bromo-2-methylbenzoic acid and 2-methyl-1-(methylamino)propan-2-ol. LCMS (M+H)⁺=300.0, 302.0.

Step 2: N-(2-hydroxy-2-methylpropyl)-N,2-dimethyl-4-(4,4,5,5-tetramethyl-1,3,2-dioxaborolan-2-yl)benzamide

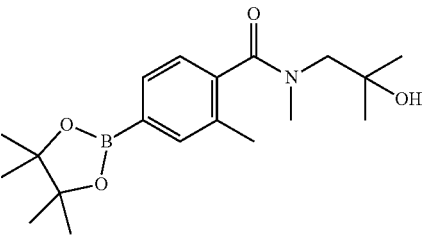 [SMILES: Cc1cc(B2OC(C)(C)C(C)(C)O2)ccc1C(=O)N(C)CC(C)(C)O]

The title compound (2.5 g, 87%) was prepared in a manner similar to that in Example 2A/2B, Step 5 from 4-bromo-N-(2-hydroxy-2-methylpropyl)-N,2-dimethylbenzamide and 4,4,4',4',5,5,5',5'-octamethyl-2,2'-bi(1,3,2-dioxaborolane). LC-MS (M+H)⁺=348.0.

Step 3: 4-(2-bromo-5-tosyl-5H-pyrrolo[2,3-b]pyrazin-7-yl)-N-(2-hydroxy-2-methylpropyl)-N,2-dimethylbenzamide

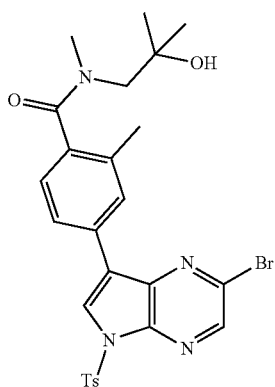 [SMILES: Cc1ccc(S(=O)(=O)n2cc(-c3ccc(C(=O)N(C)CC(C)(C)O)c(C)c3)c3nc(Br)cnc32)cc1]

The title compound (2.5 g, 87%) was prepared in a manner similar to that in Example 6A/6B, Step 4 from 2-bromo-7-iodo-5-tosyl-5H-pyrrolo[2,3-b]pyrazine and N-(2-hydroxy-2-methylpropyl)-N,2-dimethyl-4-(4,4,5,5-tetramethyl-1,3,2-dioxaborolan-2-yl)benzamide. LC-MS (M+H)⁺=571.0.

Step 4: (R)-4-(2-(3,10-dimethyl-2,3,4,4a,5,6-hexahydro-1H-pyrazino[1,2-a]quinolin-8-yl)-5H-pyrrolo[2,3-b]pyrazin-7-yl)-N-(2-hydroxy-2-methylpropyl)-N,2-dimethylbenzamide & (S)-4-(2-(3,10-dimethyl-2,3,4,4a,5,6-hexahydro-1H-pyrazino[1,2-a]quinolin-8-yl)-5H-pyrrolo[2,3-b]pyrazin-7-yl)-N-(2-hydroxy-2-methylpropyl)-N,2-dimethylbenzamide

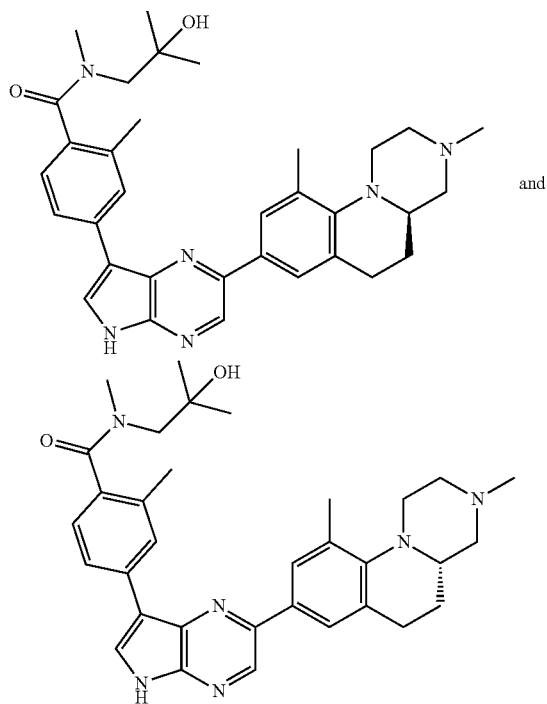

and

To a solution of 4-(2-bromo-5-tosyl-5H-pyrrolo[2,3-b]pyrazin-7-yl)-N-(2-hydroxy-2-methylpropyl)-N,2-dimethylbenzamide (327 mg, 0.573 mmol) and 3,10-dimethyl-8-(4,4,5,5-tetramethyl-1,3,2-dioxaborolan-2-yl)-2,3,4,4a,5,6-hexahydro-1H-pyrazino[1,2-a]quinoline (196 mg, 0.573 mmol) in 1,4-dioxane (20 mL) and H$_2$O (20 mL) was added XPhos Pd G2 (45 mg, 0.057 mmol) and K$_2$CO$_3$ (237 mg, 1.719 mmol). The resulting solution was stirred at 90° C. under N$_2$ overnight. Water (20 mL) was added and the mixture was extracted with EtOAc (20 mL×3). The combined organic layer was washed with brine, dried over Na$_2$SO$_4$, filtered and concentrated. The crude was purified by silica gel chromatography (DCM:MeOH=20:1) to give the isomeric mixture (84 mg) which was separated by chiral HPLC to give Example 13A/13B.

Example 13A: (28 mg, 9%)$^1$H NMR (400 MHz, DMSO-d6) δ 12.28 (s, 1H), 8.82 (s, 1H), 8.46-8.40 (m, 1H), 8.29-8.24 (s, 1H), 8.23-8.12 (m, 1H), 7.80 (s, 1H), 7.74 (s, 1H), 7.77-7.70 (m, 1H), 4.67-4.48 (m, 1H), 3.49 (s, 1H), 3.31-3.11 (m, 2H), 3.10-2.98 (m, 2H), 2.96-2.87 (m, 5H), 2.69-2.52 (m, 3H), 2.40-2.30 (m, 6H), 2.29-2.07 (m, 5H), 1.69-1.59 (m, 1H), 1.26-1.14 (m, 5H), 0.99-0.91 (m, 1H). LC-MS (M+H)$^+$=553.6. tR on chiral-HPLC: 13.36 min.

Example 13B: (24 mg, 8%)$^1$H NMR (400 MHz, DMSO-d6) δ 12.27 (s, 1H), 8.82 (s, 1H), 8.46-8.40 (m, 1H), 8.29-8.24 (s, 1H), 8.23-8.12 (m, 1H), 7.80 (s, 1H), 7.74 (s, 1H), 7.77-7.70 (m, 1H), 4.64-4.50 (m, 1H), 3.49 (s, 1H), 3.31-3.11 (m, 2H), 3.10-2.98 (m, 2H), 2.96-2.87 (m, 5H), 2.69-2.52 (m, 3H), 2.40-2.30 (m, 6H), 2.29-2.08 (m, 5H), 1.69-1.60 (m, 1H), 1.27-1.13 (m, 5H), 0.98-0.90 (m, 1H). LC-MS (M+H)$^+$=553.6. tR on chiral-HPLC: 16.57 min.

Prep-HPLC Condition

| Column | CHIRALPAK AD-H |
|---|---|
| Column size | 3 cm × 25 cm, 5 μm |
| Injection | 0.5 mL |
| Mobile phase | Hexane (2 mM NH$_3$—MeOH):EtOH = 80:20 |
| Flow rate | 30 mL/min |
| Wavelength | UV 220 nm |

Chiral Analytical HPLC Condition

| Column | CHIRAL ART Amylose-C Neo |
|---|---|
| Column size | 0.46 cm × 15 cm, 3 μm |
| Injection | 5 μL/10 μL |
| Mobile phase | Hex(0.1% DEA):EtOH = 85:15 |
| Flow rate | 1.0 mL/min |
| Wavelength | UV 214 nm |

Biological Activity

HPK Kinase Activity Assay at 1 mM ATP

Compounds disclosed herein were tested for inhibition of HPK1 kinase (aa1-346, Life Technologies) activity in assays based on the time-resolved fluorescence-resonance energy transfer (TR-FRET) methodology. The assays were carried out in 384-well low volume black plates in a reaction mixture containing HPK1 kinase (40 nM), 1 mM ATP, 0.5 μM STK1 substrate and 0-10 μM compound in buffer containing 50 mM HEPES, 0.01% BSA, 0.1 mM Orthovanadate, 10 mM MgCl$_2$, 1 mM DTT, pH=7.0, 0.005% Tween-20. The kinase was incubated with the compounds disclosed herein or DMSO for 60 minutes at room temperature and the reaction was initiated by the addition of ATP and STK1 substrate. After reaction at room temperature for 120 minutes, an equal volume of stop/detection solution was added according to the manufacture's instruction (CisBio). The stop/detection solution contained STK Antibody-Cryptate and XL665-conjugated streptavidin in Detection Buffer. The TR-FRET signals (ratio of fluorescence emission at 665 nm over emission at 620 nm with excitation at 337 nm wavelength) were recorded on a PHERAstar FS plate reader (BMG Labtech). Phosphorylation of STK1 substrate led to the binding of STK Antibody-Cryptate to the biotinylated STK1 substrate, which places fluorescent donor (Eu$^{3+}$ crypate) in close proximity to the accepter (Streptavidin-XL665), thus resulting in a high degree of fluorescence resonance energy transfer. The inhibition of HPK1 in presence of increasing concentrations of compounds was calculated based on the ratio of fluorescence at 665 nm to that at 620 nm. The IC$_{50}$ for each compound was derived from fitting the data to the four-parameter logistic equation by Graphpad Prism software. The compounds disclosed herein showed the enzymatic activity values as in Table 1.

TABLE 1

Enzymatic activity IC$_{50}$ (nM) for the compounds disclosed herein

| Comp No. | Enzymatic activity IC$_{50}$ (nM) |
|---|---|
| 1 | 31 |
| 2A | 14 |
| 2B | 19 |

TABLE 1-continued

Enzymatic activity IC$_{50}$ (nM) for the compounds disclosed herein

| Comp No. | Enzymatic activity IC$_{50}$ (nM) |
|---|---|
| 3A | 21 |
| 3B | 18 |
| 4A | 14 |
| 4B | 15 |
| 5A | 32 |
| 5B | 27 |
| 6A | 36 |
| 6B | 47 |
| 7A | 23 |
| 7B | 22 |
| 8A | 58 |
| 8B | 61 |
| 9A | 17 |
| 9B | 21 |
| 10A | 17 |
| 10B | 17 |
| 11A | 52 |
| 11B | 53 |
| 12A | 52 |
| 12B | 52 |
| 13A | 101 |
| 13B | 96 |

It is to be understood that, if any prior art publication is referred to herein; such reference does not constitute an admission that the publication forms a part of the common general knowledge in the art in any country.

The disclosures of all publications, patents, patent applications and published patent applications referred to herein by an identifying citation are hereby incorporated herein by reference in their entirety.

Although the foregoing invention has been described in some detail by way of illustration and example for purposes of clarity of understanding, it is apparent to those skilled in the art that certain minor changes and modifications will be practiced. Therefore, the description and examples should not be construed as limiting the scope of the invention.

What is claimed is:

1. A compound of Formula (I)

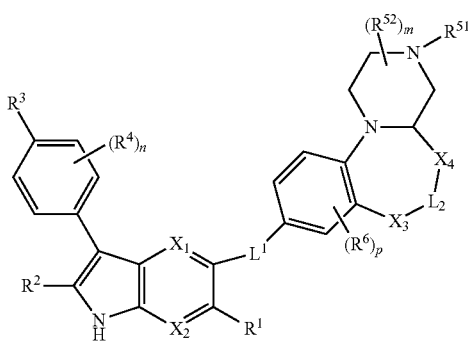

or a pharmaceutically acceptable salt thereof, or a stereoisomer thereof,
wherein
$X_1$ is CH or N;
$X_2$ is N;
$R^1$ and $R^2$ are each hydrogen
n is 0;
$R^3$ is —CONR$^{3a}$R$^{3b}$,
$R^4$, at each of its occurrences, is independently halogen or —C$_{1-8}$alkyl,
$R^{3a}$ and $R^{3b}$ are each independently hydrogen or —C$_{1-8}$alkyl, said —C$_{1-8}$ alkyl is optionally substituted with at least one substituent R$^{3e}$, wherein R$^{3e}$ is selected from —OR$^{3f}$ or heterocyclyl, wherein the heterocyclyl is a 5-, 6- or 7-membered heterocyclyl comprising 1 heteroatom selected from nitrogen or oxygen; or
$R^{3a}$ and $R^{3b}$, together with the atom(s) to which they are attached, form a 3- to 12-membered ring, said ring comprising 0, 1 or 2 additional heteroatom(s) independently selected from nitrogen and oxygen as ring member(s), said ring is optionally substituted with at least one substituent R$^{3e}$, wherein R$^{3e}$ is each independently selected from oxo, —C$_{1-8}$alkyl, —OR$^{3f}$, —NR$^{3f}$R$^{3g}$ or heterocyclyl, said —C$_{1-8}$alkyl or heterocyclyl is optionally substituted by at least one halogen;
$R^{3f}$ and $R^{3g}$ are each independently hydrogen or —C$_{1-8}$alkyl;
$L^1$ is a single bond
$R^6$ is —C$_{1-8}$alkyl,
p is 0;
$X_3$ and $X_4$ are each CH$_2$;
$L_2$ is a single bond;
$L_3$ is CH$_2$;
$R^{51}$ is hydrogen or —C$_{1-8}$alkyl; and
m is 0.

2. The compound according to claim 1, wherein:
$R^{3a}$ and $R^{3b}$ are each independently hydrogen or —C$_{1-8}$alkyl, said —C$_{1-8}$alkyl is optionally substituted with at least one substituent R$^{3e}$;
$R^{3e}$ is selected from —OR$^{3f}$ or heterocyclyl, wherein the heterocyclyl is a 5-, 6- or 7-membered heterocyclyl comprising 1 heteroatom selected from nitrogen or oxygen.

3. The compound according to claim 1, wherein:
$R^{3a}$ is —C$_{1-8}$alkyl;
$R^{3b}$ is —C$_{1-8}$alkyl optionally substituted with at least one substituent R$^{3e}$; and
$R^{3e}$ is selected from —OR$^{3f}$ or heterocyclyl, wherein the heterocyclyl is a 5-, 6- or 7-membered heterocyclyl comprising 1 heteroatom selected from nitrogen or oxygen.

4. The compound according to claim 3, wherein:
$R^{3a}$ is methyl, ethyl, propyl, 2-methylpropyl, butyl, pentyl or hexyl; and
$R^{3b}$ is methyl, ethyl, propyl, 2-methylpropyl, butyl, pentyl or hexyl, each optionally substituted with at least one substituent R$^{3e}$.

5. The compound according to claim 1, wherein:
$R^3$ is —CONR$^{3a}$R$^{3b}$;
$R^{3a}$ and $R^{3b}$, together with the nitrogen atom to which they are attached, form a 4- to 12-membered ring comprising 1 or 2 additional nitrogen or oxygen heteroatoms as ring member(s), said ring is optionally substituted with at least one substituent R$^{3e}$; and
$R^{3e}$ is each independently selected from —C$_{1-8}$alkyl, —OR$^{3f}$, or heterocyclyl, said —C$_{1-8}$alkyl or heterocyclyl is optionally substituted by at least one halogen.

6. The compound according to claim 5, wherein:
a)
$R^{3a}$ and $R^{3b}$, together with the nitrogen atom to which they are attached, form a monocyclic 3- to 8-membered ring comprising 1 or 2 additional nitrogen or oxygen heteroatoms as ring member(s), said ring is optionally substituted with at least one substituent R$^{3e}$;

or b)
- $R^{3a}$ and $R^{3b}$, together with the nitrogen atom to which they are attached, form a bicyclic spiro 7- to 12-membered ring comprising 1 or 2 additional nitrogen or oxygen heteroatoms as ring member(s), said ring is optionally substituted with at least one substituent $R^{3e}$.

7. The compound according to claim 6, wherein:

a) $R^{3a}$ and $R^{3b}$, together with the nitrogen atom to which they are attached, form a monocyclic 3- to 8-membered ring selected from azetidinyl, pyrrolidinyl, piperidinyl or piperazinyl, each of which is further substituted with a heterocyclyl group;

b) $R^{3a}$ and $R^{3b}$, together with the nitrogen atom to which they are attached, form a bicyclic spiro 7- to 12-membered ring comprising 1 or 2 additional nitrogen or oxygen heteroatoms as ring member(s) selected from 4-membered/3-membered, 4-membered/4-membered, 3-membered/5-membered, 4-membered/5-membered, 4-membered/6-membered, 5-membered/5-membered, or 5-membered/6-membered mono-spiro heterocyclyl; or c) $R^{3a}$ and $R^{3b}$, together with the nitrogen atom to which they are attached, form a bicyclic spiro 7- to 12-membered ring selected from 2,3-dihydrospiro [indene-1,2'-pyrrolidine], 1,3-dihydrospiro [indene-2,2'-pyrrolidine], azaspiro [2.4] heptane, 2-oxa-6-azaspiro [3.3] heptane, azaspiro [3.4] octane, 2-oxa-6-azaspiro [3.4] octane, azaspiro [3.4] octane, azaspiro [3.4] octane, 1,7-dioxaspiro [4.5]decane, 2-oxa-7-aza-spiro [4.4] nonane, 7-oxa-spiro [3.5] nonyl or 5-oxa-spiro [2.4] heptyl.

8. The compound according to claim 1, wherein $R^3$ is selected from

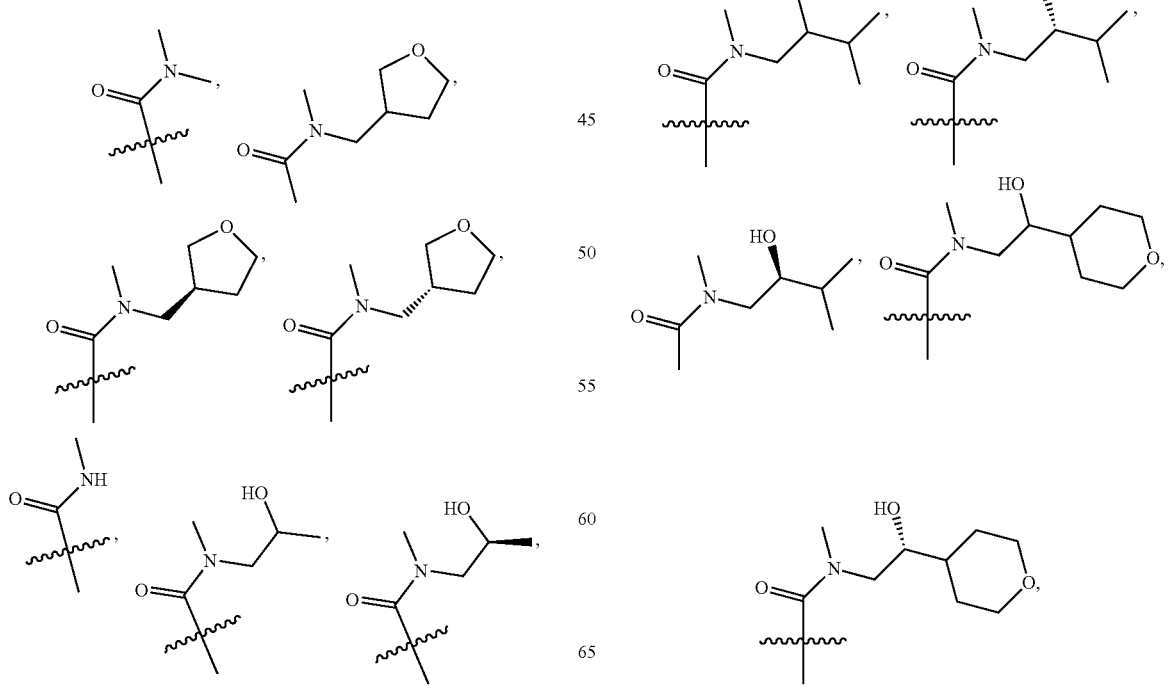

-continued

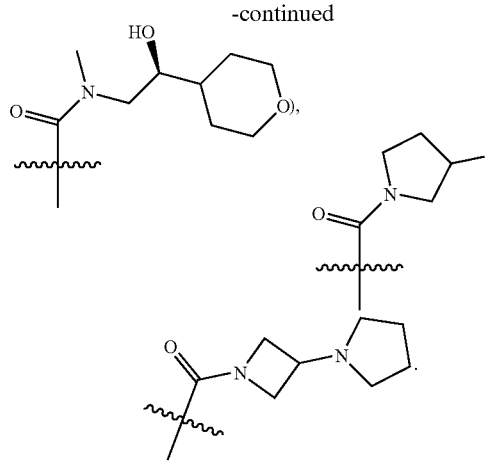

9. The compound according to claim 1, wherein n is 1 and $R^4$ is —$C_{1-8}$alkyl.

10. The compound according to claim 1, wherein the

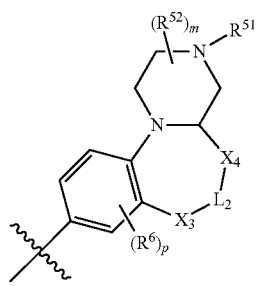

moiety is

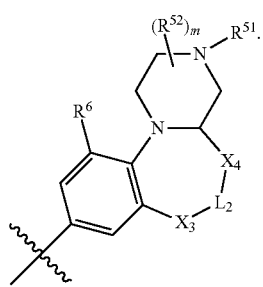

11. The compound according to claim 10, wherein the

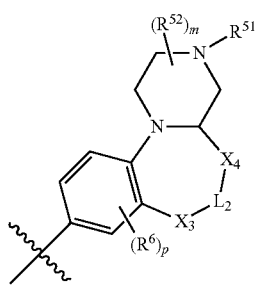

is selected from the following:

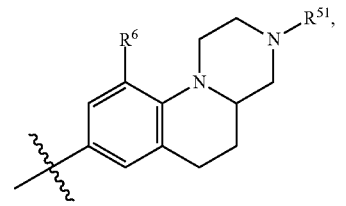

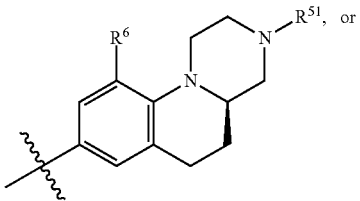

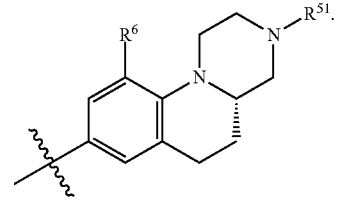

12. The compound according to claim 11, wherein:
a) $R^6$ and $R^{51}$ are each independently —$C_{1-8}$alkyl; or
b) $R^6$ and $R^{51}$ are each independently methyl, ethyl, propyl, butyl, pentyl or hexyl.

13. A compound according to claim 1 selected from:

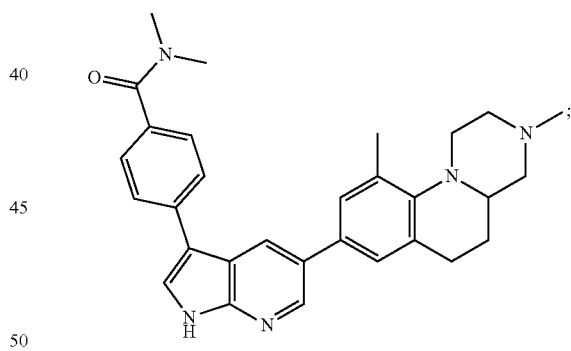

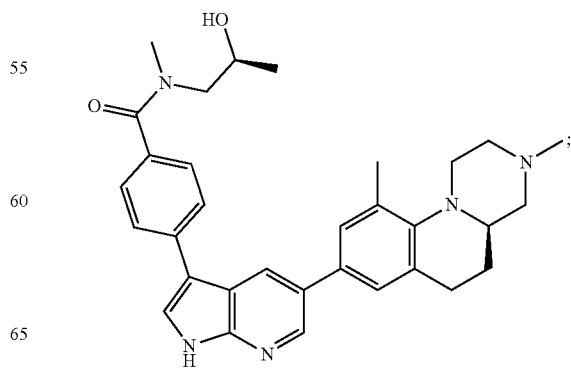

97
-continued
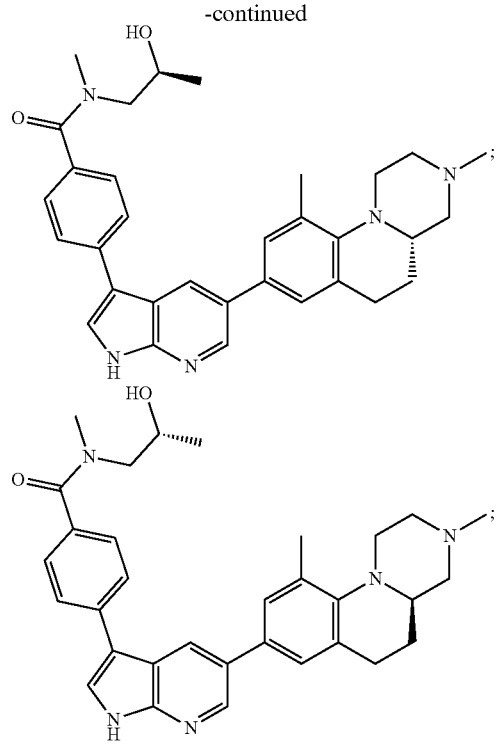
98
-continued
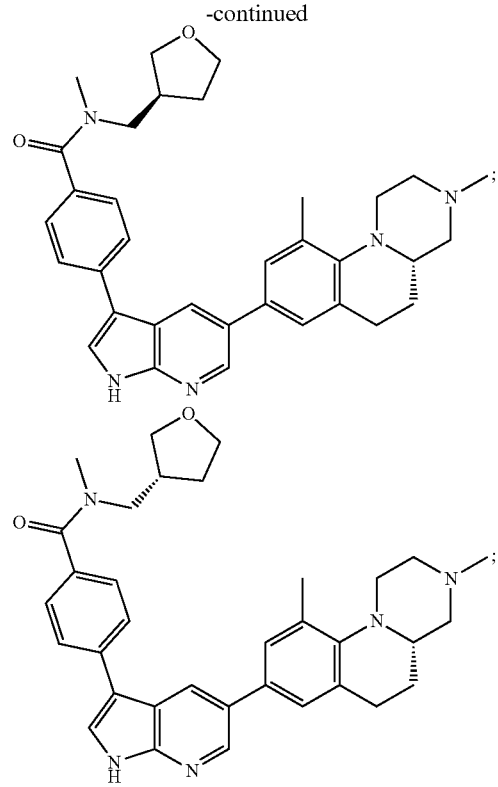
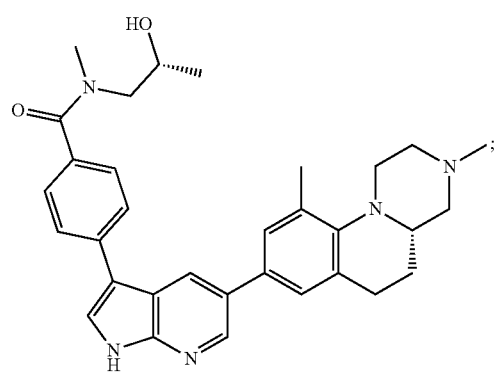
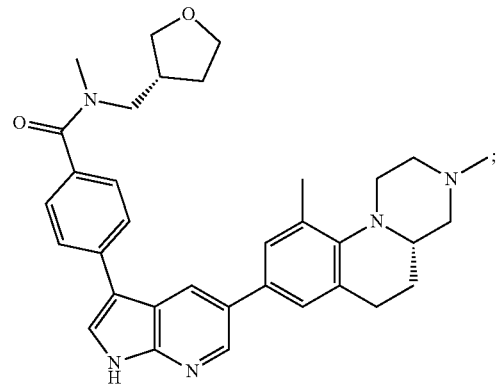
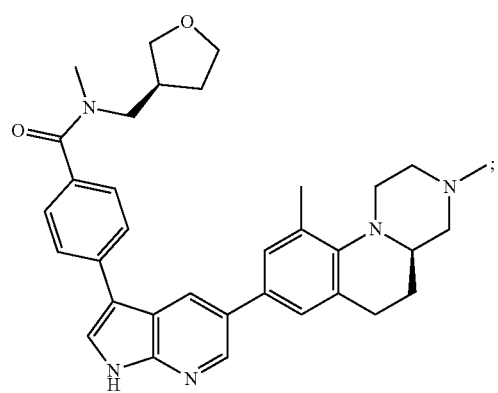
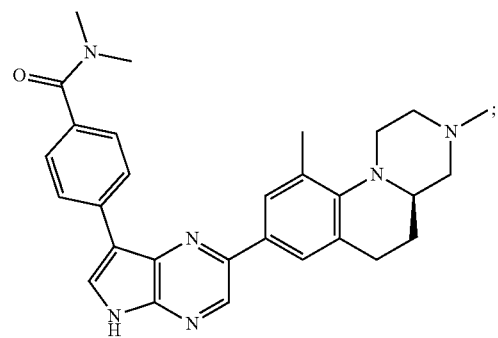

99
-continued
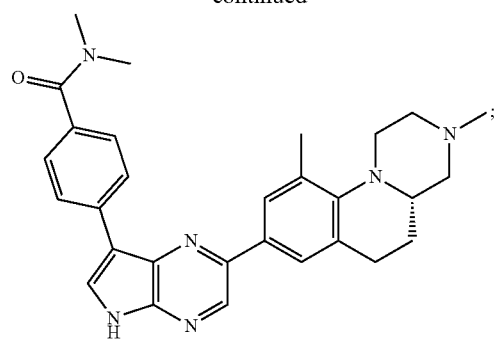
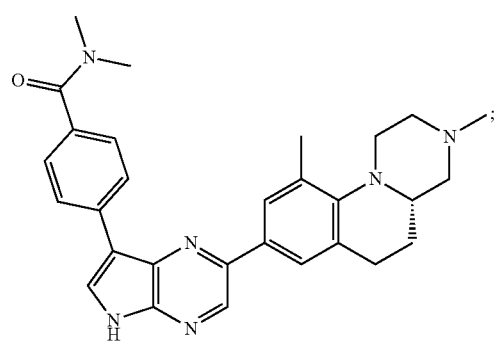
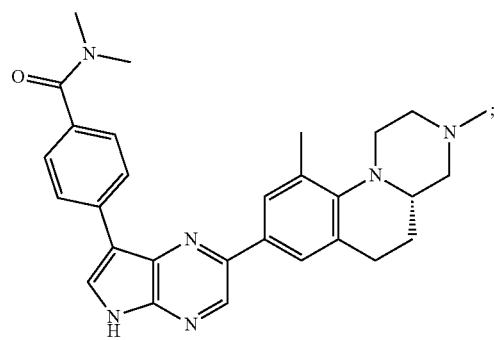
100
-continued
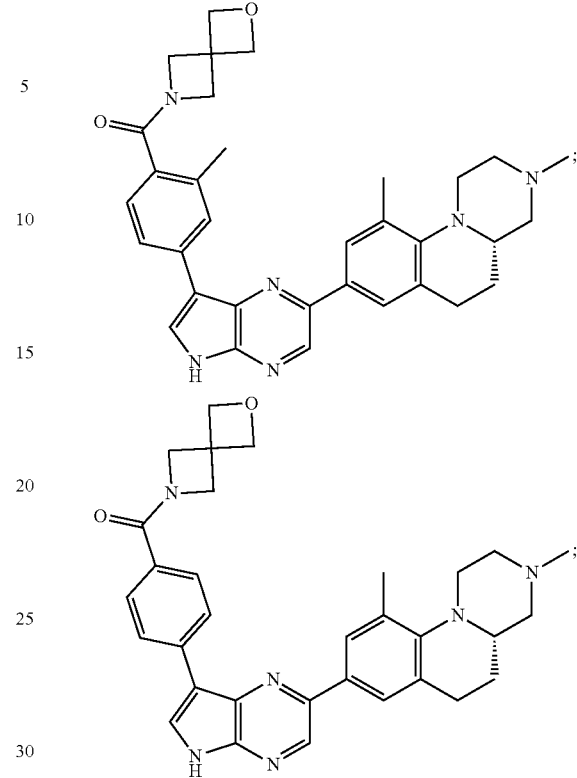
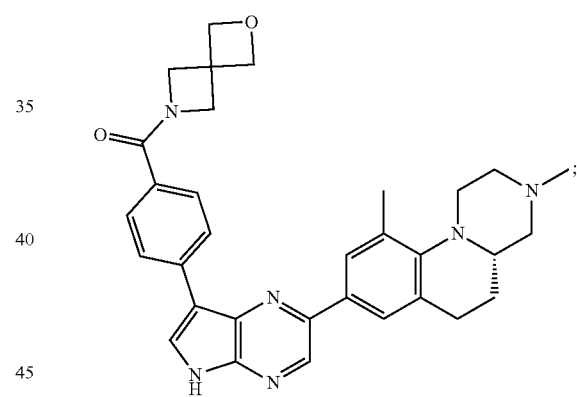
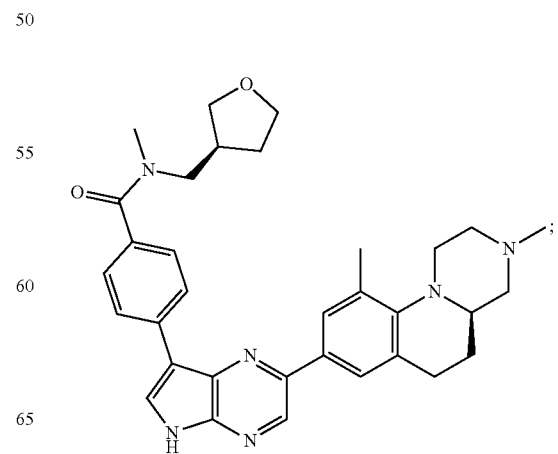

101
-continued
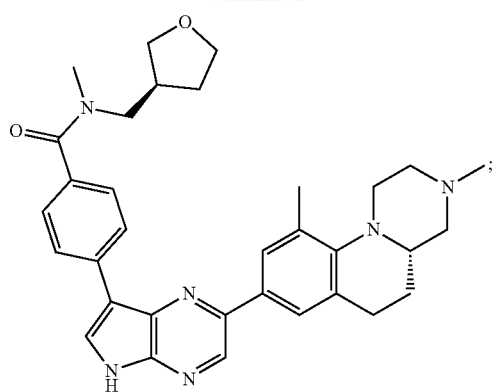
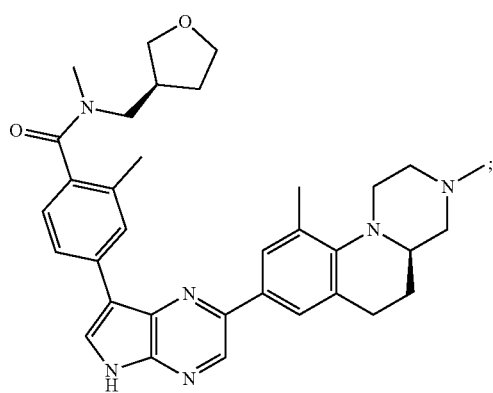
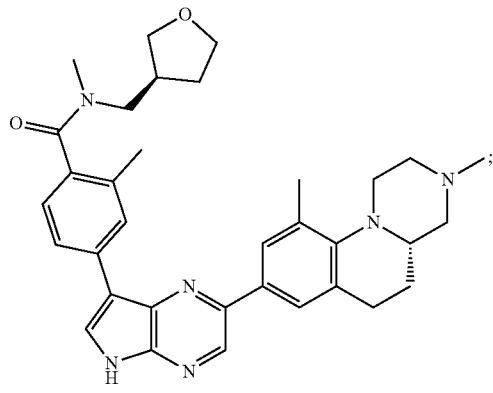
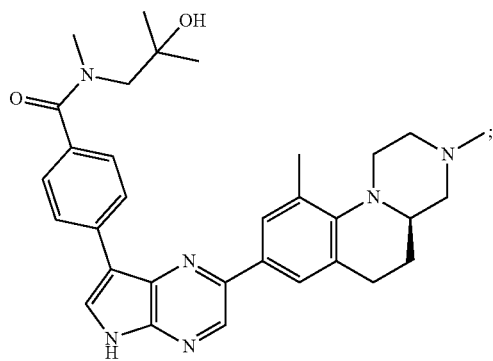
102
-continued
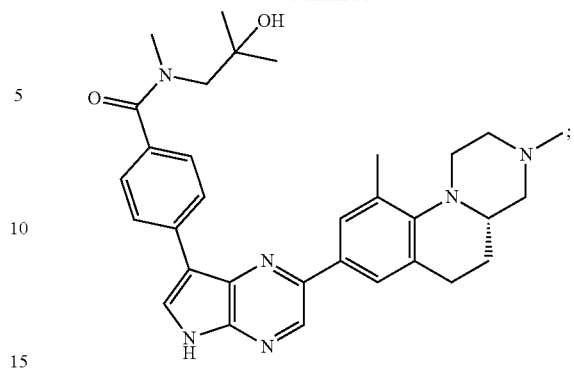
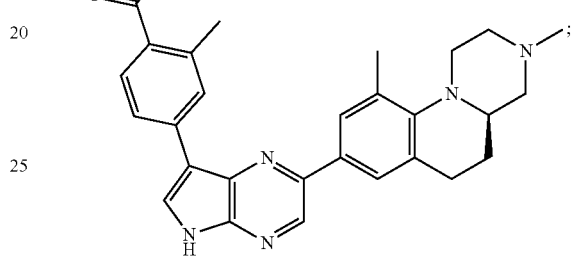
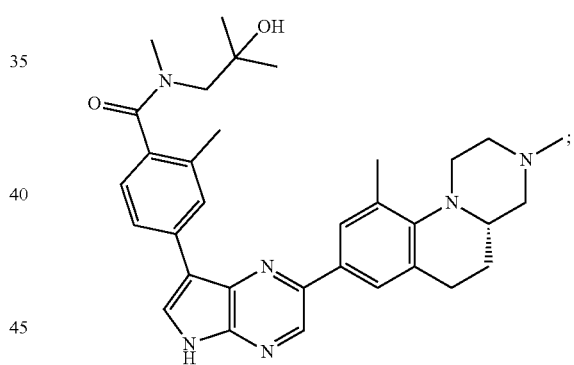
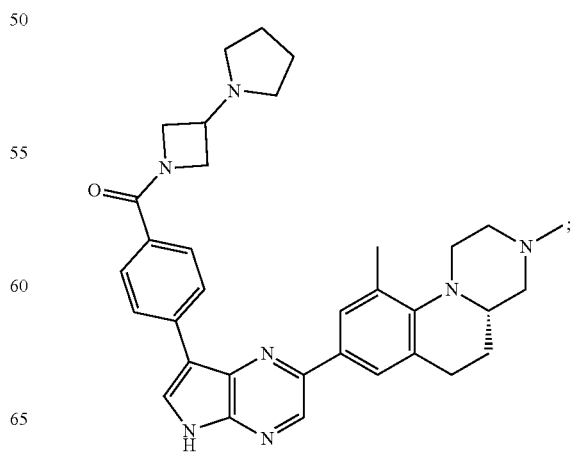

103
-continued
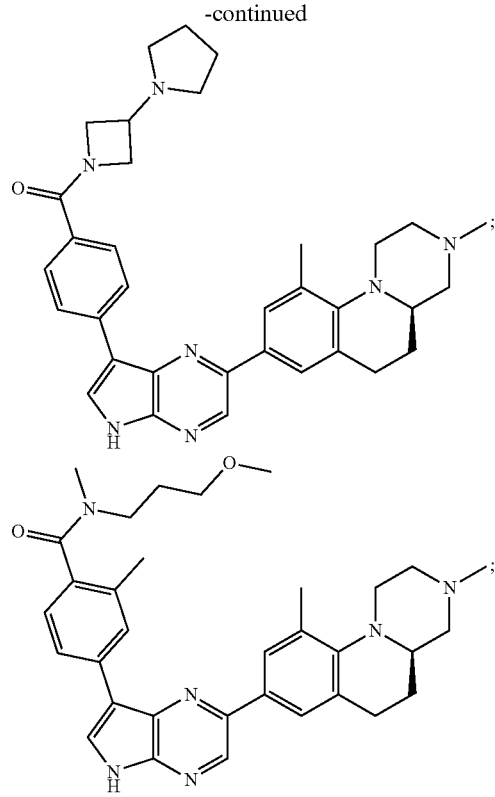
104
-continued
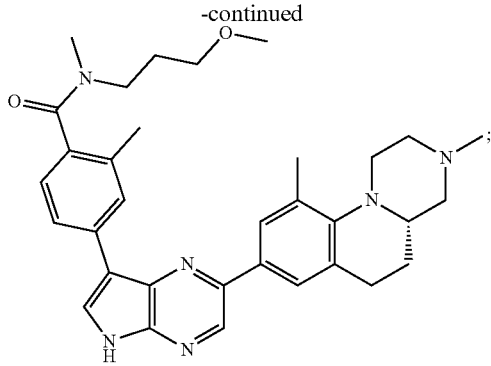
or a pharmaceutically acceptable salt thereof.
14. A pharmaceutical composition comprising the compound of claim 1 or a stereoisomer thereof, or a pharmaceutically acceptable salt thereof, and a pharmaceutically acceptable excipient.
* * * * *